(12) United States Patent
Kim et al.

(10) Patent No.: US 12,451,585 B2
(45) Date of Patent: Oct. 21, 2025

(54) ANTENNA MODULE DISPOSED IN VEHICLE

(71) Applicant: LG ELECTRONICS INC., Seoul (KR)

(72) Inventors: Uisheon Kim, Seoul (KR); Ilnam Cho, Seoul (KR); Kangjae Jung, Seoul (KR); Byungwoon Jung, Seoul (KR); Byeongyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/877,743

(22) PCT Filed: Jun. 23, 2022

(86) PCT No.: PCT/KR2022/008967
§ 371 (c)(1),
(2) Date: Dec. 20, 2024

(87) PCT Pub. No.: WO2023/249141
PCT Pub. Date: Dec. 28, 2023

(65) Prior Publication Data
US 2025/0266605 A1    Aug. 21, 2025

(51) Int. Cl.
*H01Q 1/12*       (2006.01)
*H01Q 1/42*       (2006.01)
*H01Q 5/50*       (2015.01)

(52) U.S. Cl.
CPC .......... *H01Q 1/1271* (2013.01); *H01Q 1/422* (2013.01); *H01Q 5/50* (2015.01)

(58) Field of Classification Search
CPC ............ H01Q 1/12; H01Q 1/42; H01Q 1/422; H01Q 1/1271; H01Q 5/50
See application file for complete search history.

(56) References Cited

U.S. PATENT DOCUMENTS 5,986,609 A * 11/1999 Spall .................. H01Q 1/38
                                                                343/702
7,102,572 B2 * 9/2006 Okado .................. H01Q 1/38
                                                                343/846
(Continued)

FOREIGN PATENT DOCUMENTS

CN          102407753         4/2012
EP          3281247           2/2018
(Continued)

OTHER PUBLICATIONS

PCT International Application No. PCT/KR2022/008967, International Search Report dated Mar. 20, 2023, 4 pages.
(Continued)

*Primary Examiner* — Lam T Mai
(74) *Attorney, Agent, or Firm* — LEE, HONG, DEGERMAN, KANG & WAIMEY

(57) ABSTRACT

A vehicle according to the present specification may comprise: a glass panel including a transparent region and an opaque region; and an antenna assembly disposed on the glass panel. The antenna assembly comprises: a first transparent dielectric substrate including a first surface and a second surface; first conductive patterns disposed on the first surface of the first transparent dielectric substrate; and second conductive patterns disposed on an inner surface of the glass panel. Second connection patterns of the second conductive patterns may be attached to first connection patterns formed on the first conductive patterns.

30 Claims, 28 Drawing Sheets

(56) References Cited

U.S. PATENT DOCUMENTS

| | | | | |
|---|---|---|---|---|
| 7,893,879 | B2* | 2/2011 | Noro | H01Q 9/0421 |
| | | | | 343/846 |
| 9,595,755 | B2* | 3/2017 | Ng | H01Q 9/0407 |
| 11,745,761 | B2* | 9/2023 | Lee | G01C 21/3415 |
| | | | | 701/26 |
| 12,279,154 | B1* | 4/2025 | Park | H04W 28/04 |
| 12,322,853 | B2* | 6/2025 | Kim | H05K 7/20881 |
| 12,322,870 | B2* | 6/2025 | Park | H04M 1/026 |
| 12,322,883 | B2* | 6/2025 | Choi | H01Q 9/0407 |
| 2004/0100406 | A1* | 5/2004 | Okado | H01Q 1/38 |
| | | | | 343/846 |
| 2004/0183727 | A1* | 9/2004 | Choi | H01Q 21/08 |
| | | | | 343/702 |
| 2009/0021448 | A1* | 1/2009 | Tsai | H01Q 1/38 |
| | | | | 343/893 |
| 2009/0179802 | A1* | 7/2009 | Tsai | H01Q 1/38 |
| | | | | 343/700 MS |
| 2009/0243947 | A1* | 10/2009 | Tsai | H01Q 25/00 |
| | | | | 343/742 |
| 2009/0256755 | A1* | 10/2009 | Tsai | H01Q 1/2275 |
| | | | | 343/700 MS |
| 2014/0078001 | A1* | 3/2014 | Matsuoka | H01Q 9/42 |
| | | | | 343/700 MS |
| 2017/0237148 | A1* | 8/2017 | Patel | H01Q 1/3275 |
| | | | | 343/713 |
| 2018/0159208 | A1* | 6/2018 | Ameri | H01Q 21/28 |
| 2019/0348743 | A1 | 11/2019 | Song et al. | |
| 2023/0031896 | A1* | 2/2023 | Kim | H01Q 1/325 |
| 2023/0051251 | A1* | 2/2023 | Hwang | G01S 5/12 |
| 2023/0066184 | A1* | 3/2023 | Kim | H01Q 1/3241 |
| 2023/0094098 | A1* | 3/2023 | Kim | H01Q 1/48 |
| | | | | 343/713 |
| 2023/0099552 | A1* | 3/2023 | Kim | H01Q 1/48 |
| | | | | 375/267 |
| 2023/0163450 | A1* | 5/2023 | Lee | H01Q 1/48 |
| | | | | 343/702 |
| 2023/0163471 | A1* | 5/2023 | Kim | H01Q 9/0421 |
| | | | | 343/713 |
| 2023/0198553 | A1* | 6/2023 | Kim | H01Q 9/045 |
| | | | | 370/329 |
| 2023/0231322 | A1* | 7/2023 | Jung | H01Q 1/243 |
| | | | | 343/702 |
| 2023/0238704 | A1* | 7/2023 | Kim | H01Q 5/378 |
| | | | | 343/702 |
| 2023/0261357 | A1* | 8/2023 | Jung | H01Q 1/48 |
| | | | | 343/713 |
| 2023/0261367 | A1* | 8/2023 | You | H01Q 1/1271 |
| | | | | 343/700 R |
| 2023/0337157 | A1* | 10/2023 | Kim | H04W 56/0045 |
| 2024/0014538 | A1* | 1/2024 | Park | H01Q 1/52 |
| 2024/0031975 | A1* | 1/2024 | Baek | H04W 4/40 |
| 2024/0162601 | A1* | 5/2024 | You | H01Q 1/1271 |
| 2024/0170836 | A1* | 5/2024 | Kim | H01Q 9/30 |
| 2024/0243462 | A1* | 7/2024 | Kim | H01Q 1/32 |
| 2024/0258686 | A1* | 8/2024 | Kim | H01Q 21/06 |
| 2024/0322436 | A1* | 9/2024 | Yun | H01Q 25/00 |
| 2024/0421492 | A1* | 12/2024 | Choi | H01Q 1/22 |
| 2025/0087867 | A1* | 3/2025 | Youn | H01Q 1/1271 |
| 2025/0105487 | A1* | 3/2025 | Yun | H01Q 1/3275 |
| 2025/0105497 | A1* | 3/2025 | Kim | H01Q 5/35 |
| 2025/0167423 | A1* | 5/2025 | Kim | H01Q 5/335 |
| 2025/0167424 | A1* | 5/2025 | Lee | H01Q 5/30 |

FOREIGN PATENT DOCUMENTS

| | | |
|---|---|---|
| JP | 2018-014737 | 1/2018 |
| JP | 2018-513638 | 5/2018 |
| JP | 2021-072476 | 5/2021 |
| KR | 10-2001-0052871 | 6/2001 |
| KR | 10-2016-0054848 | 5/2016 |
| KR | 10-2022-0123133 | 9/2022 |
| KR | 10-2022-0131335 | 9/2022 |

OTHER PUBLICATIONS

Korean Intellectual Property Office Application No. 10-2024-7016531, Notice of Allowance dated Oct. 4, 2024, 3 pages.

European Patent Office Application Serial No. 22948075.1, Search Report dated Jul. 15, 2025, 9 pages.

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

ANTENNA MODULE DISPOSED IN VEHICLE

CROSS-REFERENCE TO RELATED APPLICATION

This application is the National Stage filing under 35 U.S.C. 371 of International Application No. PCT/KR2022/008967, filed on Jun. 23, 2022, the contents of which are hereby incorporated by reference herein its entirety.

TECHNICAL FIELD

The present disclosure relates to a transparent antenna disposed on a vehicle. One specific implementation relates to an antenna assembly made of a transparent material to suppress an antenna region from being visible on glass of a vehicle.

BACKGROUND ART

A vehicle may perform wireless communication services with other vehicles or nearby objects, infrastructures, or a base station. In this regard, various communication services can be provided through a wireless communication system to which an LTE communication technology or a 5G communication technology is applied. some of LTE frequency bands may be allocated to provide 5G communication services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

In order to increase a communication capacity without a change in the exterior design of the vehicle, a transparent antenna may be disposed on glass corresponding to a window of the vehicle. However, antenna radiation efficiency and impedance bandwidth characteristics are deteriorated due to an electrical loss of the transparent antenna.

Meanwhile, when a transparent antenna is disposed on a vehicle glass, a transparent antenna pattern may be electrically connected to a feeding pattern disposed on a separate dielectric substrate. In this regard, feed loss and antenna performance degradation may occur due to the connection between the transparent antenna pattern and the feeding pattern. In addition, a difference in transparency may occur between a transparent region where the transparent antenna pattern is formed and an opaque region where the feeding pattern is formed. Depending on the difference in transparency, the region where the antenna is disposed can be visually distinguished from other regions. Despite the difference in transparency, a method is needed to minimize a difference in visibility between the antenna region and the other regions within the vehicle glass.

Meanwhile, a Fakra cable or a Fakra connector may be used to connect an antenna module and a communication module in a vehicle. For this purpose, one end portion of the Fakra cable may be electrically connected to the antenna module and the communication module through soldering. For an antenna module implemented as a transparent antenna, heat may be transferred to an adhesive layer, which is disposed opposite to a soldered surface of a thin flexible substrate, due to a temperature during the soldering. This may weaken adhesive strength. Due to the weakened adhesive strength, the antenna module becomes vulnerable to mechanical vibration or thermal impact, which may raise a reliability issue of the connection with the communication module.

On the other hand, for an antenna module implemented by using a rigid substrate, a relative increase in thickness may be caused compared to the flexible substrate, which may cause a serious issue with invisibility of the transparent antenna. If a step is formed when an adhesive surface of a transparent electrode part of the transparent substrate is coupled to an opaque substrate, it may cause an issue with invisibility. In addition, if the transparent substrate and the opaque substrate are coupled with a step therebetween, more serious issues may occur when an antenna assembly is exposed to a high temperature environment of a vehicle for a long time.

DISCLOSURE OF INVENTION

Technical Problem

The present disclosure has been invented to solve the above-mentioned problems and other disadvantages, and an aspect of the present disclosure is to improve a manufacturing process and reliability of a transparent antenna for a vehicle.

Another aspect of the present disclosure is to reduce manufacturing costs and a defect rate and improve manufacturing reliability by unifying the manufacturing/attachment process of an antenna module for a vehicle.

Still another aspect of the present disclosure is to improve operational reliability of an antenna module even in poor environments, such as vibration, high temperature, and high humidity, of a vehicle by implementing an opaque substrate part of a transparent antenna as an integrated glass type and using it as the transparent antenna.

Another aspect of the present disclosure is to reduce process complexity and manufacturing cost when a separate dielectric substrate is bonded to a transparent dielectric substrate.

Another aspect of the present disclosure is to provide an antenna assembly made of a transparent material such that an antenna region is invisible on a vehicle glass.

Another aspect of the present disclosure is to improve reliability of connection between an antenna module and a communication module.

Another aspect of the present disclosure is to minimize a difference in visibility between a region where an antenna made of a transparent material, which is to be disposed on a vehicle glass, is disposed and other regions.

Another aspect of the present disclosure is to solve the problems of degraded visibility and mass productivity due to a step, which is formed due to coupling between a transparent substrate and an opaque substrate.

Another aspect of the present disclosure is to ensure invisibility of a transparent antenna for a vehicle and an antenna assembly including the same without deterioration of antenna performance.

Another aspect of the present disclosure is to ensure both invisibility of the shape of an antenna assembly and invisibility when the antenna assembly is attached to a vehicle glass.

Another aspect of the present disclosure is to provide a broadband antenna structure made of a transparent material that can reduce feeding loss and improve antenna efficiency while operating as a broadband antenna.

Another aspect of the present disclosure is to dispose a transparent antenna module, which has improved antenna efficiency while operating as a broadband antenna, on a transparent region and a frit region of a vehicle glass in an optimal manner.

Solution to Problem

A vehicle according to the present disclosure to achieve the above or other aspects may include a glass panel including a transparent region and an opaque region, and an antenna assembly disposed on the glass panel. The antenna assembly includes a first transparent dielectric substrate having a first surface and a second surface, first conductive patterns disposed on the first surface of the first transparent dielectric substrate, and second conductive patterns disposed on an inner surface of the glass panel. Second connection patterns of the second conductive patterns may be attached to first connection patterns formed on the conductive patterns.

In an embodiment, the first surface and the second surface of the first transparent dielectric substrate may be disposed on opposite surfaces, the first surface may face the glass panel, the second surface may face an inside of the vehicle, and the first surface may have a first region and a second region. The first region may be disposed on the transparent region of the glass panel, the second region may be disposed on the opaque region, radiation patterns of the first conductive patterns may be disposed on the first region of the first surface, and first connection patterns of the first conductive patterns may be disposed on the second region of the first surface.

In an embodiment, the first conductive patterns may include a first pattern. a second pattern, and a third pattern. The second conductive patterns may include a feeding pattern, a first ground pattern, and a second ground pattern. The first pattern may be electrically connected to the feeding pattern of the second conductive pattern. The second pattern may be electrically connected to the first ground pattern of the second conductive pattern. The third pattern may be electrically connected to the second ground pattern of the second conductive pattern. The first pattern, the second pattern, and the third pattern may have a coplanar waveguide (CPW) structure on the first transparent dielectric substrate.

In an embodiment, the first pattern, the second pattern, and the third pattern may be formed in a metal mesh shape with a plurality of open areas. The antenna assembly may further include a plurality of dummy metal grid patterns on outer portions of the first conductive patterns on the first transparent dielectric substrate. The plurality of dummy metal grid patterns may not be connected to the feeding pattern and the first and second ground patterns, and the plurality of dummy metal grid patterns may be separated from one another by slits.

In an embodiment, the second connection patterns of the second conductive patterns may be attached to the first connection patterns by ACF bonding.

In an embodiment, the radiation patterns may have a penetration ratio of 80% or more, and the plurality of dummy metal grid patterns may have a penetration ratio of 82% or more. The radiation patterns may have sheet resistance of 1Ω (ohm)/sq or less.

In an embodiment, a difference in penetration ratio between a region of the plurality of dummy metal grid patterns and a region of the radiation patterns may be 2% or less. A boundary of some of the dummy metal grid patterns and a boundary of the radiation patterns may be separated by a gap. The boundary of the dummy metal grid patterns and the boundary of the radiation patterns may be 200 μm or less.

In an embodiment, the first connection patterns each may include a first penetration ratio portion and a second penetration ratio portion. A penetration ratio of the first penetration ratio portion may be similar to a penetration ratio the region of the radiation patterns. The second penetration ratio portion may have a penetration ratio of 70% or less, and the second penetration ratio portion may have sheet resistance of 0.5Ω (ohm)/sq or less.

In embodiments, the vehicle may further include a telematics control unit (TCU). The telematics control unit and third connection patterns of the second conductive patterns may be electrically connected by a Fakra cable. The Fakra cable may include a first connector and a second connector. The first connector may be electrically connected to the third connection patterns by soldering. The second connector may be electrically connected to a receptacle connector of the telematics control unit.

In an embodiment, the antenna assembly may further include an adhesive layer. The adhesive layer may include an adhesive material and a UV-cut material. The adhesive layer may be disposed between the first surface of the first transparent dielectric substrate and the inner surface of the glass panel.

In embodiments, the vehicle may further include a metal frame. The opaque region of the glass panel may be supported by a portion of the metal frame. The metal frame may include a recess portion. A second dielectric substrate may be disposed within the recessed portion of the metal frame.

A vehicle according to another aspect of the present disclosure may include: a glass panel having a transparent region and an opaque region; and an antenna assembly disposed on the glass panel. The antenna assembly may include; a first transparent dielectric substrate having a first surface and a second surface; first conductive patterns disposed on the second surface of the first transparent dielectric substrate; a second dielectric substrate having a third surface and a fourth surface; second conductive patterns disposed on the third surface of the second dielectric substrate; and third conductive patterns disposed on the fourth surface of the second dielectric substrate. Second connection patterns of the second conductive patterns may be attached to the first conductive patterns. The second conductive patterns and the third conductive patterns may be connected by vias.

In an embodiment, the first surface and the second surface of the first transparent dielectric substrate may be disposed on opposite surfaces, the first surface may face the glass panel, the second surface may face an inside of the vehicle, and the first surface may have a first region and a second region. The second surface of the first transparent dielectric may include a first region and a second region, the first region may be disposed on the transparent region of the glass panel, the second region may be disposed on the opaque region, radiation patterns of the first conductive patterns may be disposed on the first region of the second surface, and first connection patterns of the first conductive patterns may be disposed on the second region of the second surface.

The second dielectric substrate may be disposed on the opaque region of the glass panel, the third surface and the fourth surface may be disposed on opposing surfaces, the third surface may face the glass panel, and the fourth surface may face the inside of the vehicle. The radiation patterns may have a linewidth of 10 µm or less.

A vehicle according to still another aspect of the present disclosure may include a glass panel having a transparent region and an opaque region, and an antenna assembly disposed on the glass panel. The antenna assembly may include; a first transparent dielectric substrate having a first surface and a second surface; first conductive patterns disposed on the first surface of the first transparent dielectric substrate; a second dielectric substrate having a third surface and a fourth surface; and second conductive patterns disposed on the fourth surface of the second dielectric substrate. Second connection patterns of the second conductive patterns may be attached to the first conductive patterns. The second connection patterns of the second conductive patterns may be attached to first connection patterns.

In an embodiment, the first surface and the second surface of the first transparent dielectric substrate may be disposed on opposite surfaces, the first surface may face the glass panel, the second surface may face an inside of the vehicle, and the first surface may have a first region and a second region. The second surface of the first transparent dielectric may include a first region and a second region, the first region may be disposed on the transparent region of the glass panel, the second region may be disposed on the opaque region, radiation patterns of the first conductive patterns may be disposed on the first region of the first surface, and first connection patterns of the first conductive patterns may be disposed on the second region of the first surface. The second dielectric substrate may be disposed on the opaque region of the glass panel, the third surface and the fourth surface may be disposed on opposing surfaces, the third surface may face the glass panel, and the fourth surface may face the inside of the vehicle. The radiation patterns may have a linewidth of 10 µm or less.

Effects of Invention

Technical effects of a transparent antenna disposed on a vehicle will be described as follows.

According to the present disclosure, manufacturing costs and defect rate can be reduced and manufacturing reliability can be improved by way of unifying the manufacturing/attachment process of an antenna module for a vehicle.

According to the present disclosure, an opaque substrate part of a transparent antenna can be implemented as an integrated glass type to be used as a transparent antenna, thereby improving operational reliability of an antenna module even in poor environments of a vehicle, such as vibration, high temperature, and high humidity.

According to the present disclosure, process complexity and manufacturing costs can be reduced when bonding a separate dielectric substrate to a transparent dielectric substrate.

According to the present disclosure, an antenna assembly made of a transparent material can be optimally configured on a transparent region and an opaque region of a vehicle glass, so that an antenna region is invisible on the vehicle glass.

According to the present disclosure, a difference in visibility between a region where an antenna made of a transparent material to be disposed on a vehicle glass is disposed and the other region can be minimized through optimization with a frit pattern for each metal mesh region.

According to the present disclosure, a step that is generated when an opaque substrate is coupled to a transparent electrode part can be removed, thereby solving the problem of deteriorated visibility and mass production due to the step upon the coupling.

According to the present disclosure, invisibility of a transparent antenna for a vehicle and an antenna assembly including the same can be secured without feeding loss and deterioration of antenna performance, which are caused by an increase in length of a transmission line due to a separate impedance matching part.

According to the present disclosure, it is possible to ensure both invisibility of an antenna pattern and the shape of a transmission line and invisibility of an antenna assembly including a transparent electrode part and an opaque substrate part when the antenna assembly is attached to a vehicle glass.

According to the present disclosure, a wideband antenna structure made of a transparent material that can be implemented in various shapes on a single plane can be provided through a plurality of metal mesh-shaped conductive patterns, a CPW feeder, and a conversion structure between them.

According to the present disclosure, a wideband antenna structure made of a transparent material that can reduce feeding loss and improve antenna efficiency while operating in a wide band can be provided through a transparent region and a frit region of a vehicle glass.

According to the present disclosure, an opaque substrate can be manufactured as an integrated glass type through a patterning process in a glass manufacturer, which can result in simplifying a transparent antenna module manufacturing process, reducing a total manufacturing cost of the transparent antenna module, and improving reliability of the antenna module.

According to the present disclosure, a step that is generated when an opaque substrate is coupled to a transparent electrode part can be removed, thereby solving the problem of deteriorated visibility and mass production due to the step upon the coupling.

According to the present disclosure, invisibility of a metal pattern can be improved and assembly quality and defect rate can be improved by removing a step from a coupled portion between a transparent substrate and an opaque substrate and increasing an area of a bonding portion.

According to the present disclosure, the reduction of antenna radiation loss at a multi-layered bonding surface can be improved by a simple bonding structure between a transparent substrate and an opaque substrate on the same plane.

According to the present disclosure, improvement of visibility at the edge of a transparent substrate, improvement of mass production, and reduction of manufacturing costs can be achieved by reducing the thicknesses of the transparent substrate and the opaque substrate.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
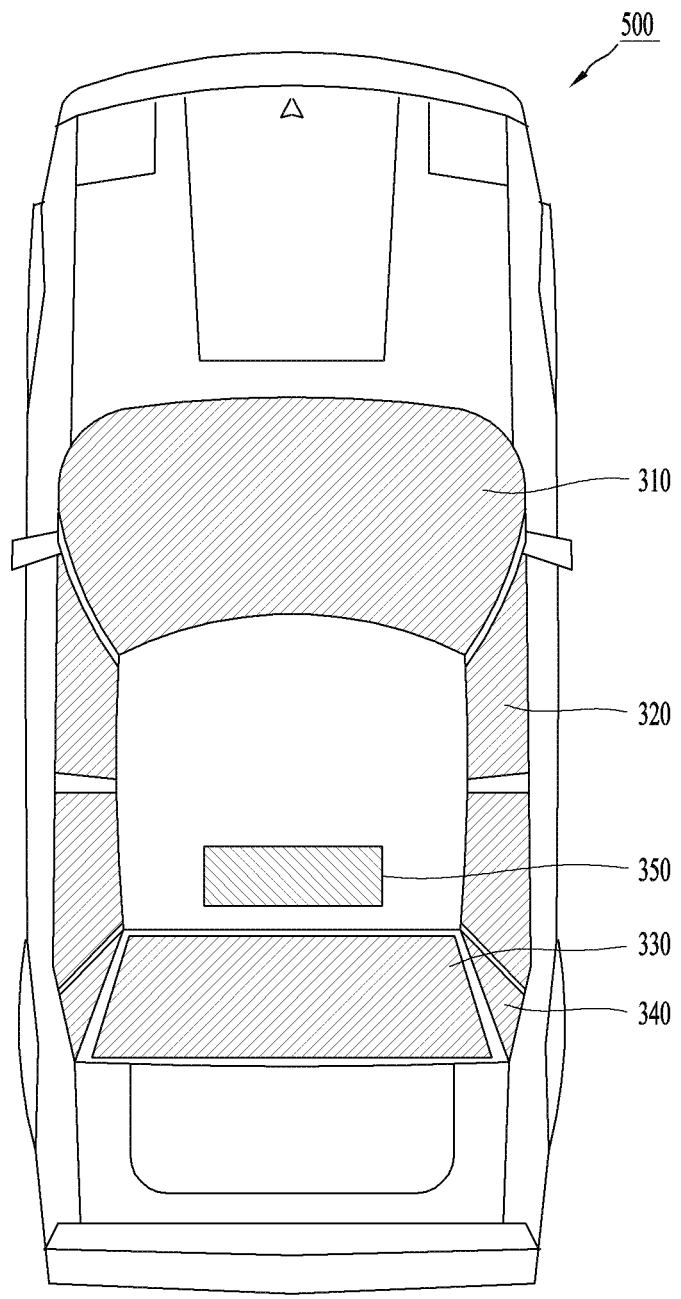
FIG. 1 is a diagram illustrating glass of a vehicle on which an antenna structure according to an embodiment of the present disclosure is to be disposed.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

An antenna system described herein may be mounted on a vehicle. Configurations and operations according to embodiments may also be applied to a communication system, namely, antenna system mounted on a vehicle. In this regard, the antenna system mounted on the vehicle may include a plurality of antennas, and a transceiver circuitry and a processor that control the plurality of antennas.

Hereinafter, an antenna assembly (antenna module) that may be disposed on a window of a vehicle according to the present disclosure and an antenna system for a vehicle including the antenna assembly will be described. In this regard, the antenna assembly may refer to a structure in which conductive patterns are combined on a dielectric substrate, and may also be referred to as an antenna module.

Figure 5A:
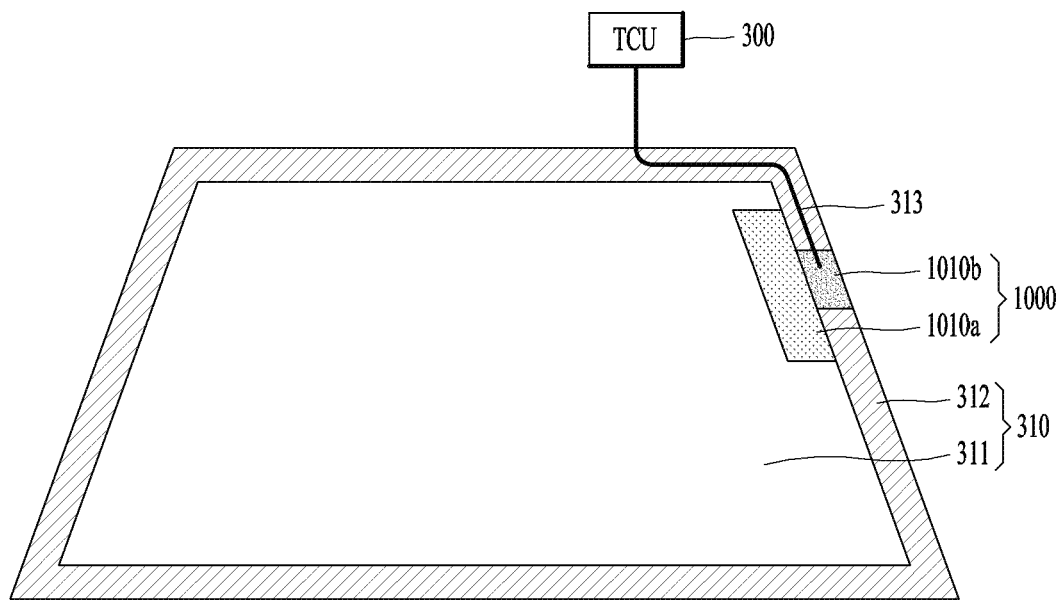
FIGS. 5A to 5C illustrate a configuration that an antenna assembly according to the present disclosure is disposed on a vehicle glass.

FIG. 5A illustrates glass of a vehicle in which an example of an antenna module can be disposed. Referring to FIG. 1, the vehicle 500 may include a front glass panel 310, door glass 320, rear glass 330, and quarter glass 340. In some examples, the vehicle 500 may further include a top glass 350 that is a window disposed on a roof in an upper region.

Therefore, the glass constituting the window of the vehicle 500 may include the front glass panel 310 disposed at a front region of the vehicle, the door glass 320 disposed at a door region of the vehicle, and the rear glass 330 disposed at a rear region of the vehicle. In some examples, the glass constituting the window of the vehicle 500 may further include the quarter class 340 disposed at a partial region of the door region of the vehicle. In addition, the glass constituting the window of the vehicle 500 may further include the top glass 350 spaced apart from the rear glass 330 and disposed at an upper region of the vehicle. Accordingly, each glass constituting the window of the vehicle 500 may be referred to as a window.

The front glass panel 310 may be referred to as a front windshield because it prevents wind blown from a front side from entering the inside of the vehicle. The front glass panel 310 may have a two-layer bonding structure having a thickness of about 5.0 to 5.5 mm. The front glass panel 310 may have a bonding structure of glass/shatterproof film/glass.

The door glass 320 may have a two-layer bonding structure or may be formed of single-layer compressed glass. The rear glass 330 may have a two-layer bonding structure having a thickness of about 3.5 to 5.5 mm or may be formed of single-layer compressed glass. In the rear glass 330, a spaced distance between a transparent antenna and a hot wire and an AM/FM antenna is required. The quarter glass 340 may be formed of single-layer compressed glass having a thickness of about 3.5 to 4.0 mm, but is not limited thereto.

The size of the quarter glass 340 may vary depending on a type of vehicle, and may be significantly smaller than the sizes of the front glass panel 310 and the rear glass 330.

Figure 2A:
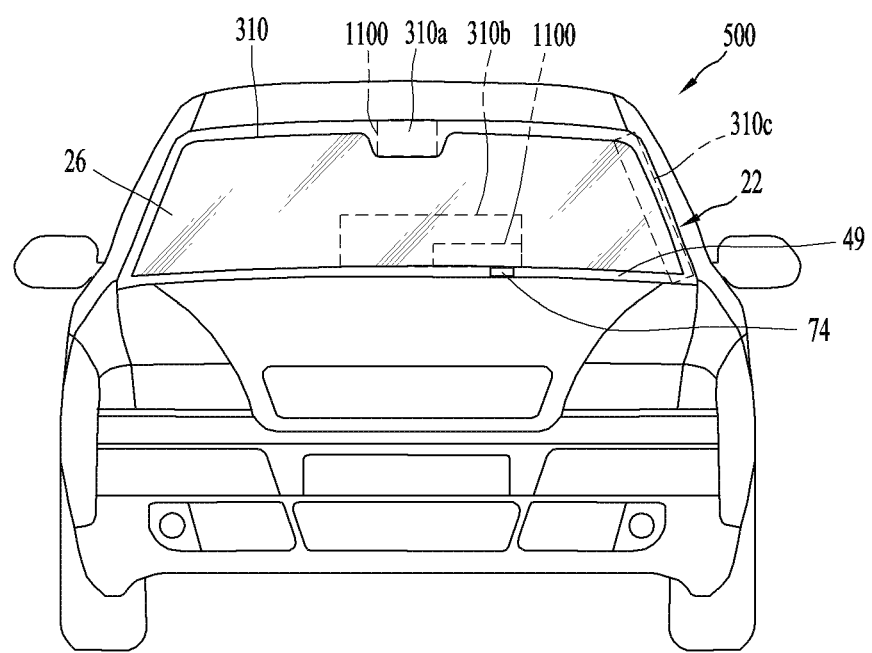
FIG. 2A is a front view of the vehicle with an antenna assembly disposed on different regions of a front glass of the vehicle of FIG. 1.
Figure 2B:
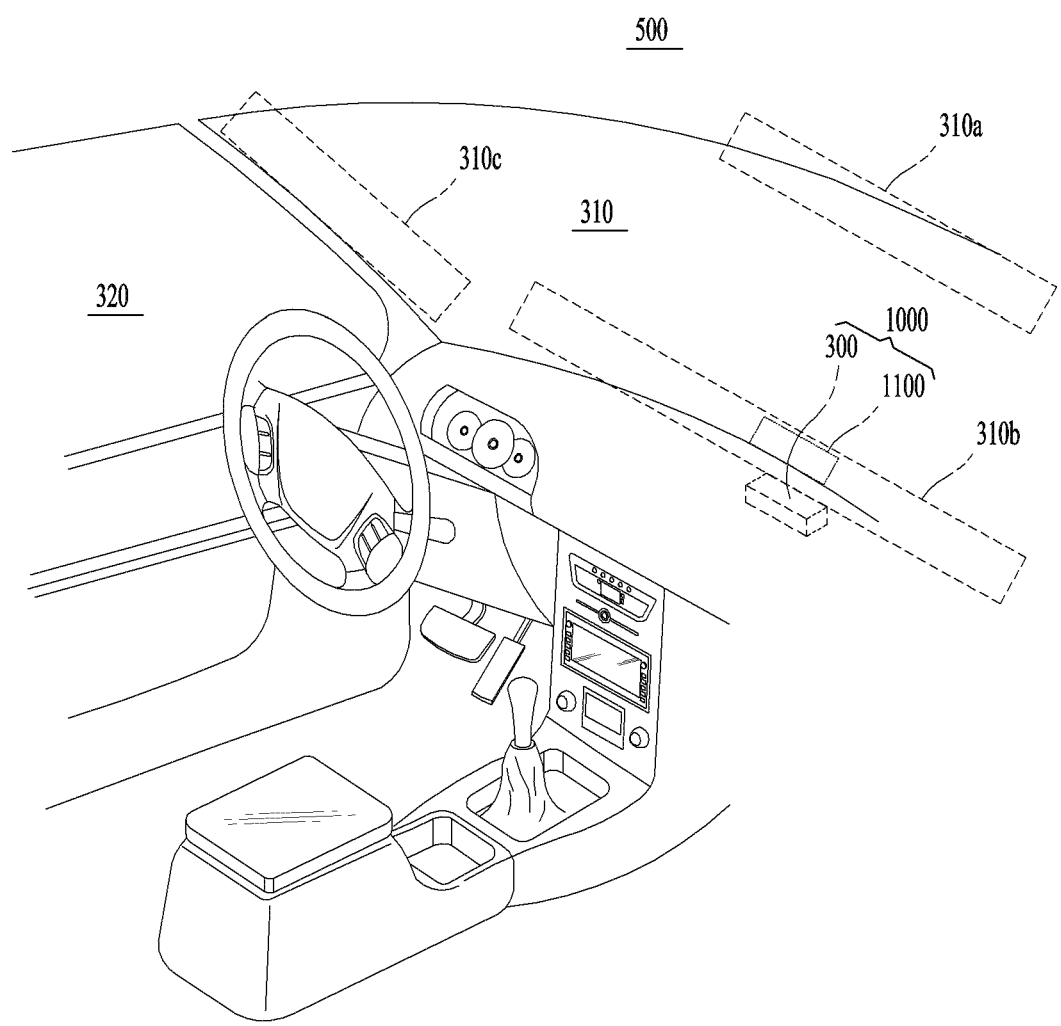
FIG. 2B is a front perspective view illustrating the inside of the vehicle with the antenna assembly disposed on the different regions of the front glass of the vehicle of FIG. 1.
Figure 2C:
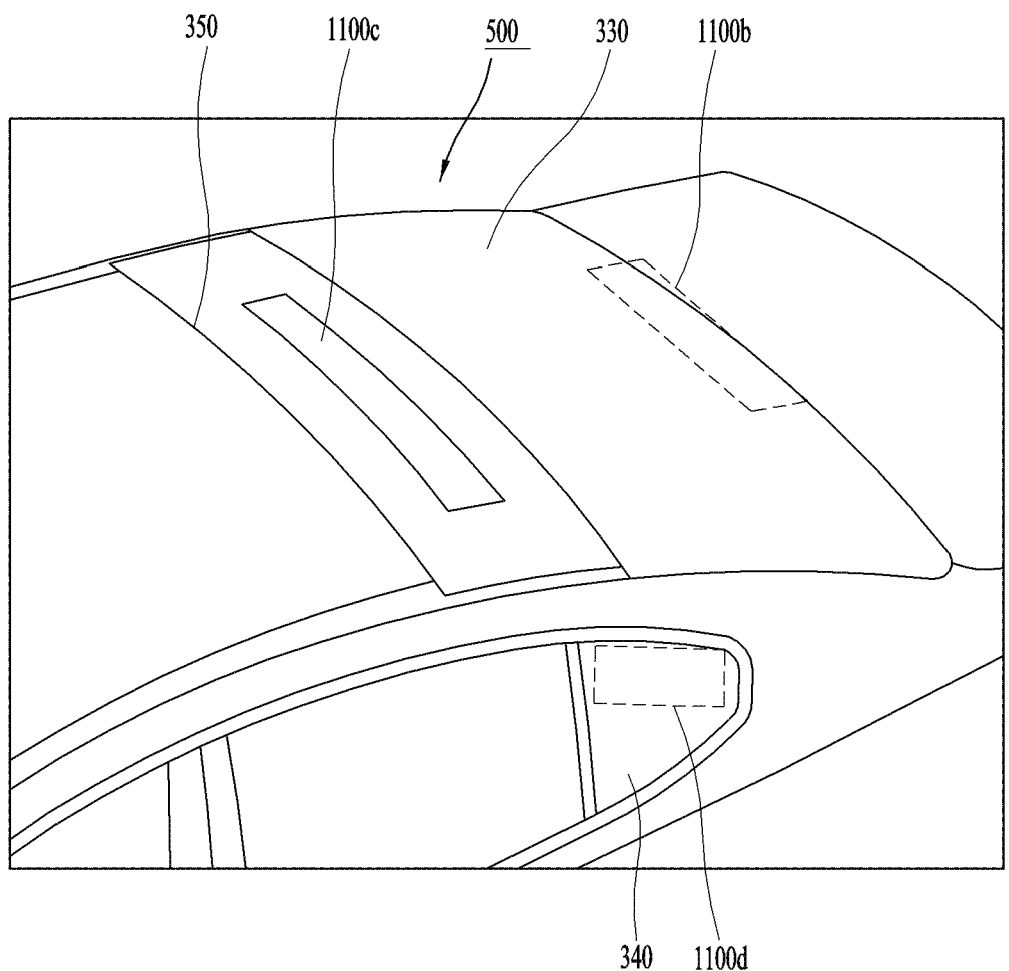
FIG. 2C is a side perspective view of the vehicle with the antenna assembly disposed on an upper glass of the vehicle of FIG. 1.

Hereinafter, a structure in which an antenna assembly according to the present disclosure is disposed on different regions of the front glass of a vehicle will be described. An antenna assembly attached to the vehicle glass may be implemented as a transparent antenna. In this regard, FIG. 2A is a front view of the vehicle with an antenna assembly disposed on different regions of a front glass of the vehicle of FIG. 1. FIG. 2B is a front perspective view illustrating the inside of the vehicle with the antenna assembly disposed on the different regions of the front glass of the vehicle of FIG. 1. FIG. 2C is a side perspective view of the vehicle with the antenna assembly disposed on an upper glass of the vehicle of FIG. 1.

Referring to FIG. 2A which is the front view of the vehicle 500, a configuration in which the transparent antenna for the vehicle can be disposed is illustrated. A pane assembly 22 may include an antenna disposed on an upper region 310a. The pane assembly 22 may include an antenna on the upper region 310a, an antenna on a lower region 310b, and/or an antenna on a side region 310c. In addition, the pane assembly 22 may include a translucent pane glass 26 formed of a dielectric substrate. The antenna on the upper region 310a, the antenna on the lower region 310b, and/or the antenna on the side region 310c are configured to support any one of various communication systems.

An antenna module 1100 may be disposed on the upper region 310a, the lower region 310b, or the side region 310c of a front glass panel 310. When the antenna module 1100 is disposed on the lower region 310b of the front glass panel 310, the antenna module 1100 may extend to a body 49 of a lower region of a translucent pane 26. The body 49 of the lower region of the translucent pane 26 may have lower transparency than other portions. A portion of a feeder and other interface lines may be disposed on the body 49 of the lower region of the translucent pane 26. A connector assembly 74 may be disposed on the body 49 of the lower region of the translucent pane 26. The body 49 of the lower region may constitute a vehicle body made of a metal material.

Referring to FIG. 2B, the antenna assembly 1000 may include a telematics control unit (TCU) 300 and an antenna assembly 1100. The antenna module 1100 may be disposed on different regions of glass of the vehicle.

Referring to FIGS. 2A and 2B, an antenna assembly may be disposed on the upper region 310a, the lower region 310b, and/or the side region 310c of the vehicle glass. Referring to FIGS. 2A to 2C, the antenna assembly may be disposed on the front glass panel 310, rear glass 330, quarter glass 340, and upper glass 350 of the vehicle.

Referring to FIGS. 2A to 2C, the antenna disposed on the upper region 310a of the front glass panel 310 of the vehicle may be configured to operate in a low band (LB), a mid band (MB), a high band (HB), and a 5G Sub6 band of 4G/5G communication systems. The antenna on the lower region 310b and/or the antenna on the side region 310c may also be configured to operate in the LB, MB, HB, and 5G Sub6 band of the 4G/5G communication systems. An antenna structure 1100b on the rear glass 330 of the vehicle may also be configured to operate in the LB, MB, HB, and 5G Sub6 band of the 4G/5G communication systems. An antenna structure 1100c on the upper glass 350 of the vehicle may also be configured to operate in the LB, MB, HB, and 5G Sub6 band of the 4G/5G communication systems. An antenna structure 1100d on the quarter glass 350 of the vehicle may also be configured to operate in the LB, MB, HB, and 5G Sub6 band of the 4G/5G communication systems.

At least a portion of an outer region of the front glass panel 310 of the vehicle may be defined by the translucent pane 26. The translucent pane 26 may include a first part at which an antenna and a portion of a feeder are formed, and a second part at which another portion of the feeder and a dummy structure are formed. The translucent pane 26 may further include a dummy region at which conductive patterns are not formed. For example, a transparent region of the translucent pane 22 may be transparent to secure light transmission and a field of view.

Although it is exemplarily illustrated that conductive patterns can be formed on a partial region of the front glass panel 310, the conductive patterns may extend to the side glass 320 and the rear glass 330 of FIG. 1, and an arbitrary glass structure. In the vehicle 500, the occupants or driver can view road and surrounding environment through the pane assembly 22. In addition, the occupants or driver can view the road and surrounding environment without interference with the antenna on the upper region 310a, the antenna on the lower region 310b, and/or the antenna on the side region 310c.

Figure 3:
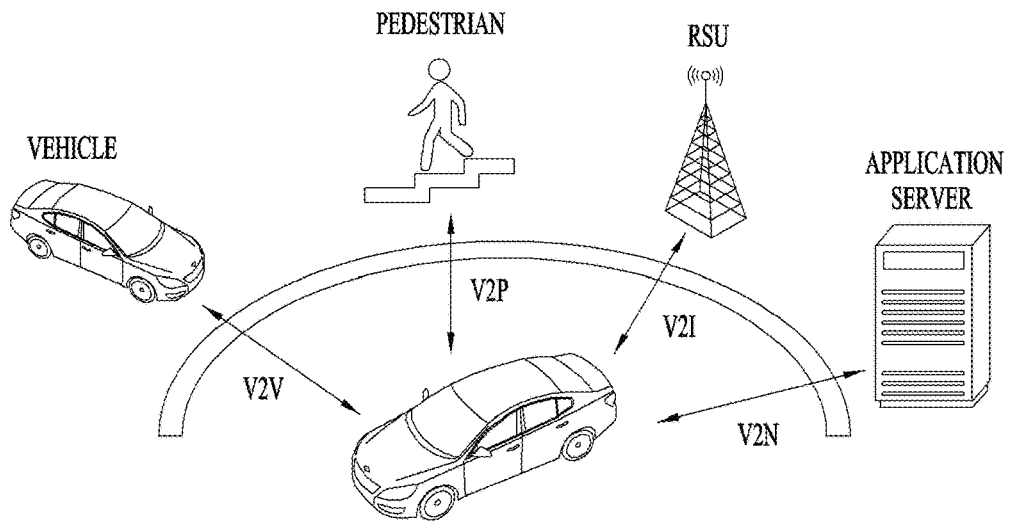
FIG. 3 illustrates types of V2X applications.

The vehicle 500 may be configured to communicate with pedestrians, surrounding infrastructures, and/or servers in addition to adjacent vehicles. FIG. 3 illustrates types of V2X applications. Referring to FIG. 3, V2X communication may include communications between a vehicle and all entities, such as V2V (vehicle-to-vehicle) which refers to communication between vehicles, V2I (vehicle-to-infrastructure) which refers to communication between a vehicle and an eNB or RSU (road side unit), V2P (vehicle-to-pedestrian) which refers to communication between a vehicle and a terminal possessed by a person (pedestrian, cyclist, vehicle driver, or passenger), V2N (vehicle-to-network), and the like.

Figure 4:
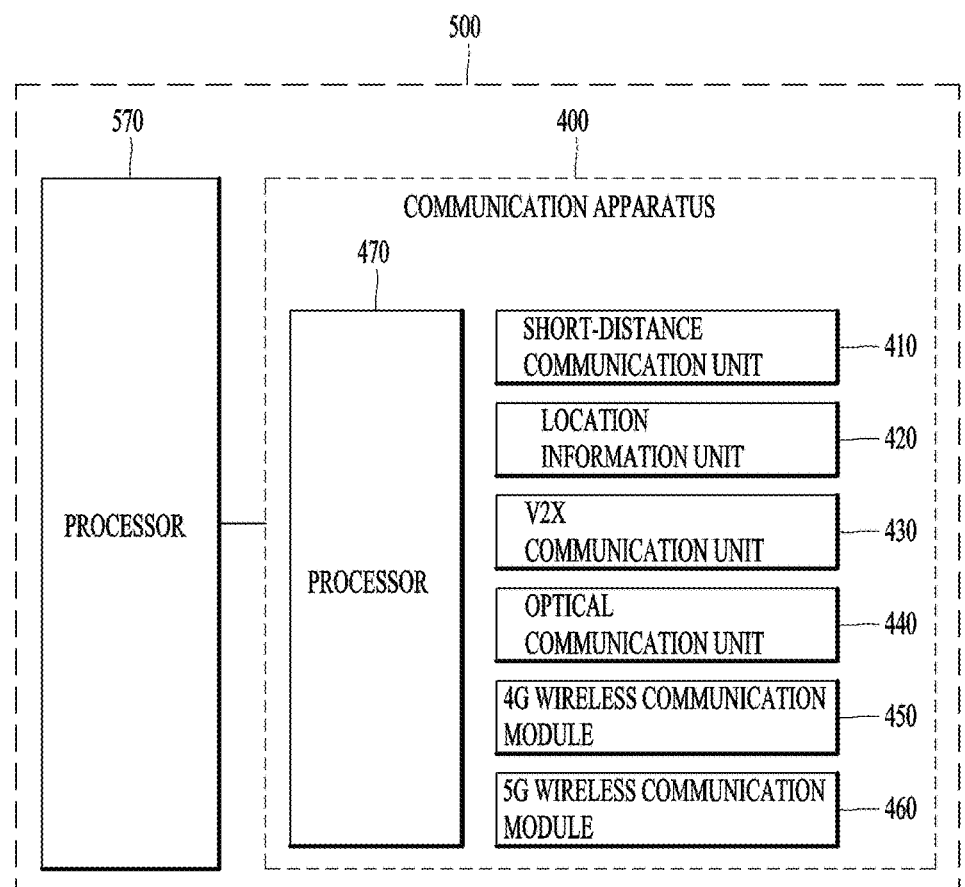
FIG. 4 is a block diagram referenced for explaining a vehicle and an antenna system mounted on the vehicle according to an embodiment of the present disclosure.

Meanwhile, FIG. 4 is a block diagram referenced for explaining a vehicle and an antenna system mounted on the vehicle according to an embodiment of the present disclosure.

The vehicle 500 may include the communication apparatus 400 and the processor 570. The communication apparatus 400 may correspond to a telematics control unit of the vehicle 500.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. In this regard, the communication apparatus 400 may include at least one of the short-range communication unit 410, the location information unit 420, the V2X communication unit 430, the optical communication unit 440, a 4G wireless communication module 450, and a 5G wireless communication module 460. The communication apparatus 400 may include a processor 470. According to an embodiment, the communication apparatus 400 may further include other components in addition to the components described, or may not include some of the components described.

A 4G wireless communication module 450 and a 5G wireless communication module 460 perform wireless communication with one or more communication systems through one or more antenna modules. The 4G wireless communication module 450 may transmit and/or receive signals to and/or from a device in a first communication system through a first antenna module. In addition, the 5G wireless communication module 460 may transmit and/or receive signals to and/or from a device in a second communication system through a second antenna module. The 4G wireless communication module 450 and 5G wireless communication module 460 may be physically implemented as one integrated communication module. For example, the first communication system and the second communication system may be an LTE communication system and a 5G communication system, respectively. However, the first communication system and the second communication system may not be limited thereto, and may be changed according to applications.

The processor of the device in the vehicle 500 may be implemented as a micro control unit (MCU) or a modem. The processor 470 of the communication apparatus 400 may correspond to a modem, and the processor 470 may be implemented as an integrated modem. The processor 470 may obtain surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module disposed in the vehicle 500 may include a wireless communication unit. The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input/Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed, for example, in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input/Multi-Output (MIMO) may be supported to be performed multiple times, in order to improve a transmission rate. In this instance, UL MIMO may be performed by a plurality of 5G transmission signals that are transmitted to a 5G base station. In addition, DL MIMO may be performed by a plurality of 5G reception signals that are received from the 5G base station.

In some examples, a state of dual connectivity (DC) to both the 4G base station and the 5G base station may be attained through the 4G wireless communication module 450 and the 5G wireless communication module 460. As such, the dual connectivity with the 4G base station and the 5G base station may be referred to as EUTRAN NR DC (EN-DC). On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi carrier aggregation (CA) may be performed using the 4G wireless communication module 450 and the Wi-Fi communication module 113. Or, 5G+WiFi CA may be performed using the 5G wireless communication module 460 and the Wi-Fi communication module.

In some examples, the communication apparatus 400 may implement a display apparatus for a vehicle together with the user interface apparatus. In this instance, the display apparatus for the vehicle may be referred to as a telematics apparatus or an Audio Video Navigation (AVN) apparatus.

In some examples, a wideband transparent antenna structure that can be disposed on glass of a vehicle can be implemented as a single dielectric substrate on the same plane as a CPW feeder. In addition, the wideband transparent antenna structure that can be disposed on the glass of the vehicle may be implemented as a structure in which grounds are formed at both sides of a radiator so as to constitute a wideband structure.

Figure 5B:
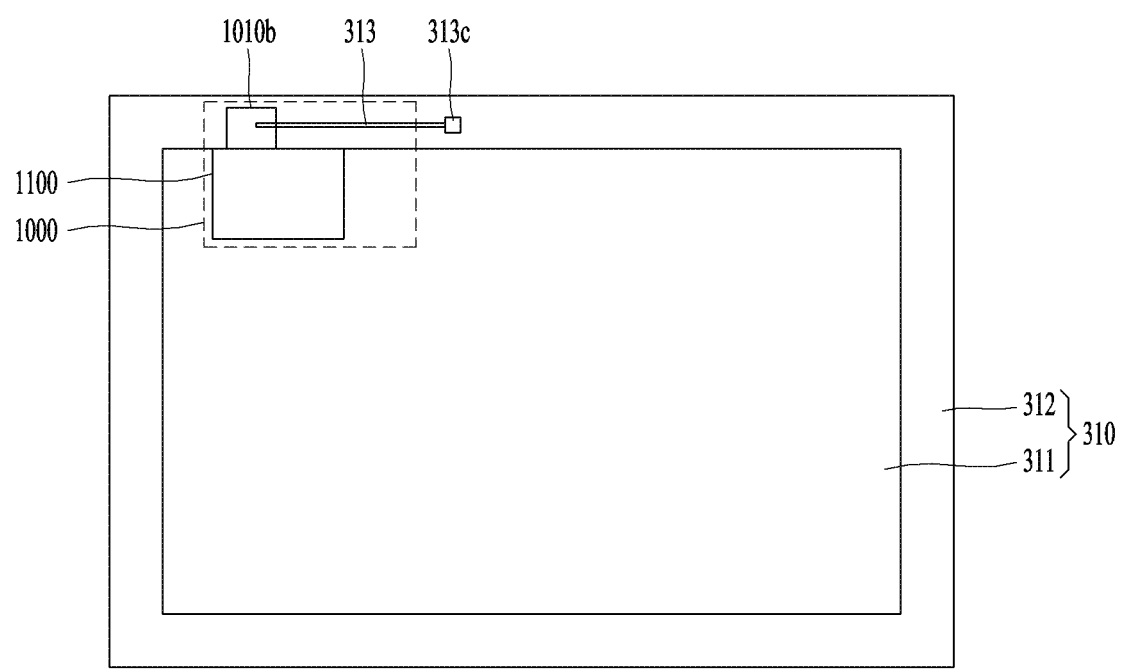

Hereinafter, an antenna assembly associated with a broadband transparent antenna structure according to the present disclosure will be described. In this regard, FIGS. 5A and 5B illustrate a configuration that the antenna assembly according to the present disclosure is disposed on the vehicle glass. Referring to FIG. 5A, the antenna assembly 1000 may include a first dielectric substrate 1010$a$ and a second dielectric substrate 1010$b$. The first dielectric substrate 1010$a$ is implemented as a transparent substrate and thus may be referred to as a first transparent dielectric substrate 1010$a$. The second dielectric substrate 1010$b$ may be implemented as an opaque substrate 1010$b$.

The glass panel 310 may be configured to include a transparent region 311 and an opaque region 312. The opaque region 312 of the glass panel 310 may be a frit region formed of a frit layer. The opaque region 312 may be formed to surround the transparent region 311. The opaque region 312 may be formed outside the transparent region 311. The opaque region 312 may form a boundary region of the glass panel 310.

A signal pattern formed on the dielectric substrate 1010 may be connected to the telematics control unit (TCU) 300 through a connector part 313 such as a coaxial cable. The telematics control unit (TCU) 300 may be disposed inside the vehicle, but is not limited thereto. The telematics control unit (TCU) 300 may be disposed on a dashboard inside the vehicle or a ceiling region inside the vehicle, but is not limited thereto.

Figure 5C:
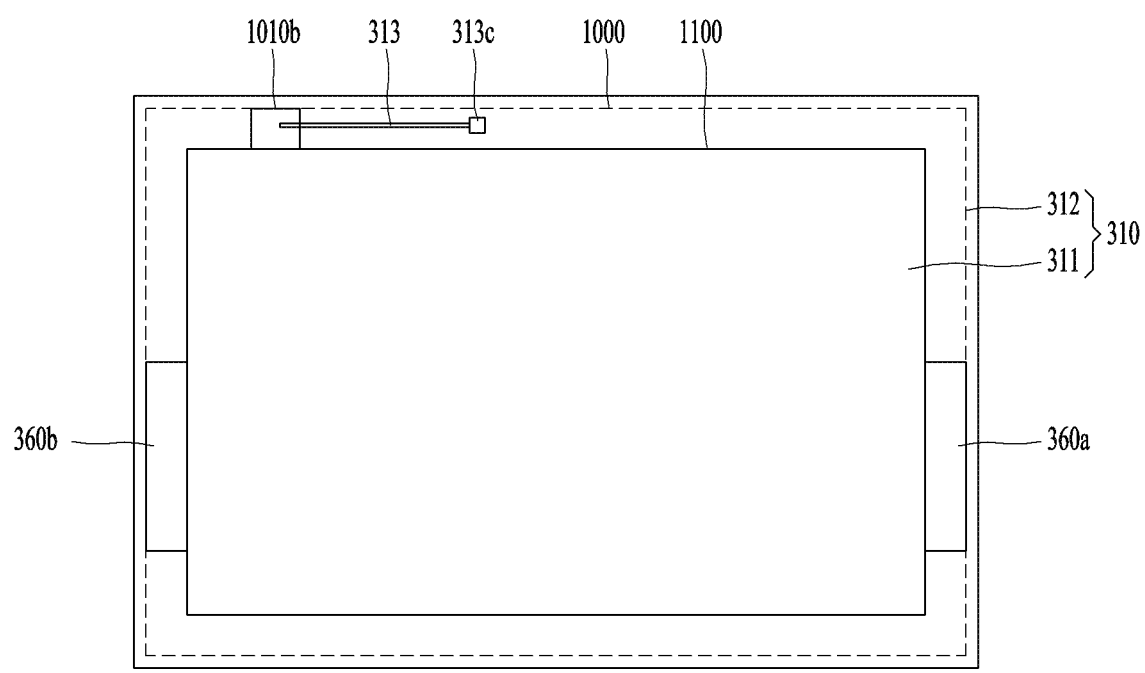

FIG. 5B illustrates a configuration in which the antenna assembly 1000 is disposed on a partial region of the glass panel 310. FIG. 5C illustrates a configuration in which the antenna assembly 1000 is disposed on an entire region of the glass panel 310.

Referring to FIGS. 5B and 5C, the glass panel 310 may include the transparent region 311 and the opaque region 312. The opaque region 312 is a non-visible region with transparency below a certain level and may be referred to as a frit region, black printing (BP) region, or black matrix (BM) region. The opaque region 312 corresponding to the non-visible region may be formed to surround the transparent region 311. The opaque region 312 may be formed in a region outside the transparent region 311. The opaque region 312 may form a boundary region of the glass panel 310. A second dielectric substrate 1010$b$ or heating pads 360$a$ and 360$b$ corresponding to a feeding substrate may be disposed on the opaque region 312. A second dielectric substrate 1010$b$ disposed on the opaque region 312 may be referred to as an opaque substrate. Even when the antenna assembly 1000 is disposed on the entire region of the glass panel 310 as illustrated in FIG. 5C, the heating pads 360$a$ and 360$b$ may be disposed on the opaque region 312.

Referring to FIG. 5B, the antenna assembly 1000 may include the first transparent dielectric substrate 1010$a$ and the second dielectric substrate 1010$b$. Referring to FIGS. 5B and 5C, the antenna assembly 1000 may include the antenna module 1100 formed of conductive patterns and the second dielectric substrate 1010$b$. The antenna module 1100 may be formed of a transparent electrode part to be implemented as a transparent antenna module. The antenna module 1100 may be formed of one or more antenna elements. The antenna module 1100 may include a MIMO antenna and/or other antenna elements for wireless communication. The other antenna elements may include at least one of GNSS/radio/broadcasting/WiFi/satellite communication/UWB, and remote keyless entry (RKE) antennas for vehicle applications.

Referring to FIGS. 5A to 5C, the antenna assembly 1000 may be interfaced with the telematics control unit (TCU) 300 through the connector part 313. The connector part 313 may have a connector 313$c$ on an end portion of a cable to be electrically connected to the TCU 300. A signal pattern formed on the second dielectric substrate 1010$b$ of the antenna assembly 1000 may be connected to the TCU 300 through the connector part 313 such as a coaxial cable. The antenna module 1100 may be electrically connected to the TCU 300 through the connector part 313. The TCU 300 may be disposed inside a vehicle, but is not limited thereto. The TCU 300 may be disposed on a dashboard inside the vehicle or a ceiling region inside the vehicle, but is not limited thereto.

Meanwhile, when the transparent antenna assembly according to the present disclosure is attached to the inside or surface of the glass panel 310, a transparent electrode part including an antenna pattern and a dummy pattern may be disposed on the transparent region 311. On the other hand, an opaque substrate part may be disposed on the opaque region 312.

Figure 6A:
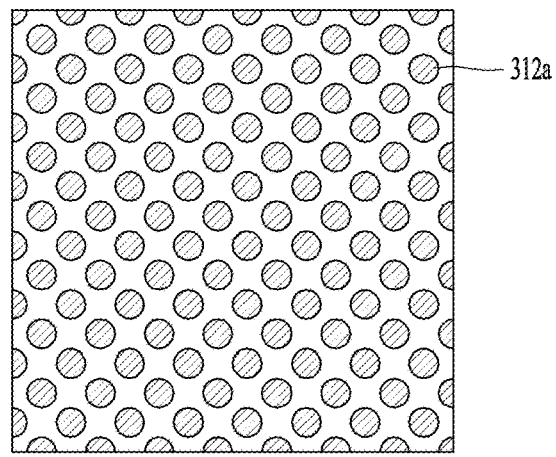
FIG. 6A illustrates various embodiments of a frit pattern according to the present disclosure.
Figure 6A:
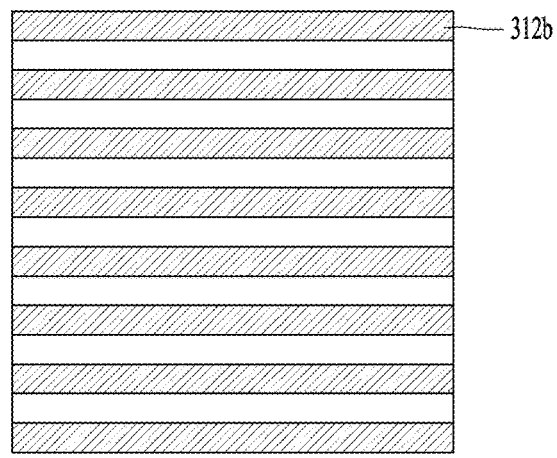
Figure 6A:
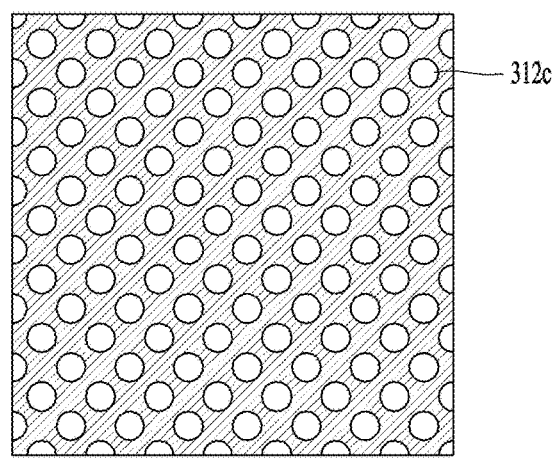
Figure 6B:
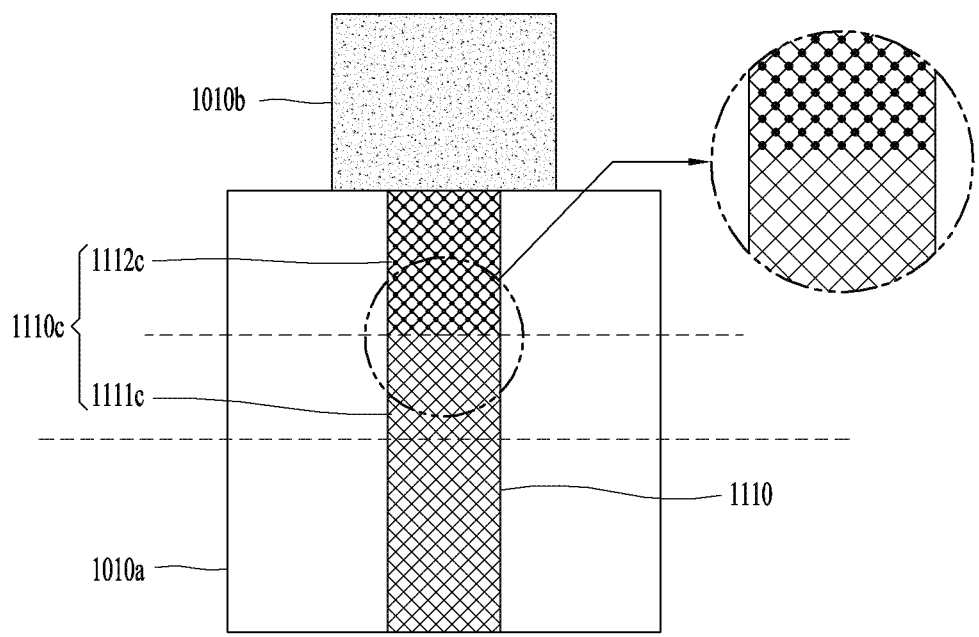
FIGS. 6B and 6C are diagrams illustrating a transparent antenna pattern and a structure in which the transparent antenna pattern is disposed on vehicle glass according to embodiments.
Figure 6B:
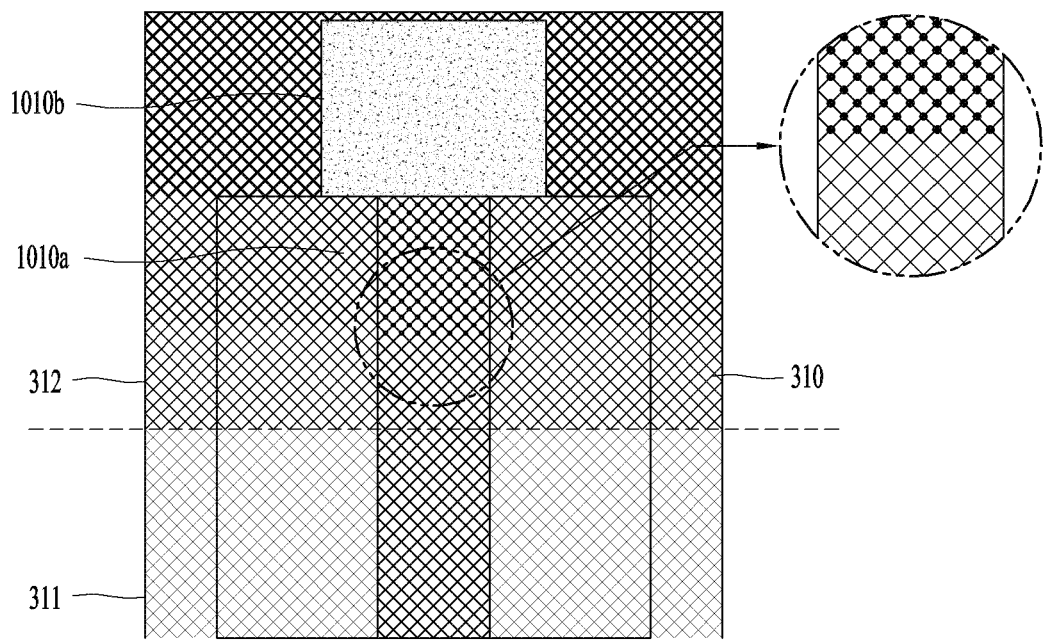
Figure 6C:
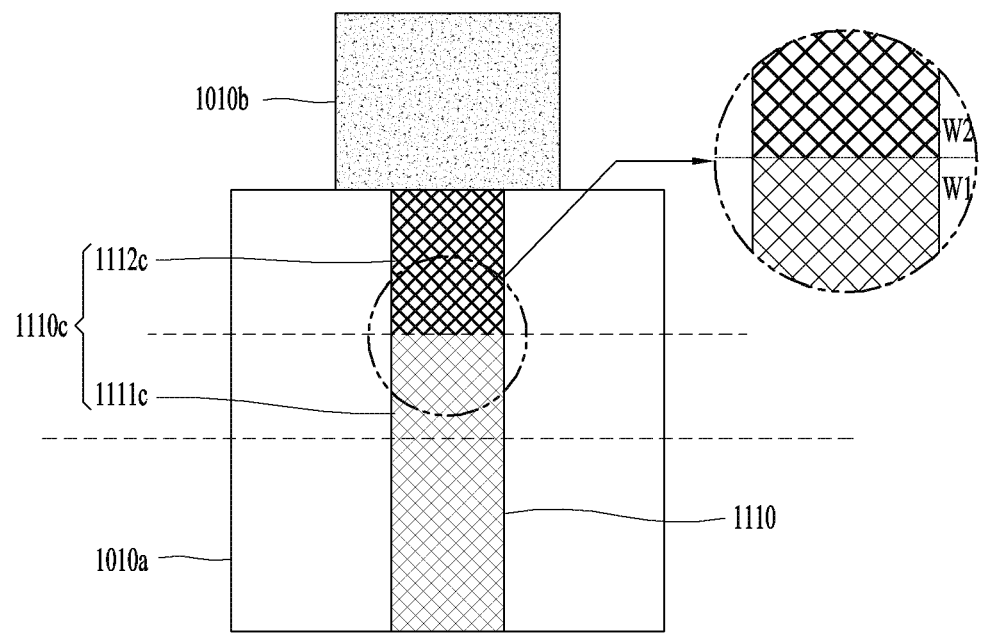
Figure 6C:
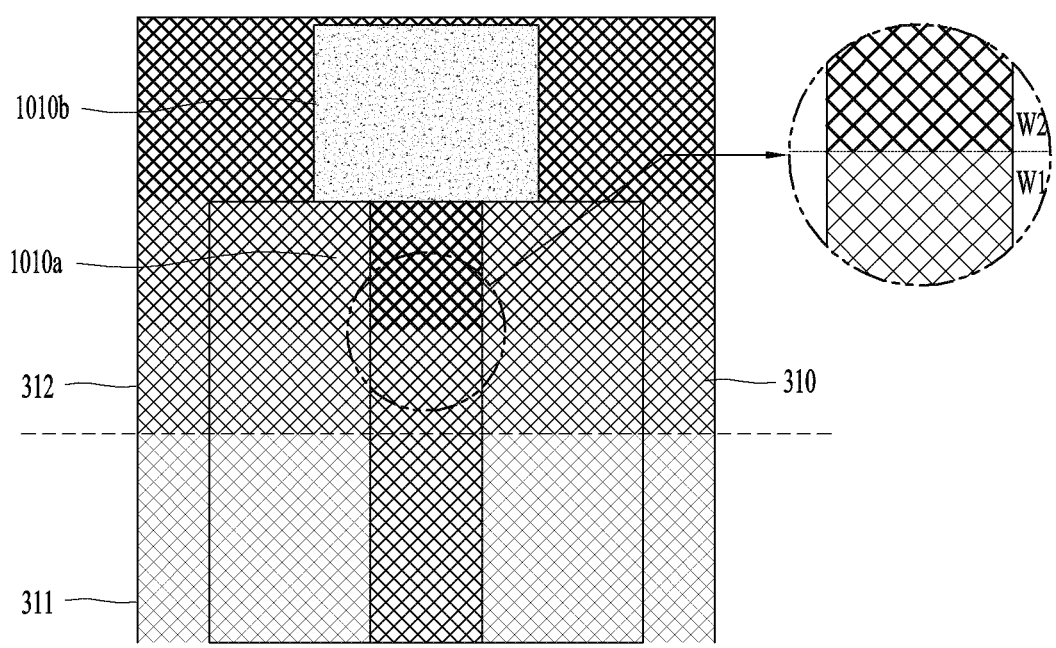

The antenna assembly formed on the vehicle glass according to the present disclosure may be disposed on the transparent region and the opaque region. In this regard, FIG. 6A illustrates various embodiments of a frit pattern according to the present disclosure. FIGS. 6B and 6C are diagrams illustrating a transparent antenna pattern and a structure in which the transparent antenna pattern is disposed on a vehicle glass according to embodiments.

Referring to (a) of FIG. 6A, the frit pattern 312a may be formed as a metal pattern in a circular (polygonal, or oval) shape with a certain diameter. The frit pattern 312a may be disposed in a two-dimensional (2D) structure in both axial directions. The frit pattern 312a may be formed in an offset structure where center points between patterns forming adjacent rows are spaced apart by a certain distance.

Referring to (b) of FIG. 6A, the frit pattern 312b may be formed as a rectangular pattern in one axial direction. The frit pattern 312c may be disposed in a one-dimensional structure in one axial direction or in a two-dimensional structure in both axial directions.

Referring to (c) of FIG. 6A, the frit pattern 312c may be formed as a slot pattern, from which a metal pattern has been removed, in a circular (polygonal or oval) shape with a certain diameter. The frit pattern 312b may be disposed in a two-dimensional (2D) structure in both axial directions. The frit pattern 312c may be formed in an offset structure where center points between patterns forming adjacent rows are spaced apart by a certain distance.

Referring to FIGS. 5A to 6C, the opaque substrate 1010b and the transparent substrate 1010a may be electrically connected on the opaque region 312. In this regard, a dummy pattern, which is electrically very small to be a certain size or less, may be disposed adjacent to the antenna pattern to secure non-visibility of a transparent antenna pattern. Accordingly, the pattern within the transparent electrode can be made invisible to the naked eye without deterioration of antenna performance. The dummy pattern may be designed to have light transmittance similar to that of the antenna pattern within a certain range.

The transparent antenna assembly including the opaque substrate 1010b bonded to the transparent electrode part may be mounted on the glass panel 310. In this regard, to ensure invisibility, the opaque substrate 1010b connected to an RF connector or coaxial cable is disposed on the opaque region 312 of the vehicle glass. Meanwhile, the transparent electrode part may be disposed in the transparent region 311 of the vehicle glass to ensure the invisibility of the antenna from outside of the vehicle glass.

A portion of the transparent electrode part may be attached to the opaque region 312 in some cases. The frit pattern of the opaque region 312 may be gradated from the opaque region 312 to the transparent region 311. Transmission efficiency of a transmission line can be improved while the invisibility of the antenna can be improved in a manner of matching the light transmittance of the frit pattern with the light transmittance of the transparent electrode part within a certain range. Meanwhile, a metal mesh shape similar to the frit pattern can reduce sheet resistance while ensuring invisibility. In addition, the risk of disconnection of the transparent electrode layer during manufacturing and assembly can be reduced by increasing a line width of a metal mesh grid in a region connected to the opaque substrate 1010b.

Referring to (a) of FIGS. 6A and 6B, a conductive pattern 1110 of the antenna module may include metal mesh grids with the same line width on the opaque region 312. The conductive pattern 1110 may include a connection pattern 1110c for connecting the transparent substrate 1010a and the opaque substrate 1010b. On the opaque region 312, the connection pattern 1110c and the frit patterns of a predetermined shape on both side surfaces of the connection pattern 1110c may be disposed at certain intervals. The connection pattern 1110c may include a first penetration ratio portion 1111c formed with a first penetration ratio and a second penetration ratio portion 1112c formed with a second penetration ratio.

The frit patterns 312a formed on the opaque region 312 may include metal grids of a certain diameter arranged in one axial direction and another axial direction. The metal grids of the frit patterns 312a are the second penetration ratio portion 1112c of the connection pattern 1110c may be disposed at intersections of the metal mesh grids.

Referring to (b) of FIGS. 6A and 6B, the frit patterns 312b formed in the opaque region 312 may include slot grids of a certain diameter, from which the metal region has been removed, disposed in one axial direction and another axial direction. The slot grids of the frit patterns 312b may be disposed between the metal mesh grids in the connection pattern 1110c. Accordingly, the metal regions of the frit patterns 312b where slot grids are not formed may be disposed at the intersections of the metal mesh grids.

Referring to FIGS. 6A and 6C, the connection pattern 1110c may include metal mesh grids with a first line width W1 in the first penetration ratio portion 1111c adjacent to the transparent region 311. The connection pattern 1110c may be formed with a second line width W2 thicker than the first line width W1 in the second penetration ratio portion 1112c adjacent to the opaque substrate 1010b. In this regard, the first transparency of the first penetration ratio portion 1111c may be set higher than the second transparency of the second penetration ratio portion 1112c.

When the transparent antenna assembly is attached to the inside of the vehicle glass as illustrated in FIGS. 5A to 5C, the transparent electrode part may be disposed on the transparent region 311 and the opaque substrate 1010b may be disposed on the opaque region 312. In this regard, the transparent electrode part may be disposed on the opaque region 312 in some cases.

Metal patterns of a low-transmittance pattern electrode part and a high-transmittance pattern electrode part located on the opaque region 312 may partially be disposed in a gradient region of the opaque region 312. If the antenna pattern and a transmission line portion of the low-transmittance pattern electrode part is configured as a transparent electrode, a decrease in antenna gain may be caused by a decrease in transmission efficiency due to an increase in sheet resistance. As a way to overcome this loss of gain, the transmittance of the frit pattern 312 where an electrode is located and the transmittance of the transparent electrode can be made to match each other within a certain range.

Low sheet resistance can be achieved by increasing the line width of the transparent electrode located on a region where the transmittance of the frit pattern 312a, 312b, 312c is low or by adding the same shape as that of the frit pattern 312a, 312b, 312c. Accordingly, invisibility can be secured while solving the problem of reduced transmission efficiency. The transmittance and pattern of the opaque region 312 are not limited to those in the structure of FIG. 6A and may differ depending on a glass manufacturer or vehicle manufacturer. Accordingly, the shape and transparency (line width and spacing) of the transparent electrode of the transmission line can change in various ways.

Figure 7A:
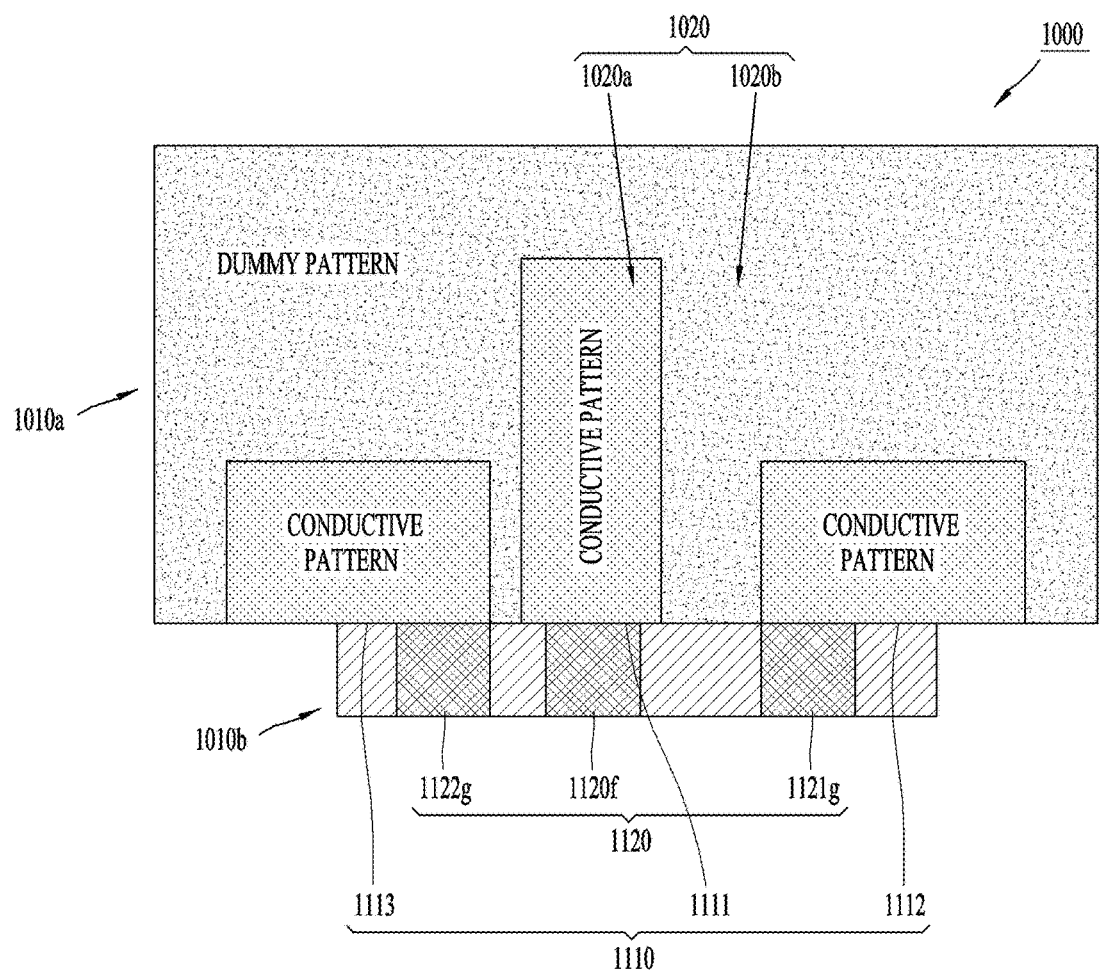
FIG. 7A shows a front view and a cross-sectional view of a transparent antenna assembly according to the present disclosure.
Figure 7A:
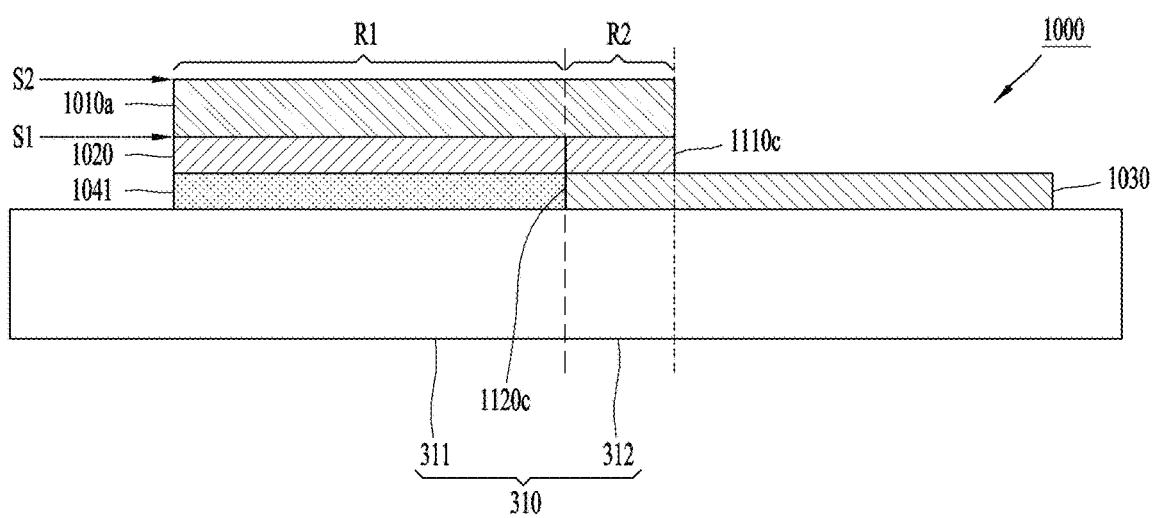
Figure 7B:
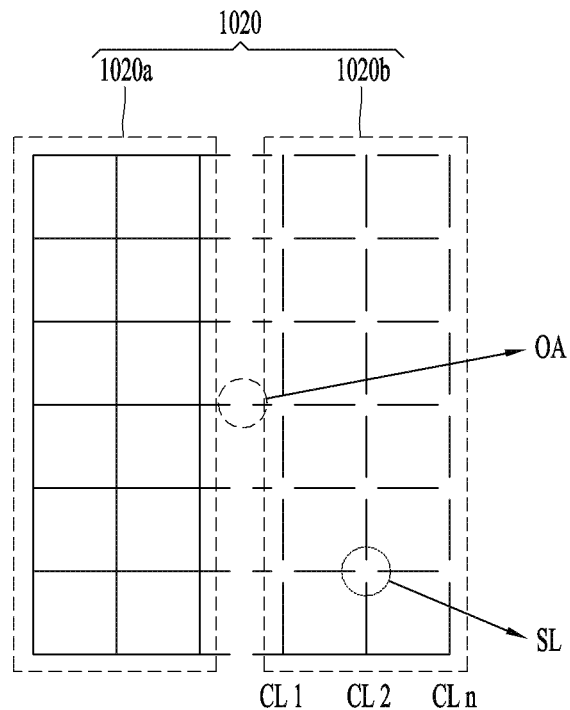
FIG. 7B is a diagram illustrating a grid structure of a metal mesh radiator region and a dummy metal mesh region according to embodiments.
Figure 7B:
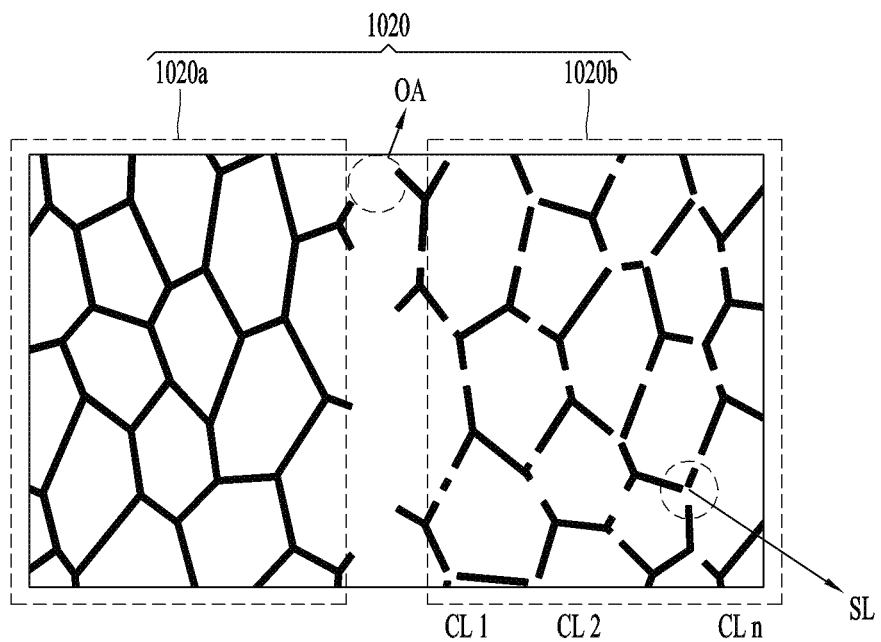

FIG. 7A shows a front view and a cross-sectional view of a transparent antenna assembly according to the present disclosure. FIG. 7B is a diagram illustrating a grid structure of a metal mesh radiator region and a dummy metal mesh region according to embodiments.

(a) of FIG. 7A illustrates a front view of the transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include the first transparent dielectric substrate 1010*a* and the second dielectric substrate 1010*b*. Conductive patterns 1110 that act as radiators may be disposed on one surface of the first transparent dielectric substrate 1010*a*. A feeding pattern 1120*f* and ground patterns 1121*g* and 1122*g* may be formed on one surface of the second dielectric substrate 1010*b*. The conductive patterns 1110 acting as radiators may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as transparent antennas. Referring to FIG. 7B, the conductive patterns 1110 may be metal grid patterns 1020*a* with a certain line width or less to form a metal mesh radiator region. Dummy metal grid patterns 1020*b* may be formed in inner regions between or outer regions of the first to third patterns 1111, 1112, and 11113 of the conductive patterns 1100 to maintain transparency at a certain level. The metal grid patterns 1020*a* and the dummy metal grid patterns 1020*b* may form a metal mesh layer 1020.

(a) of FIG. 7B illustrates a typical structure of the metal grid patterns 1020*a* and the dummy metal grid patterns 1020*b*. (b) of FIG. 7 illustrates an atypical structure of the metal grid patterns 1020*a* and the dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as feeding lines or radiators. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have end portions disconnected from each other to form an open area OA, thereby being electrically disconnected. The dummy metal grid patterns 1020*b* may have slits SL formed so that end portions of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have end portions disconnected from each other to form the open area OA, thereby being electrically disconnected. The dummy metal grid patterns 1020*b* may have slits SL formed so that end portions of mesh grids CL1, CL2, . . . , CLn are not connected.

Figure 8A:
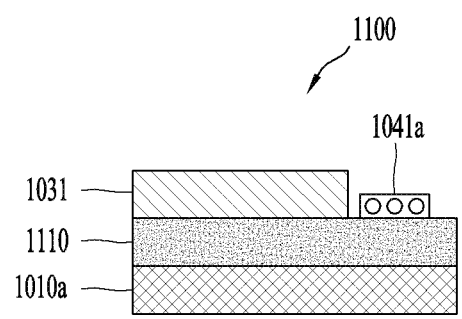
FIG. 8A is a diagram illustrating a layered structure of an antenna module and a feeding module according to the present disclosure.
Figure 8A:
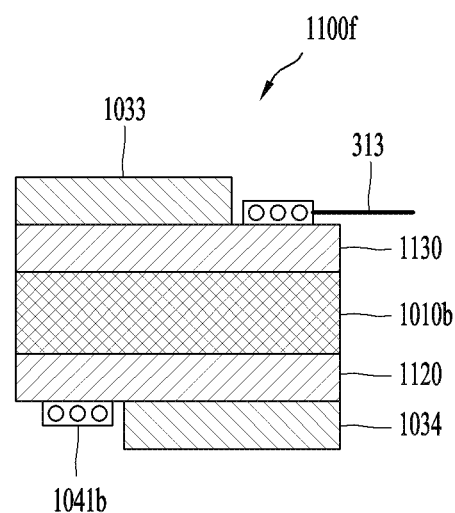
Figure 8B:
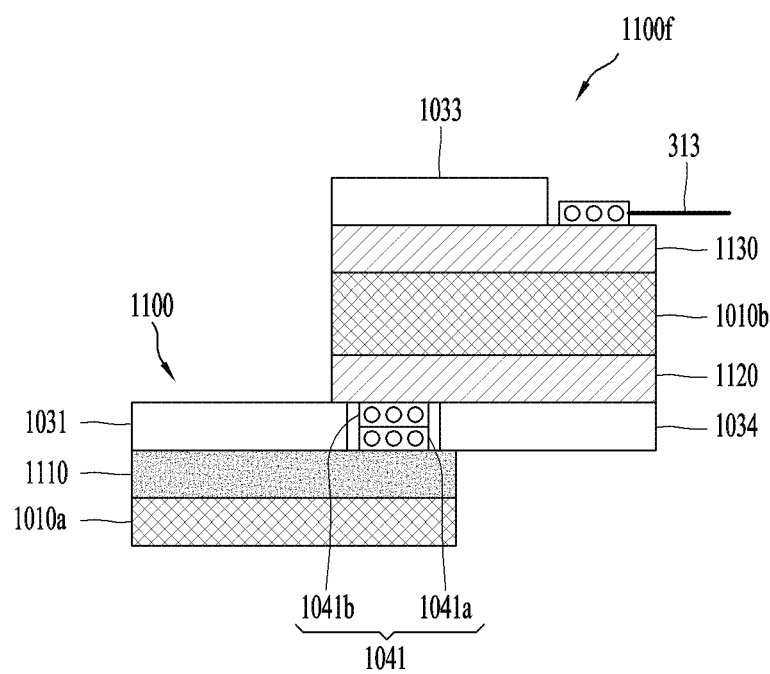
FIG. 8B is a diagram illustrating an opaque substrate including the layered structure of the antenna module and the feeding structure of FIG. 8A coupled to each other, and a coupled portion.
Figure 8B:
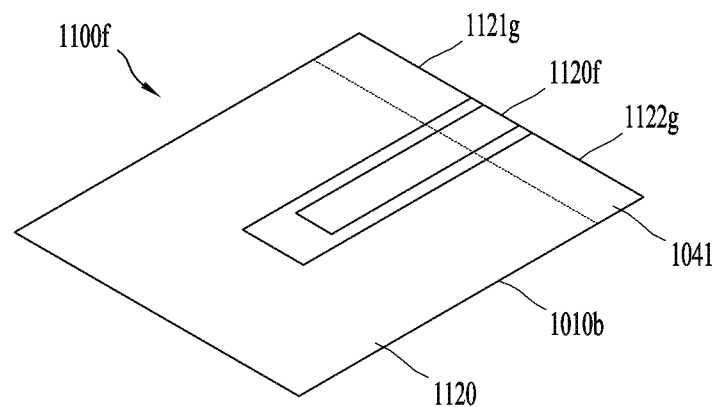

Meanwhile, the transparent substrate on which the transparent antenna according to the present disclosure is formed may be disposed on the vehicle glass. In this regard, FIG. 8A illustrates a layered structure of an antenna module and a feeding pattern. FIG. 8B illustrates an opaque substrate including the layered structure, in which the antenna module and the feeding structure are coupled to each other, and a coupled portion.

Referring to (a) of FIG. 8A, the antenna module 1100 may include a first transparent dielectric substrate 1010*a* formed on a first layer, and a first conductive pattern 1110 formed on a second layer disposed on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* disposed on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be disposed on one surface of the second dielectric substrate 1010*b* implemented as an opaque substrate. The third conductive pattern 1130 may be disposed on another surface of the second dielectric substrate 1010*b*. The first protective layer 1033 may be formed on the top of the third conductive pattern 1130. The second protective layer 1034 may be formed on the bottom of the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on the top of the first transparent dielectric substrate 1010*a*. The protective layer 1031 may be formed on the top of the first conductive pattern 1110. The protective layer 1031 and the first adhesive layer 1041*a* may be formed on the top of the first conductive pattern 1110. The first adhesive layer 1041*a* may be formed adjacent to the protective layer 1031.

The first adhesive layer 1041*a* formed on the top of the first conductive pattern 1110 may be bonded to the second adhesive layer 1041*b* formed on the bottom of the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding patterns formed on the second dielectric substrate 1010*b*.

The second dielectric substrate 1010*b* may be formed as the feeding structure 1100*f* that have the second conductive pattern 1120 and the third conductive pattern 1130 disposed on one surface and another surface thereof. The feeding structure 1100*f* may be implemented as a flexible printed circuit board (FPCB), but is not limited thereto. The first protective layer 1033 may be disposed on the top of the third conductive pattern 1130, and the second protective layer 1034 may be disposed on the bottom of the second conductive pattern 1120. The adhesive layer 1041*b* on the bottom of the third conductive pattern 1130 may be bonded to the adhesive layer 1041*a* of the antenna module 1100. Accordingly, the feeding structure 1100f may be coupled with the antenna module 1100 and the first and second conductive patterns 1110 and 1120 may be electrically connected.

The antenna module 1100 implemented with the first transparent dielectric substrate 1010a may be formed to have a first thickness. The feeding structure 1100f implemented with the second dielectric substrate 1010b may be formed to have a second thickness. For example, the thicknesses of the dielectric substrate 1010a, the first conductive pattern 1110, and the protective layer 1031 of the antenna module 1100 may be 75 μm, 9 μm, and 25 μm, respectively. The first thickness of the antenna module 1100 may be 109 um. The thicknesses of the second dielectric substrate 1010b, the second conductive pattern 1120, and the third conductive pattern 1130 of the feeding structure 1100f may be 50 um, 18 um, and 18 um, respectively, and the thicknesses of the first and second protective layers 1033 and 1034 may be 28 um. Accordingly, the second thickness of the feeding structure 1100f may be 142 um. Since the adhesive layers 1041a and 1041b are formed on the top of the first conductive pattern 1110 and the bottom of the second conductive pattern 1120, the entire thickness of the antenna assembly may be smaller than the sum of the first thickness and the second thickness. For example, the antenna assembly 1000 including the antenna module 1100 and the feeding structure 1100f may have a thickness of 198 um.

Referring to (b) of FIG. 8B, the conductive pattern 1120 may be formed on one surface of the second dielectric substrate 1010b forming the feeding structure 1100f. The conductive pattern 1120 may be formed in a CPW type feeding structure that includes the feeding pattern 1120f and ground patterns 1121g and 1122g formed on both sides of the feeding pattern 1120f. The feeding structure 1100f may be coupled with the antenna module 1100, as illustrated in (a) of FIG. 8B, through a region where the adhesive layer 1041 is formed.

The antenna module and the feeding structure constituting the antenna assembly according to the present disclosure may be disposed on the vehicle glass and coupled through a specific coupling structure. In this regard, FIG. 9A illustrates a coupling structure of a transparent antenna that is disposed on a transparent region and a frit region of a vehicle glass.

Figure 9A:
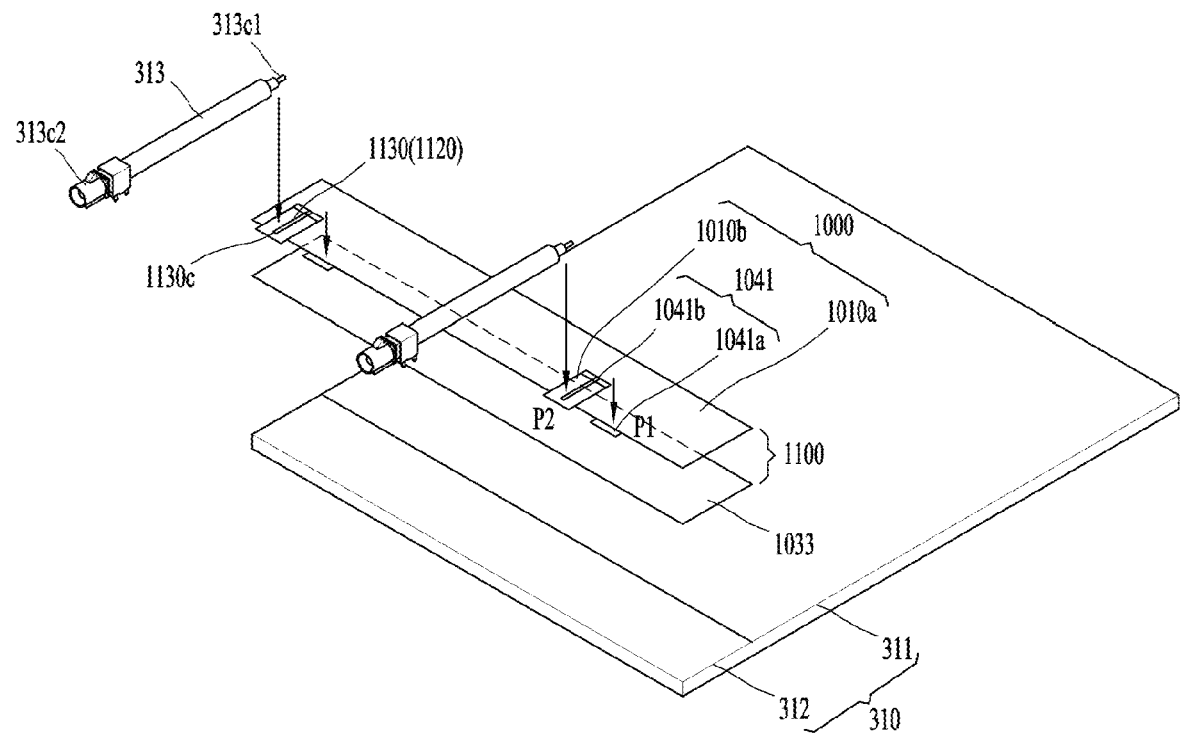
FIG. 9A is a diagram illustrating a coupling structure of a transparent antenna that is disposed on a transparent region and a frit region of a vehicle glass.

Referring to FIG. 9A, the first transparent dielectric substrate 1010a may be adhered to the glass panel 310 through the adhesive layer 1041. The conductive pattern of the first transparent dielectric substrate 1010a may be bonded to the conductive pattern 1130 of the second dielectric substrate 1010b through ACF bonding. ACF bonding involves bonding a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal ball therebetween. ACF bonding electrically connects conductive patterns and simultaneously provides adhesive strength by thermally hardening the adhesive layer 1041.

The first transparent dielectric substrate 1010a on which the transparent electrode layer is formed and the second dielectric substrate 1010b in the form of the FPCB may be attached to each other using a local soldering technique. The connection pattern of the FPCB and the transparent antenna electrode may be connected through local soldering using a coil in a magnetic field induction manner. During such local soldering, the FPCB can be maintained flat without deformation due to an increase in temperature of a soldered portion. Accordingly, an electrical connection with high reliability can be achieved through the local soldering between the conductive patterns of the first transparent dielectric substrate 1010a and the second dielectric substrate 1010b.

The first transparent dielectric substrate 1010a, and the metal mesh layer 1020 of FIG. 7A, the protective layer 1033, and the adhesive layer 1041 may form a transparent electrode. The second dielectric substrate 1010b, which is an opaque substrate, may be implemented as the FPCB, but is not limited thereto. The second dielectric substrate 1010b, which is the FPCB with the feeding pattern, may be connected to the connector part 313 and the transparent electrode.

The second dielectric substrate 1010b, which is the opaque substrate, may be attached to a partial region of the first transparent dielectric substrate 1010a. The first transparent dielectric substrate 1010a may be formed on the transparent region 311 of the glass panel 310. The second dielectric substrate 1010b may be formed in the opaque region 312 of the glass panel 310. The partial region of the first transparent dielectric substrate 1010a may be formed in the opaque region 312, and the first transparent dielectric substrate 1010a may be coupled to the second dielectric substrate 1010b on the opaque region 312.

The first transparent dielectric substrate 1010a and the second dielectric substrate 1010b may be adhered by bonding between the adhesive layers 1041a and 1041b. A position at which the second dielectric substrate 1010b is bonded to the adhesive layer 1041 may be set to a first position P1. A position at which the connector part 313 is soldered to the opaque substrate 1010b may be set to a second position P2.

Figure 9B:
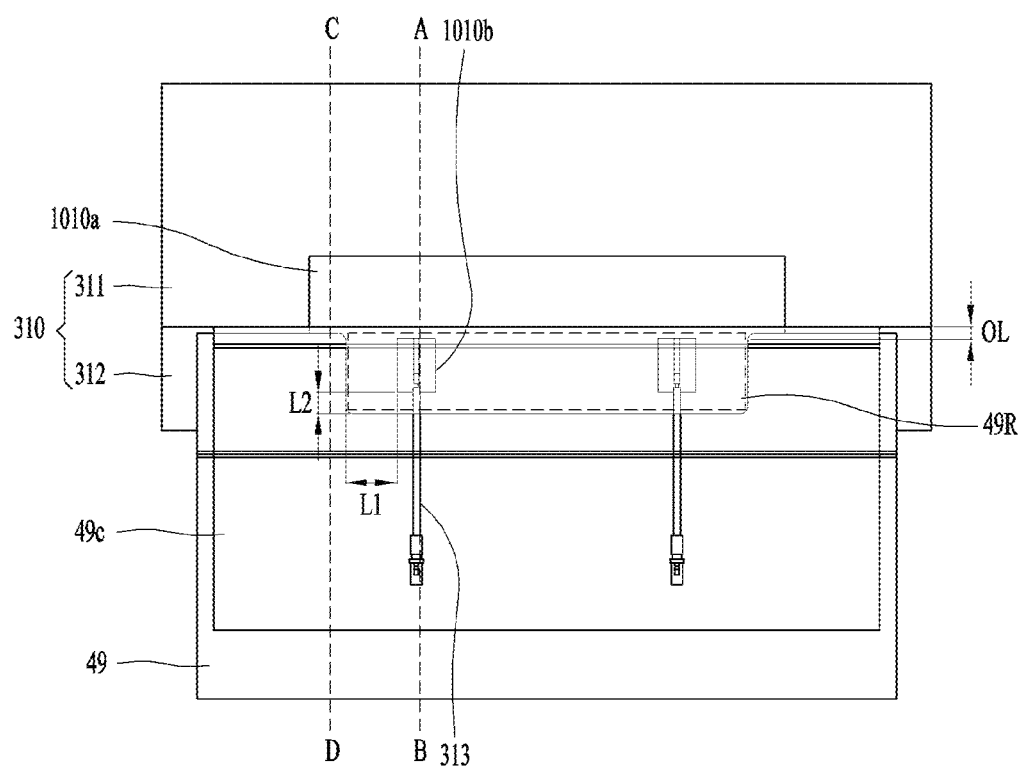
FIG. 9B is an enlarged front view of a region where glass with the transparent antenna of FIG. 9A is coupled to a body structure of the vehicle.
Figure 9C:
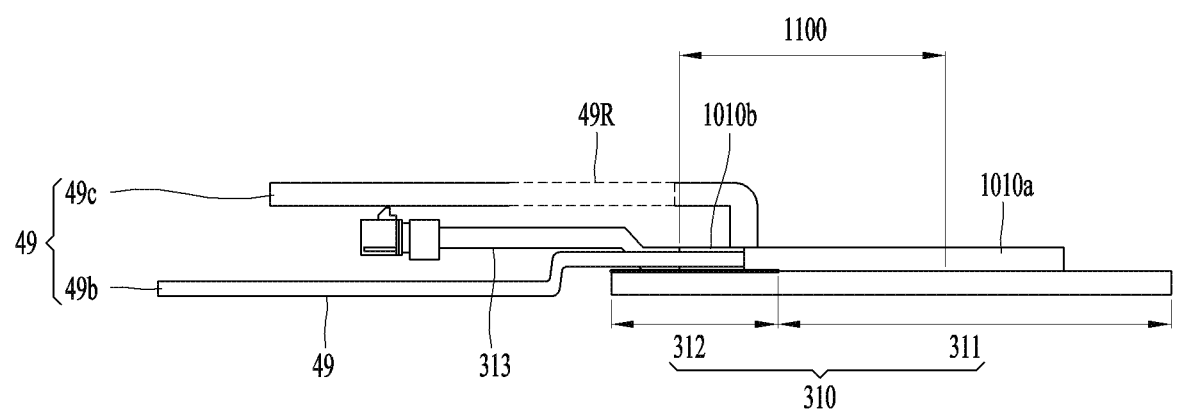
FIG. 9C is a cross-sectional view illustrating the coupling structure between the vehicle glass and the body structure of FIG. 9B, viewed from different positions.
Figure 9C:
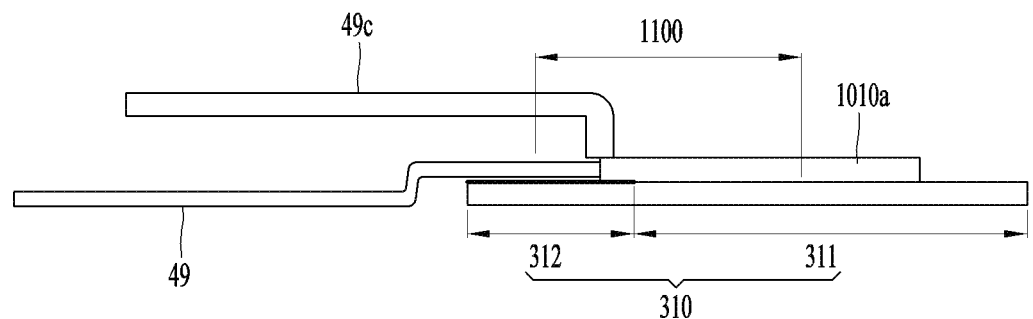

Meanwhile, the vehicle glass on which the antenna assembly according to the present disclosure is formed may be coupled to a body structure of the vehicle. In this regard, FIG. 9B is an enlarged front view of a region where glass with the transparent antenna of FIG. 9A is coupled to a body structure of the vehicle. FIG. 9C is a cross-sectional view illustrating the coupling structure between the vehicle glass and the body structure of FIG. 9B, viewed from different positions.

Referring to FIG. 9B, the first transparent dielectric substrate 1010a on which a transparent antenna is formed may be disposed on the transparent region 311 of the glass panel 310. A second dielectric substrate 1010b may be disposed on the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010a on which the transparent antenna is formed may extend up to the opaque region 312 corresponding to the BM region. The first transparent dielectric substrate 1010a and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010a on which the transparent antenna is formed may be disposed on the transparent region 311 of the glass panel 310. The second dielectric substrate 1010b may be disposed on the opaque region 312 of the glass panel 310. The partial region of the first transparent dielectric substrate 1010a may extend up to the opaque region 312, so that the feeding pattern formed on the second dielectric substrate 1010b and the metal mesh layer of the transparent antenna can be bonded to each other.

An interior cover 49c may be configured to accommodate the connector part 313 connected to the second dielectric substrate 1010b. The connector part 313 may be disposed in a space between a body 49b made of a metal material and the interior cover 49c, and the connector part 313 may be coupled to an in-vehicle cable. The interior cover 49c may be disposed on an upper region of the body 49b made of the metal material. The interior cover 49c may be formed with one end portion bent to be coupled to the body 49b made of the metal material.

The interior cover 49c may be made of a metal material or dielectric material. When the interior cover 49c is made of the metal material, the interior cover 49c and the body 49b made of the metal material constitute a metal frame 49. In this regard, the vehicle may include the metal frame 49. The opaque region 312 of the glass panel 310 may be supported by a portion of the metal frame 49. To this end, a portion of the body 49b of the metal frame 49 may be bent to be coupled to the opaque region 312 of the glass panel 310.

When the interior cover 49c is made of the metal material, at least a portion of a metal region of the interior cover 49c on the upper region of the second dielectric substrate 1010b may be removed. A recess portion 49R from which the metal region has been removed may be formed in the interior cover 49c. Accordingly, the metal frame 49 may include the recess portion 49R. The second dielectric substrate 1010b may be disposed within the recess portion 49R of the metal frame 49.

The recess portion 49R may also be referred to as a metal cut region. One side of the recess portion 49R may be formed to be spaced apart from one side of the opaque substrate 1010b by a first length L1 which is equal to or greater than a threshold value. A lower boundary side of the recess portion 49R may be formed to be spaced apart from a lower boundary side of the opaque substrate 1010b by a second length L2 which is equal to or greater than a threshold value. As a metal is removed from a partial region of the interior cover 49c made of the metal material, signal loss and changes in antenna characteristics due to a surrounding metal structure can be suppressed.

Referring to FIG. 9B and (b) of FIG. 9C, a recess portion like a metal cut region may not be formed in the interior cover 49c on a region where the connector part and the opaque substrate are not disposed. In this regard, while protecting the internal components of the antenna module 1100 by use of the interior cover 49c, internal heat can be dissipated to the outside through the recess portion 49R of FIG. 9B and (a) of FIG. 9C. In addition, whether it is necessary to repair a connected portion can be immediately determined through the recess portion 49R of the interior cover 49c. Meanwhile, a recess portion may not be formed in the interior cover 49c on the region where the connector part and the second dielectric substrate are not disposed, which may result in protecting the internal components of the antenna module 1100.

Meanwhile, the antenna assembly 1000 according to the present disclosure may be formed in various shapes on the glass panel 310, and the glass panel 310 may be attached to the vehicle frame. In this regard, FIG. 10 illustrates a stacked structure of an antenna assembly and an attachment region between a vehicle glass and a vehicle frame according to embodiments.

Figure 10:
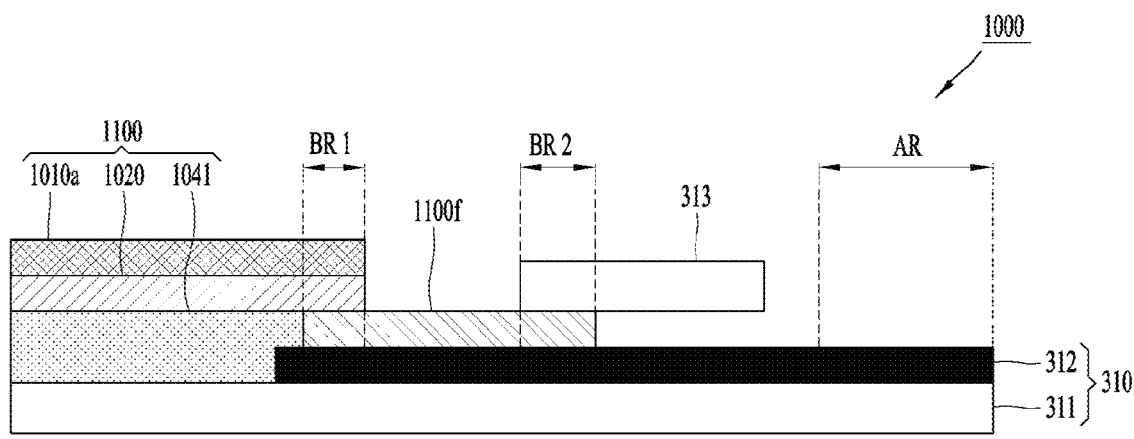
FIG. 10 is a diagram illustrating a stacked structure of an antenna assembly and an attachment region between a vehicle glass and a vehicle frame according to embodiments.
Figure 10:
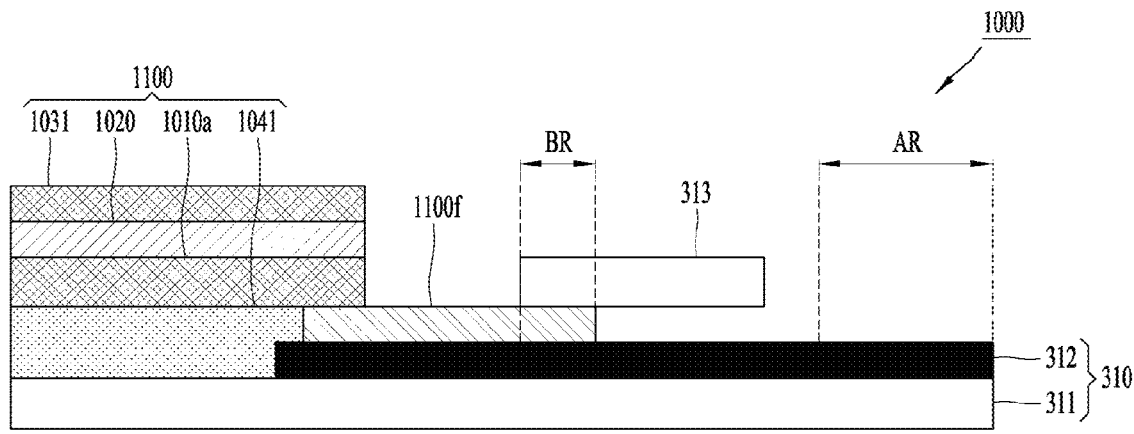

Referring to (a) of FIG. 10, the glass panel 310 may include the transparent region 311 and the opaque region 312. The antenna assembly 1000 may include the antenna module 1100 and the feeding structure 1100f. The antenna module 1100 may include the first transparent dielectric substrate 1010a, the transparent electrode layer 1020, and the adhesive layer 1041. The feeding structure 1100f implemented as the opaque region and the transparent electrode layer 1020 implemented as the transparent substrate may be electrically connected to each other. The feeding structure 1100f and the transparent electrode layer 1020 may be directly connected through a first bonding region BR1. The feeding structure 1100f and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area on the opaque region 312 of the glass panel 310.

Referring to (b) of FIG. 10, the glass panel 310 may include the transparent region 311 and the opaque region 312. The antenna assembly 1000 may include the antenna module 1100 and the feeding structure 1100f. The antenna module 1100 may include the protective layer 1031, the transparent electrode layer 1020, the first transparent dielectric substrate 1010a, and the adhesive layer 1041. The feeding structure 1100f implemented as the opaque region may overlap a partial region of the antenna module 1100 implemented as the transparent substrate. The feeding structure 1100f and the transparent electrode layer 1020 of the antenna module 1100 may be connected in a coupling feeding manner. The feeding structure 1100f and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area of the opaque region 312 of the glass panel 310.

Referring to (a) and (b) of FIG. 10, the transparent substrate 1010a may include a (hard) coating layer to protect the transparent electrode layer 1020 from an external environment. Meanwhile, a UV-cut component may be added to the adhesive layer 1041 to suppress yellowing from sunlight.

Figure 11A:
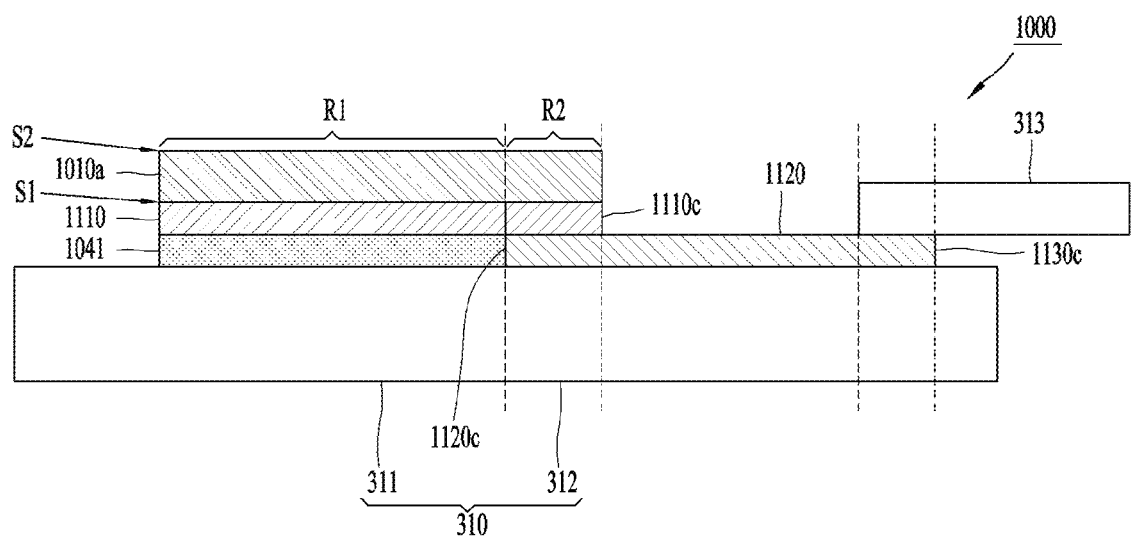
FIG. 11A is a cross-sectional view of an antenna assembly according to an aspect of the present disclosure and shows a structure in which an antenna module and a feeding structure are coupled to each other.
Figure 11A:
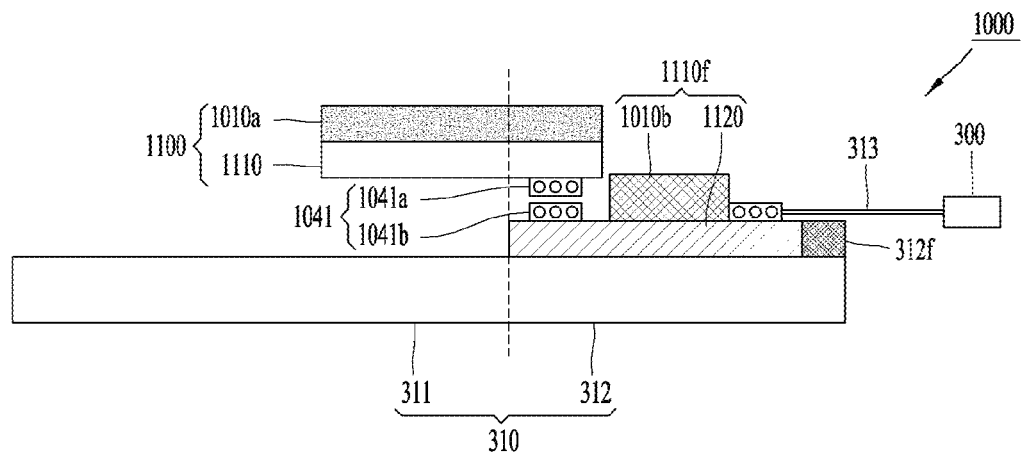
Figure 11B:
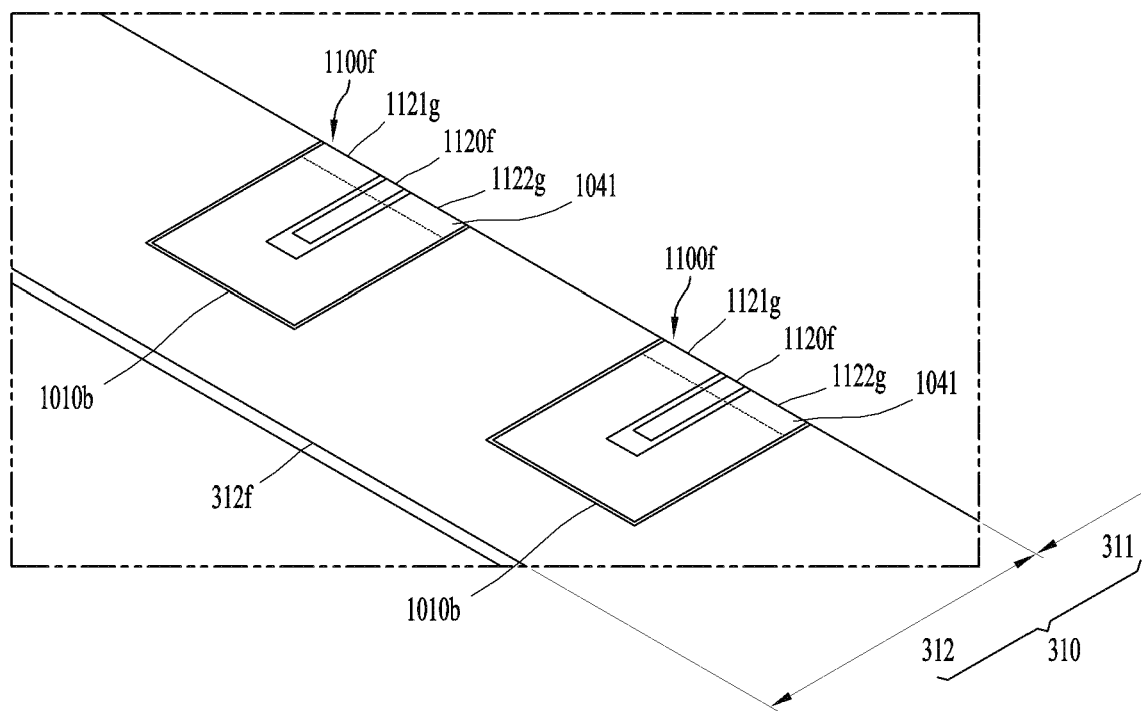
FIG. 11B is a diagram illustrating a structure in which a feeding structure is disposed on a region from which a portion of a frit region has been removed.
Figure 12:
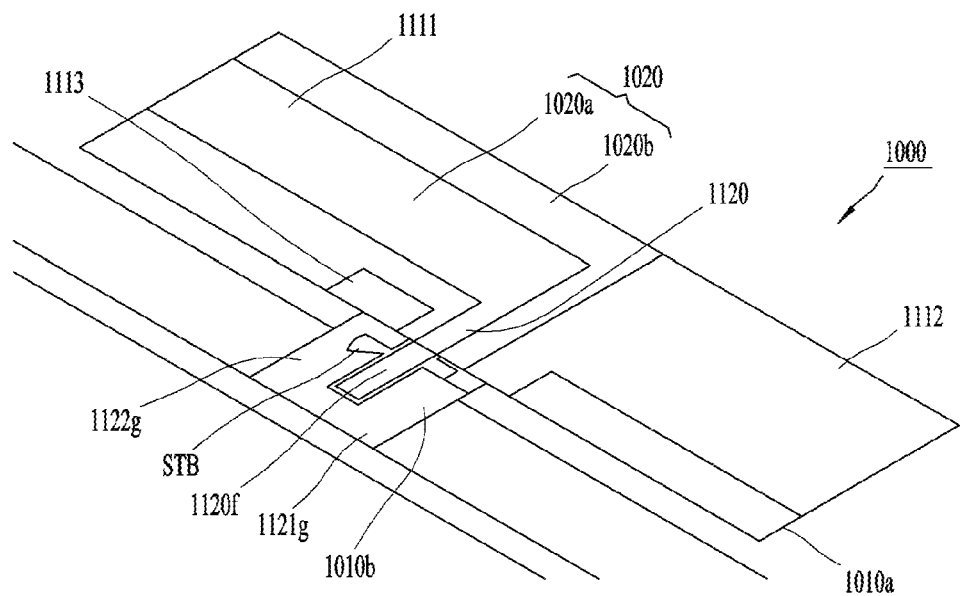
FIG. 12 is a front view illustrating an antenna assembly according to one example with respect to the antenna assembly of FIG. 11A.
Figure 12:
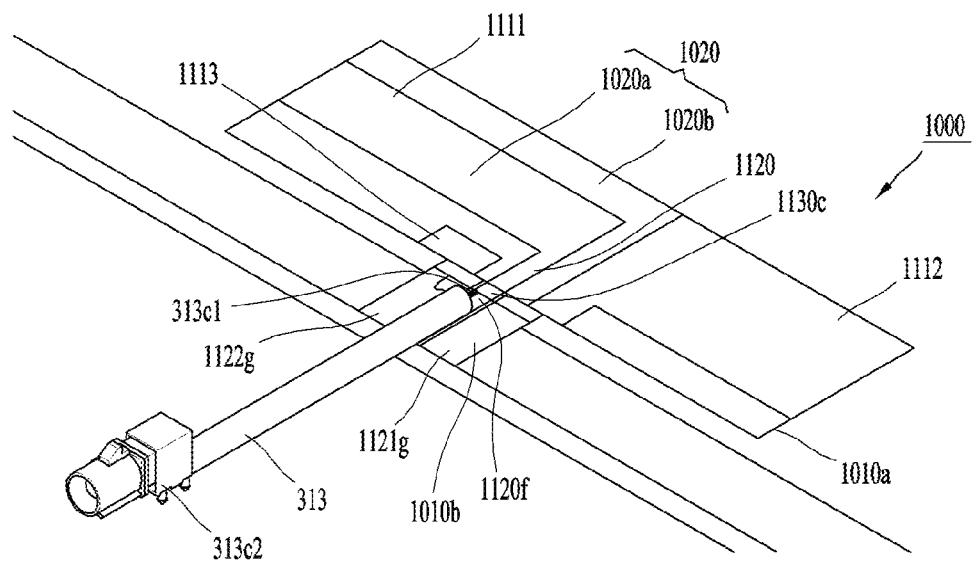

Hereinafter, an antenna assembly 1000 having a coupling structure according to embodiments will be described with reference to FIGS. 5A to 10. FIG. 11A is a cross-sectional view of an antenna assembly according to an aspect of the present disclosure and shows a structure in which an antenna module and a feeding structure are coupled to each other. FIG. 11B is a diagram illustrating a structure in which a feeding structure is disposed on a region from which a portion of a frit region has been removed. FIG. 12 is a front view illustrating an antenna assembly according to one example with respect to the antenna assembly of FIG. 11A.

(a) of FIG. 11A is a cross-sectional view of the antenna assembly 1000 according to the present disclosure, showing a stacked structure in which each layer of the antenna assembly 1000 is stacked. (b) of FIG. 11A shows a coupled stacked structure of the antenna assembly 1000 in which the antenna module 1100 and the feeding structure 1100f are coupled to each other.

Referring to FIG. 11B, the feeding structure 1100f may be disposed on a specific portion of the opaque region 312 of the glass panel 310. A frit pattern 312f may be removed from the specific portion of the opaque region 312 and the feeding structure 1100f may be disposed on the specific portion. The feeding structure 1100f may be provided in plurality to feed a plurality of antenna elements. The feeding structure 1100*f* may be attached to the opaque region 312 of the glass panel 310 through the adhesive layer 1041. The feeding structure 1100*f* may be configured to include a feeding pattern 1120 and ground patterns 1121*g* and 1122*g* formed on both sides of the feeding pattern 1120. On a region where the adhesive layer 1041 is formed, the feeding structure 1100*f* may be adhered to the antenna module 1100 of FIG. 11A.

(a) of FIG. 12 shows a structure in which conductive patterns of the antenna module 1100 are connected to the connection patterns 1110*c*. (b) of FIG. 12 shows a structure in which the conductive patterns of the antenna module 1100 are connected to the connection patterns 1110*c* and the connection patterns 1110*c* are connected to the connector part 313.

Hereinafter, a vehicle having the antenna assembly 1000 according to the present disclosure will be described with reference to FIGS. 5A to 9 and FIGS. 11A to 12. The vehicle may be configured to include the glass panel 310 and the antenna assembly 1000 disposed on the glass panel 310. The glass panel 310 may include a transparent region 311 and an opaque region 312. A frit layer 312*f* may be disposed on a partial portion of the opaque region 312. The frit layer may be removed from the opaque region 312 where the conductive pattern 1120 of the feeding structure 1110*f* is disposed, so that the conductive patterns 1120 can be directly attached to the glass panel 310.

Referring to FIG. 11A, the antenna assembly 1000 may include the first transparent dielectric substrate 1010*a*, first conductive patterns 1110, and second conductive patterns 1120. The first conductive patterns 1110 may form a first conductive pattern layer on the first transparent dielectric substrate 1010*a*. The second conductive patterns 1120 may form a second conductive pattern layer on the opaque region 312 of the glass panel 310.

The first transparent dielectric substrate 1010*a* may include a first surface S1 and a second surface S2. The first surface S1 may be opposite to the second surface S2. The first surface S1 may face the glass panel 310, and the second surface S2 may face the inner side of the vehicle. The first surface S1 may include a first region R1 and a second region R2.

The first conductive patterns 1110 may be disposed on the first surface S1 of the first transparent dielectric substrate 1010*a*. The first surface S1 may include the first region R1 and the second region R2. The first region R1 may be disposed on the transparent region 311 of the glass panel 310. The second region R2 may be disposed on the opaque region 312 of the glass panel 310. Radiation patterns 1111, 1112, and 1113 of the first conductive patterns 1110 may be disposed on the first region R1 of the first surface S1. First connection patterns 1110*c* of the first conductive patterns 1110 may be disposed on the second region R2 of the first surface S1.

Second conductive patterns 1120 may be disposed on the inner surface of the glass panel 310. Second connection patterns 1120*c* of the second conductive patterns 1120 may be attached to the first connection patterns 1110*c*. The first connection patterns 1110*c* and the second connection patterns 1120*c* are formed on the first transparent dielectric substrate 1010*a* and the second dielectric substrate 1010*b*, respectively. Accordingly, the first transparent dielectric substrate 1010*a* and the second dielectric substrate 1010*b* on which the first and second connection patterns 1110 and 1120*c* are formed may be referred to as first and second connection PCBs, respectively.

Referring to FIGS. 7A and 12, the first conductive patterns 1110 may be configured to include a plurality of patterns that operate as radiators. With regard to this, the first conductive patterns 1110 may be configured to include a first pattern 1111, a second pattern 1112, and a third pattern 1113. The second conductive patterns 1120 may be configured to include a feeding pattern 1120*f*, a first ground pattern 1121*g*, and a second ground pattern 1122*g*.

The first pattern 1111 may be electrically connected to the feeding pattern 1120*f* of the second conductive pattern 1120. The second pattern 1112 may be electrically connected to the first ground pattern 1121*g* of the second conductive pattern 1120. The third pattern 1113 may be electrically connected to the second ground pattern 1122*g* of the second conductive pattern 1120. The feeding pattern 1120*f*, the first ground pattern 1121*g*, and the second ground pattern 1122*g* may be formed in a coplanar waveguide (CPW) structure on the same plane of the second dielectric substrate 1010*b*.

Referring to (a) of FIG. 12, in order to improve impedance matching characteristics in a specific frequency band, a stub STB from which a ground pattern has partially been removed may be formed on at least one region of the ground patterns 1121*g* and 1122*g*. Referring to (b) of FIG. 12, a Fakra cable 313 corresponding to a cable part may be electrically connected to the feeding pattern 1120*f*. The Fakra cable 330 may include a first connector 313*c*1 and a second connector 313*c*2. The first connector 313*c*1 may be electrically connected to the feeding pattern 1120*f* by soldering. The second connector 313*c*2 may be electrically connected to a receptacle connector of the telematics control unit 300.

The first pattern 1111, the second pattern 1112, and the third pattern 1113, which operate as radiators, may also be formed in the CPW structure on the same plane of the first transparent dielectric substrate 1010*a*. Accordingly, a radiator region of the antenna assembly 1000 may be implemented on the glass panel 310 in a shape with a single layer rather than a shape with a plurality of layers.

Referring to FIGS. 7A, 7B, and 11A, the first pattern 1111, the second pattern 1112, and the third pattern 1113 may be formed as the metal grid patterns 1020*a* in the metal mesh shape with the plurality of open areas OA. The antenna assembly 1000 may further include a plurality of dummy metal grid patterns 1020*b* on the outer portion of the metal mesh patterns 1020*a* forming the first conductive patterns 1110 on the first transparent dielectric substrate 1010*a*. The metal grid patterns 1020*a* and the dummy metal grid patterns 1020*b* constitute the first conductive pattern layer 1020 corresponding to the transparent antenna region. The first conductive pattern layer 1020 may be formed on the first transparent dielectric substrate 1010*a*.

The first region R1 of the first transparent dielectric substrate 1010*a* may form a metal mesh radiator region including the metal grid patterns 1020*a*. The metal mesh radiator region may be formed with a first penetration ratio of 80% or more and may be configured to transmit and receive wireless signals. Metal lines implementing the metal mesh shape may have a linewidth of 10 um or less. The first region R1 of the first transparent dielectric substrate 1010*a* may form a dummy metal mesh region including the dummy metal grid patterns 1020*b*. The dummy metal mesh region may be formed with a second penetration ratio of 82% or more, which is higher than the first penetration ratio, by the open areas OA and the slit areas SL. The second region R2 of the first transparent dielectric substrate 1010*a* may form a connector portion. The first region R1 forming the metal mesh radiator region may be directly connected to the second region R2 forming the connector portion through the first and second connection patterns 1110c and 1120c. A third penetration ratio of the second region R2 forming the connector portion may be lower than the first penetration ratio.

The plurality of dummy metal grid patterns 1020b may be formed not to be connected to the feeding pattern 1120f and the first and second ground patterns 1121g and 1122g. The plurality of dummy metal grid patterns 1020b may be separated from one another by the slits SL. Accordingly, the plurality of dummy metal grid patterns 1020b can maintain the visibility of the transparent antenna structure at a certain level without deterioration of the radiation characteristics and efficiency of the antenna.

The second connection patterns 1120c of the second conductive patterns 1120 may be attached to the first connection patterns 1110c by ACF bonding. The penetration ratio of the metal grid patterns 1020a corresponding to the radiation patterns 1111, 1112, and 1113 of the first conductive pattern 1110 may be 80% or more. Meanwhile, the penetration ratio of the plurality of dummy metal grid patterns 1020b may be 82% or more. The sheet resistance of the radiation patterns 1111, 1112, and 1113 may be 1Ω (ohm)/sq or less.

The difference in penetration ratio between the region of the plurality of dummy metal grid patterns 1020b and the region of the radiation patterns 1111, 1112, and 1113 may be 2% or less. Accordingly, the visibility can be maintained at a certain level by the region where the plurality of dummy metal grid patterns 1020b having the difference in penetration ratio of 2% or less compared to the region of the radiation patterns 1111, 1112, and 1113 are formed. The boundary of some of the dummy metal grid patterns 1020b and the boundary of the radiation patterns 1111, 1112, and 1113 may be separated by a gap. The boundary of the dummy metal grid patterns 1020b and the boundary of the radiation patterns 1111, 1112, and 1113 may be formed to be 200 μm or less.

Referring to (a) of FIG. 6B and FIGS. 7A and 7B, the first connection patterns 1110c may include a first penetration ratio portion 1111c and a second penetration ratio portion 1112c. The penetration ratio of the first penetration ratio portion 1111c may be similar to the penetration ratio of the region of the radiation patterns 1111, 1112, and 1113 within a certain range. The difference between the penetration ratio of the first penetration ratio portion 1111c and the penetration ratio of the region of the radiation patterns 1111, 1112, and 1113 may be set to be within a certain range. The penetration ratio of the second penetration ratio portion 1112c may be 70% or less. The second penetration ratio portion 1112c may have sheet resistance of 0.5Ω (ohm)/sq or less.

Referring to FIGS. 5A, 7A, 9A, and 12, the vehicle may further include the telematics control unit (TCU) 300. The telematics control unit 300 and the third connection patterns 1130c of the second conductive patterns 1120 may be electrically connected by the Fakra cable 313. The Fakra cable 330 may include the first connector 313c1 and the second connector 313c2. The first connector 313c1 may be electrically connected to the third connection patterns 1130c by soldering. The second connector 313c2 may be electrically connected to the receptacle connector of the telematics control unit 300.

The antenna assembly 1000 may further include the adhesive layer 1041. The adhesive layer 1041 may be formed to include an adhesive material and a UV-cut material. The adhesive layer 1041 may be disposed between the first surface S1 of the first transparent dielectric substrate 1010a and the inner surface of the glass panel 310.

Referring to FIGS. 5A, 7A, and 9B, the antenna assembly 1000 may further include the metal frame 49. The opaque region 312 of the glass panel 310 may be supported by a portion of the metal frame. The metal frame 49 may include the recess portion 49R. The second dielectric substrate 1010b may be disposed within the recess portion 49R of the metal frame 49.

Figure 13A:
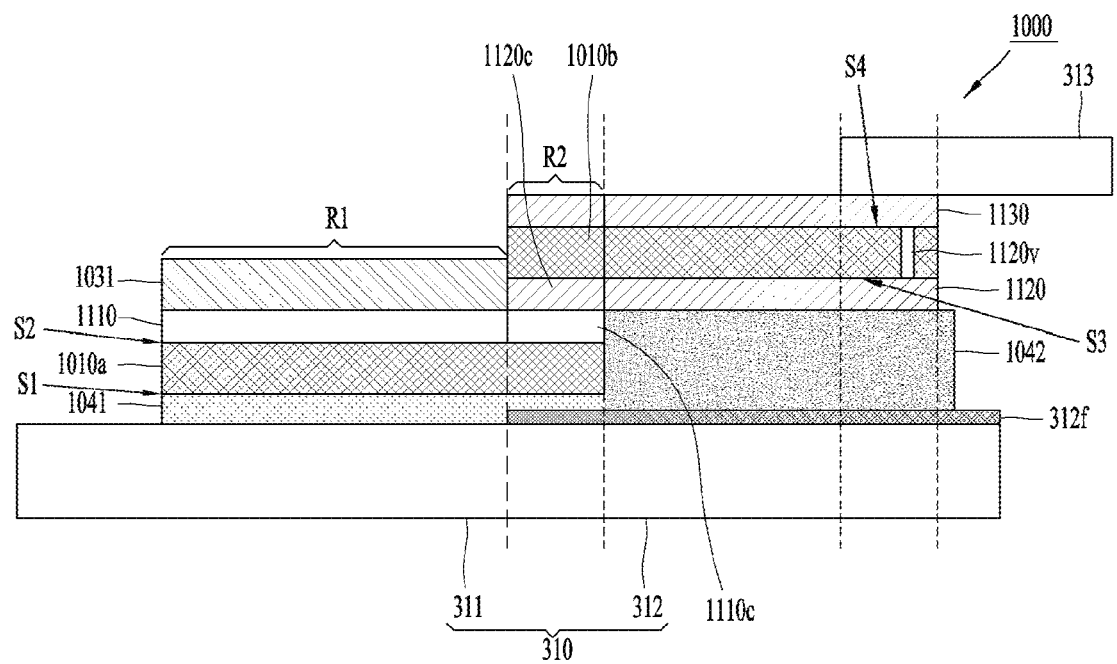
FIG. 13A is a cross-sectional view illustrating that an antenna assembly according to another aspect of the present disclosure is connected through a connection PCB and shows a structure in which an antenna module and a feeding structure are coupled to each other.
Figure 13A:
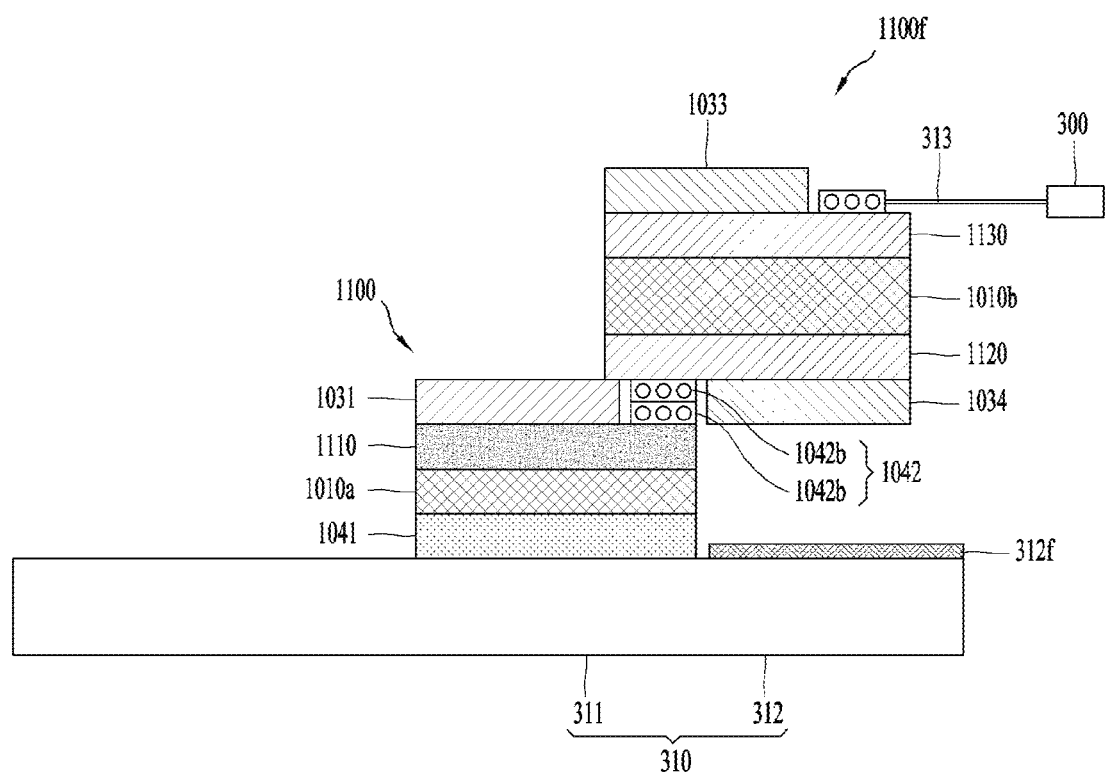
Figure 13B:
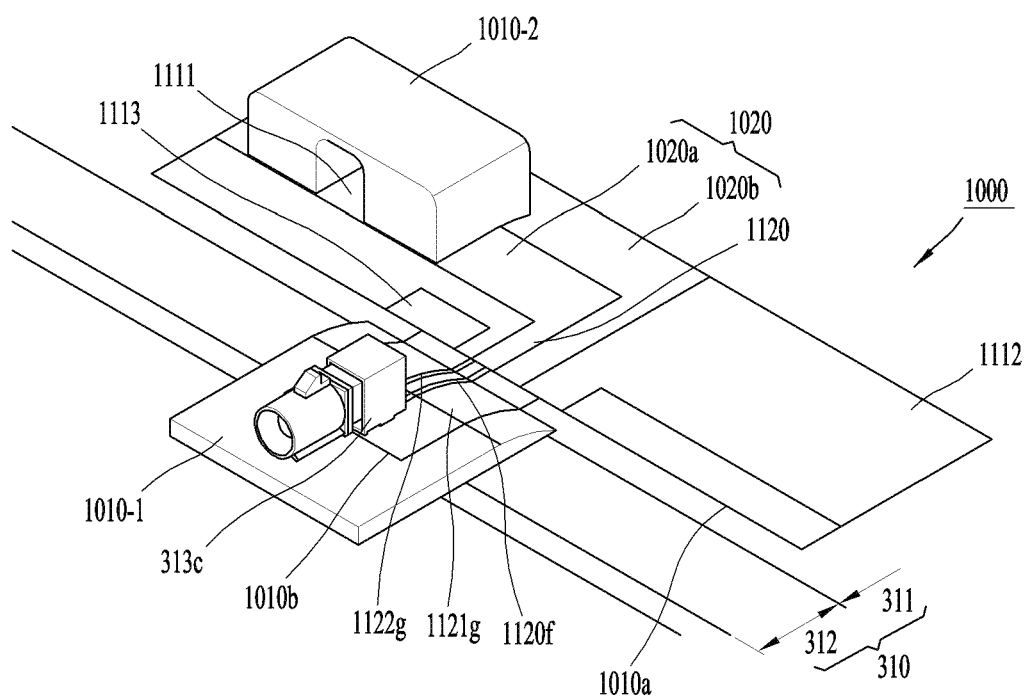
FIG. 13B is a front view illustrating that conductive patterns of the antenna module of FIG. 13A are disposed.

FIG. 13A is a cross-sectional view illustrating that an antenna assembly according to another aspect of the present disclosure is connected through a connection PCB and shows a structure in which an antenna module and a feeding structure are coupled to each other. FIG. 13B is a front view illustrating that conductive patterns of the antenna module of FIG. 13A are disposed.

Hereinafter, a vehicle having an antenna assembly 1000 according to the present disclosure will be described with reference to FIGS. 5A to 9 and FIGS. 12 to 13B. The vehicle may be configured to include the glass panel 310 and the antenna assembly 1000 disposed on the glass panel 310. The glass panel 310 may include the transparent region 311 and the opaque region 312. The frit layer 312f may be disposed on the opaque region 312.

Referring to FIG. 13A, the antenna assembly 1000 may be configured to include the first transparent dielectric substrate 1010a, the first conductive patterns 1110, the second dielectric substrate 1010b, the second conductive patterns 1120, and the third conductive patterns 1130. The first conductive patterns 1110 may form a first conductive pattern layer on the first transparent dielectric substrate 1010a. The second conductive patterns 1120 may form a second conductive pattern layer on one surface of the second dielectric substrate 1010b. The third conductive patterns 1130 may form a third conductive pattern layer on another surface of the second dielectric substrate 1010b.

The first transparent dielectric substrate 1010a may include a first surface S1 and a second surface S2. The first surface S1 may be opposite to the second surface S2. The first surface S1 may face the glass panel 310, and the second surface S2 may face the inner side of the vehicle. The first surface S1 may include a first region R1 and a second region R2.

The first conductive patterns 1110 may be disposed on the first surface S1 of the first transparent dielectric substrate 1010a. The second surface S2 may include a first region R1 and a second region R2. The first region R1 may be disposed on the transparent region 311 of the glass panel 310. The second region R2 may be disposed on the opaque region 312 of the glass panel 310. The radiation patterns 1111, 1112, and 1113 of the first conductive patterns 1110 may be disposed on the first region R1 of the second surface S2. The first connection patterns 1110c of the first conductive patterns 1110 may be disposed on the second region R2 of the second surface S2.

The second dielectric substrate 1010b may be configured to include a third surface S3 and a fourth surface S4. The second dielectric substrate 1010b may be disposed on the opaque region 312 of the glass panel 310 and may be implemented as an opaque substrate. The third surface S3 and the fourth surface S4 may be opposite to each other. The third surface S3 may face the glass panel 310 and the fourth surface S4 may face the inner side of the vehicle.

The second conductive patterns 1120 may be disposed on the third surface S3 of the second dielectric substrate 1010b. The third conductive patterns 1130 may be disposed on the fourth surface S4 of the second dielectric substrate 1010b.

The second connection patterns 1120c of the second conductive patterns 1120 may be attached to the first conductive patterns 1110. The first connection patterns 1110c and the second connection patterns 1120c may be formed on the first transparent dielectric substrate 1010a and the second dielectric substrate 1010b, respectively. Accordingly, the first transparent dielectric substrate 1010a and the second dielectric substrate 1010b on which the first and second connection patterns 1110 and 1120c are formed may also be referred to as first and second connection PCBs, respectively. The second conductive patterns 1120 and the second conductive patterns 1130 may be connected by vias 1120v.

Referring to FIGS. 7A, 12, and 13B, the first conductive patterns 1110 may be configured to include a plurality of patterns that operate as radiators. With regard to this, the first conductive patterns 1110 may be configured to include a first pattern 1111, a second pattern 1112, and a third pattern 1113. The second conductive patterns 1120 may be configured to include a feeding pattern 1120f, a first ground pattern 1121g, and a second ground patter 1122g.

The first pattern 1111 may be electrically connected to the feeding pattern 1120f of the second conductive pattern 1120. The second pattern 1112 may be electrically connected to the first ground pattern 1121g of the second conductive pattern 1120. The third pattern 1113 may be electrically connected to the second ground pattern 1122g of the second conductive pattern 1120. The feeding pattern 1120f, the first ground pattern 1121g, and the second ground pattern 1122g may be formed in a coplanar waveguide (CPW) structure on the same plane of the second dielectric substrate 1010b. The first pattern 1111, the second pattern 1112, and the third pattern 1113, which operate as radiators, may also be formed in the CPW structure on the same plane of the first transparent dielectric substrate 1010a. Accordingly, a radiator region of the antenna assembly 1000 may be implemented on the glass panel 310 in a shape with a single layer rather than a shape with a plurality of layers.

Referring to FIG. 13B, a first dielectric structure 1010-1 may be disposed below the second dielectric substrate 1010b to support the second dielectric substrate 1010b. A second dielectric structure 1010-2 may be disposed on a region where at least one of the conductive patterns formed on the first transparent dielectric substrate 1010a is disposed. The disposition of the second dielectric structure 1010-2 can result in suppressing a partial region of the first transparent dielectric substrate 1010a from being lifted off the glass panel 310. The first transparent dielectric substrate 1010a on which the first connection pattern 1110c of FIG. 13A is formed may constitute a first connection PCB. The second dielectric substrate 1010b on which the second connection pattern 1120c of FIG. 13A is formed and the first dielectric structure 1010-1 supporting the second dielectric substrate 1010b may constitute a second connection PCB.

Referring to FIGS. 7A, 7B, and 13A, the first pattern 1111, the second pattern 1112, and the third pattern 1113 may be formed as the metal grid patterns 1020a in the metal mesh shape with the plurality of open areas OA. The antenna assembly 1000 may further include a plurality of dummy metal grid patterns 1020b on the outer portion of the metal mesh shape 1020a forming the first conductive patterns 1110 on the first transparent dielectric substrate 1010a. The metal grid patterns 1020a and the dummy metal grid patterns 1020b constitute the first conductive pattern layer 1020 corresponding to the transparent antenna region. The first conductive pattern layer 1020 may be formed on the first transparent dielectric substrate 1010a.

The first region R1 of the first transparent dielectric substrate 1010a may form a metal mesh radiator region including the metal grid patterns 1020a. The metal mesh radiator region may be formed with a first penetration ratio of 80% or more and may be configured to transmit and receive wireless signals. Metal lines implementing the metal mesh shape may have a linewidth of 10 um or less. The first region R1 of the first transparent dielectric substrate 1010a may form a dummy metal mesh region including the dummy metal grid patterns 1020b. The dummy metal mesh region may be formed with a second penetration ratio of 82% or more, which is higher than the first penetration ratio, by the open areas OA and the slit areas SL. The second region R2 of the first transparent dielectric substrate 1010a may form a connector portion. The first region R1 forming the metal mesh radiator region may be directly connected to the second region R2 forming the connector portion through the first and second connection patterns 1110c and 1120c. A third penetration ratio of the second region R2 forming the connector portion may be lower than the first penetration ratio.

The plurality of dummy metal grid patterns 1020b may be formed not to be connected to the feeding pattern 1120f and the first and second ground patterns 1121g and 1122g. The plurality of dummy metal grid patterns 1020b may be separated from one another by the slits SL. Accordingly, the plurality of dummy metal grid patterns 1020b can maintain the visibility of the transparent antenna structure at a certain level without deterioration of the radiation characteristics and efficiency of the antenna. The radiation patterns 1111, 1112, and 1113 of the first conductive patterns 1110 may have a linewidth of 10 μm or less. Accordingly, the transparent antenna structure including the first conductive patterns 1110 can maintain transparency at a certain level or more.

The second connection patterns 1120c of the second conductive patterns 1120 may be attached to the first connection patterns 1110c by ACF bonding. The penetration ratio of the metal grid patterns 1020a corresponding to the radiation patterns 1111, 1112, and 1113 of the first conductive pattern 1110 may be 80% or more. Meanwhile, the penetration ratio of the plurality of dummy metal grid patterns 1020b may be 82% or more. The radiation patterns 1111, 1112, and 1113 may have sheet resistance of 1Ω (ohm)/sq or less.

The difference in penetration ratio between the region of the plurality of dummy metal grid patterns 1020b and the region of the radiation patterns 1111, 1112, and 1113 may be 2% or less. Accordingly, the visibility can be maintained at a certain level by the region where the plurality of dummy metal grid patterns 1020b having the difference in penetration ratio of 2% or less compared to the region of the radiation patterns 1111, 1112, and 1113 are formed. The boundary of some of the dummy metal grid patterns 1020b and the boundary of the radiation patterns 1111, 1112, and 1113 may be separated by a gap. The boundary of the dummy metal grid patterns 1020b and the boundary of the radiation patterns 1111, 1112, and 1113 may be formed to be 200 μm or less.

Referring to (a) of FIG. 6B and FIGS. 7A and 7B, the first connection patterns 1110c may include a first penetration ratio portion 1111c and a second penetration ratio portion 1112c. The penetration ratio of the first penetration ratio portion 1111c may be similar to the penetration ratio of the region of the radiation patterns 1111, 1112, and 1113 within a certain range. The difference between the penetration ratio of the first penetration ratio portion 1111c and the penetration ratio of the region of the radiation patterns 1111, 1112, and 1113 may be set to be within a certain range. The penetration ratio of the second penetration ratio portion 1112c may be 70% or less. The second penetration ratio portion 1112c may have sheet resistance of 0.5Ω (ohm)/sq or less.

Referring to FIGS. 5A, 7A, and 9A, the vehicle may further include the telematics control unit (TCU) 300. The telematics control unit 300 and the third connection patterns 1130c of the second conductive patterns 1120 may be electrically connected by the Fakra cable 313. The Fakra cable 330 may include the first connector 313c1 and the second connector 313c2. The first connector 313c1 may be electrically connected to the third connection patterns 1130c by soldering. The second connector 313c2 may be electrically connected to the receptacle connector of the telematics control unit 300.

The antenna assembly 1000 may further include the adhesive layers 1041 and 1042. The adhesive layers 1041 and 1042 may be formed to include an adhesive material and a UV-cut material. The adhesive layer 1041 may be disposed between the first surface S1 of the first transparent dielectric substrate 1010a and the inner surface of the glass panel 310.

Referring to FIGS. 5A, 7A, and 9B, the antenna assembly 1000 may further include the metal frame 49. The opaque region 312 of the glass panel 310 may be supported by a portion of the metal frame. The metal frame 49 may include the recess portion 49R. The second dielectric substrate 1010b may be disposed within the recess portion 49R of the metal frame 49.

Figure 14:
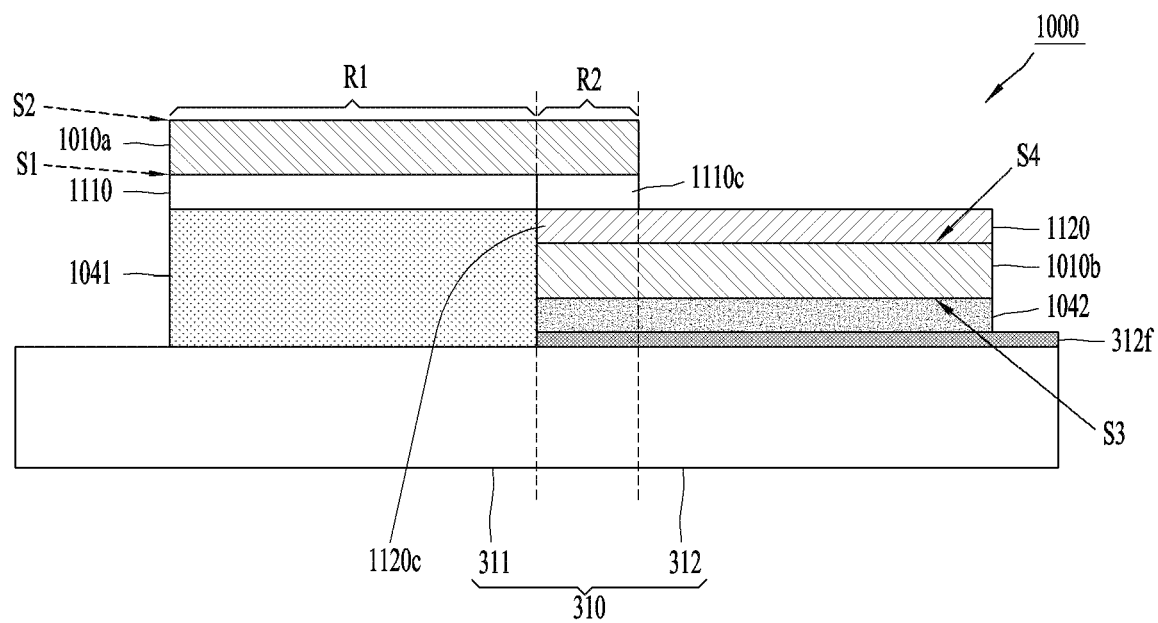
FIG. 14 is a cross-sectional view illustrating that an antenna assembly according to still another aspect of the present disclosure is connected through a connection PCB and shows a structure in which an antenna module and a feeding structure are coupled to each other.
Figure 14:
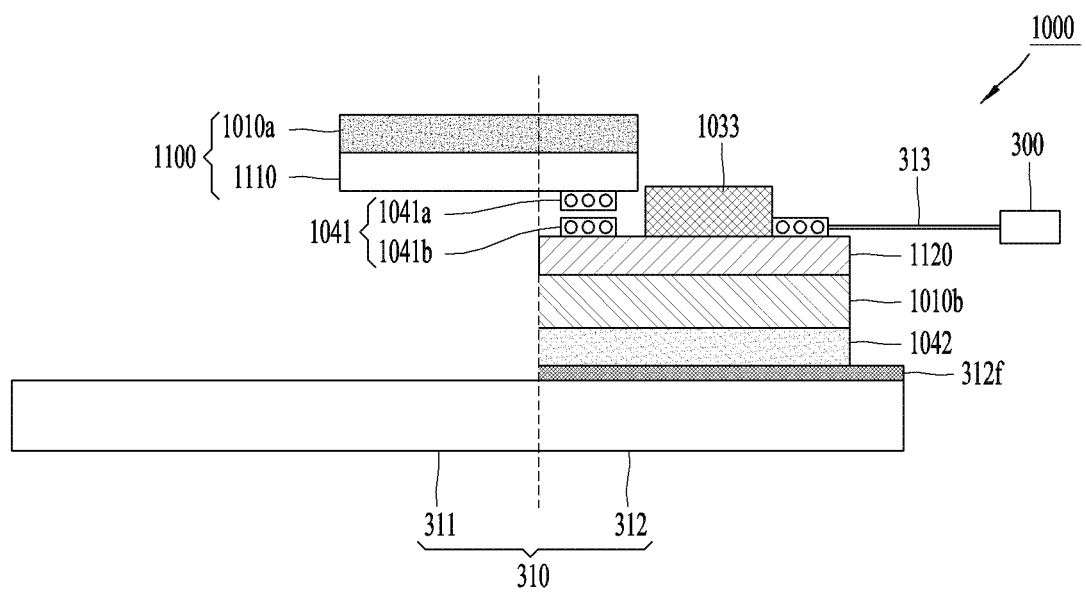

FIG. 14 is a cross-sectional view illustrating that an antenna assembly according to still another aspect of the present disclosure is connected through a connection PCB and shows a structure in which an antenna module and a feeding structure are coupled to each other. Hereinafter, a vehicle having an antenna assembly 1000 according to the present disclosure will be described with reference to FIGS. 5A to 9B, FIG. 13B, and FIG. 14. The vehicle may be configured to include the glass panel 310 and the antenna assembly 1000 disposed on the glass panel 310. The glass panel 310 may include the transparent region 311 and the opaque region 312. The frit layer 312f may be disposed on the opaque region 312.

Referring to FIG. 14, the antenna assembly 1000 may be configured to include the first transparent dielectric substrate 1010a, the first conductive patterns 1110, the second dielectric substrate 1010b, and the second conductive patterns 1120. The first conductive patterns 1110 may form a first conductive pattern layer on the first transparent dielectric substrate 1010a. The second conductive patterns 1120 may form a second conductive pattern layer on the second dielectric substrate 1010b.

The first transparent dielectric substrate 1010a may include a first surface S1 and a second surface S2. The first surface S1 may be opposite to the second surface S2. The first surface S1 may face the glass panel 310, and the second surface S2 may face the inner side of the vehicle. The first surface S1 may include a first region R1 and a second region R2.

The first conductive patterns 1110 may be disposed on the first surface S1 of the first transparent dielectric substrate 1010a. The first surface S1 may include a first region R1 and a second region R2. The first region R1 may be disposed on the transparent region 311 of the glass panel 310. The second region R2 may be disposed on the opaque region 312 of the glass panel 310. Radiation patterns 1111, 1112, and 1113 of the first conductive patterns 1110 may be disposed on the first region R1 of the first surface S1. First connection patterns 1110c of the first conductive patterns 1110 may be disposed on the second region R2 of the first surface S1.

The second dielectric substrate 1010b may be configured to include a third surface S3 and a fourth surface S4. The second dielectric substrate 1010b may be disposed on the opaque region 312 of the glass panel 310 and may be implemented as an opaque substrate. The third surface S3 and the fourth surface S4 may be opposite to each other. The third surface S3 may face the glass panel 310, and the fourth surface S4 may face the inner side of the vehicle.

The second conductive patterns 1120 may be disposed on the fourth surface S4 of the second dielectric substrate 1010b. The second connection patterns 1120c of the second conductive patterns 1120 may be attached to the first conductive patterns 1110. The first connection patterns 1110c and the second connection patterns 1120c may be formed on the first transparent dielectric substrate 1010a and the second dielectric substrate 1010b, respectively. Accordingly, the first transparent dielectric substrate 1010a and the second dielectric substrate 1010b on which the first and second connection patterns 1110 and 1120c are formed may also be referred to as first and second connection PCBs, respectively.

The first conductive patterns 1110 may be configured to include a plurality of patterns that operate as radiators. With regard to this, the first conductive patterns 1110 may be configured to include a first pattern 1111, a second pattern 1112, and a third pattern 1113. The second conductive patterns 1120 may be configured to include a feeding pattern 1120f, a first ground pattern 1121g, and a second ground patter 1122g.

The first pattern 1111 may be electrically connected to the feeding pattern 1120f of the second conductive pattern 1120. The second pattern 1112 may be electrically connected to the first ground pattern 1121g of the second conductive pattern 1120. The third pattern 1113 may be electrically connected to the second ground pattern 1122g of the second conductive pattern 1120. The feeding pattern 1120f, the first ground pattern 1121g, and the second ground pattern 1122g may be formed in a coplanar waveguide (CPW) structure on the same plane of the second dielectric substrate 1010b. The first pattern 1111, the second pattern 1112, and the third pattern 1113, which operate as radiators, may also be formed in the CPW structure on the same plane of the first transparent dielectric substrate 1010a. Accordingly, a radiator region of the antenna assembly 1000 may be implemented on the glass panel 310 in a shape with a single layer rather than a shape with a plurality of layers.

Referring to FIGS. 7A, 7B, and 14, the first pattern 1111, the second pattern 1112, and the third pattern 1113 may be formed as the metal grid patterns 1020a in the metal mesh shape with the plurality of open areas OA. The antenna assembly 1000 may further include a plurality of dummy metal grid patterns 1020b on the outer portion of the metal mesh patterns 1020a forming the first conductive patterns 1110 on the first transparent dielectric substrate 1010a. The metal grid patterns 1020a and the dummy metal grid patterns 1020b constitute the first conductive pattern layer 1020 corresponding to the transparent antenna region. The first conductive pattern layer 1020 may be formed on the first transparent dielectric substrate 1010a.

The first region R1 of the first transparent dielectric substrate 1010a may form a metal mesh radiator region including the metal grid patterns 1020a. The metal mesh radiator region may be formed with a first penetration ratio of 80% or more and may be configured to transmit and receive wireless signals. Metal lines implementing the metal mesh shape may have a linewidth of 10 um or less. The first region R1 of the first transparent dielectric substrate 1010a may form a dummy metal mesh region including the dummy metal grid patterns 1020b. The dummy metal mesh region may be formed with a second penetration ratio of 82% or more, which is higher than the first penetration ratio, by the open areas OA and the slit areas SL. The second region R2 of the first transparent dielectric substrate 1010a may form a connector portion. The first region R1 forming the metal mesh radiator region may be directly connected to the second region R2 forming the connector portion through the first and second connection patterns 1110c and 1120c. A third penetration ratio of the second region R2 forming the connector portion may be lower than the first penetration ratio.

The plurality of dummy metal grid patterns 1020b may be formed not to be connected to the feeding pattern 1120f and the first and second ground patterns 1121g and 1122g. The plurality of dummy metal grid patterns 1020b may be separated from one another by the slits SL. Accordingly, the plurality of dummy metal grid patterns 1020b can maintain the visibility of the transparent antenna structure at a certain level without deterioration of the radiation characteristics and efficiency of the antenna. The radiation patterns 1111, 1112, and 1113 of the first conductive patterns 1110 may have a linewidth of 10 μm or less. Accordingly, the transparent antenna structure including the first conductive patterns 1110 can maintain transparency at a certain level or more.

The second connection patterns 1120c of the second conductive patterns 1120 may be attached to the first connection patterns 1110c by ACF bonding.

The penetration ratio of the metal grid patterns 1020a corresponding to the radiation patterns 1111, 1112, and 1113 of the first conductive pattern 1110 may be 80% or more. Meanwhile, the penetration ratio of the plurality of dummy metal grid patterns 1020b may be 82% or more. The radiation patterns 1111, 1112, and 1113 may have sheet resistance of 1Ω (ohm)/sq or less.

The difference in penetration ratio between the region of the plurality of dummy metal grid patterns 1020b and the region of the radiation patterns 1111, 1112, and 1113 may be 2% or less. Accordingly, the visibility can be maintained at a certain level by the region where the plurality of dummy metal grid patterns 1020b having the difference in penetration ratio of 2% or less compared to the region of the radiation patterns 1111, 1112, and 1113 are formed. The boundary of some of the dummy metal grid patterns 1020b and the boundary of the radiation patterns 1111, 1112, and 1113 may be separated by a gap. The boundary of the dummy metal grid patterns 1020b and the boundary of the radiation patterns 1111, 1112, and 1113 may be formed to be 200 μm or less.

Referring to FIGS. 6B, 6C, 7A, and 7B, the first connection patterns 1110c may include a first penetration ratio portion 1111c and a second penetration ratio portion 1112c. The penetration ratio of the first penetration ratio portion 111c may be similar to the penetration ratio of the region of the radiation patterns 1111, 1112, and 1113 within a certain range. The difference between the penetration ratio of the first penetration ratio portion 1111c and the penetration ratio of the region of the radiation patterns 1111, 1112, and 1113 may be set to be within a certain range. The penetration ratio of the second penetration ratio portion 1112c may be 70% or less. The second penetration ratio portion 1112c may have sheet resistance of 0.5Ω (ohm)/sq or less.

Referring to FIGS. 5A, 7A, and 9A, the vehicle may further include the telematics control unit (TCU) 300. The telematics control unit 300 and the third connection patterns 1130c of the second conductive patterns 1120 may be electrically connected by the Fakra cable 313. The Fakra cable 330 may include the first connector 313c1 and the second connector 313c2. The first connector 313c1 may be electrically connected to the third connection patterns 1130c by soldering. The second connector 313c2 may be electrically connected to the receptacle connector of the telematics control unit 300.

The antenna assembly 1000 may further include the adhesive layers 1041 and 1042. The adhesive layers 1041 and 1042 may be formed to include an adhesive material and a UV-cut material. The adhesive layers 1041 and 1042 may be disposed between the first surface S1 of the first transparent dielectric substrate 1010a and the inner surface of the glass panel 310.

Referring to FIGS. 5A, 7A, and 9B, the antenna assembly 1000 may further include the metal frame 49. The opaque region 312 of the glass panel 310 may be supported by a portion of the metal frame. The metal frame 49 may include the recess portion 49R. The second dielectric substrate 1010b may be disposed within the recess portion 49R of the metal frame 49.

The transparent antenna structure according to the present disclosure can be implemented as various stacked substrate structures. In this regard, the first conductive pattern 1120 of the antenna module 1100 formed in the stacked structure as illustrated in FIGS. 12A, 13A, and 14 may be coupled to the second conductive pattern 1120 of the feeding structure 1100f. The second dielectric substrate 1010b, which is the opaque substrate 1010b in the feeding structure 1100f, may be formed in a stepped structure or a linear structure. The second conductive pattern 1120 formed on the second dielectric substrate 1010b may be electrically connected in various shapes on the front or rear surface of the first conductive pattern 1110, which is the transparent electrode layer.

Figure 15A:
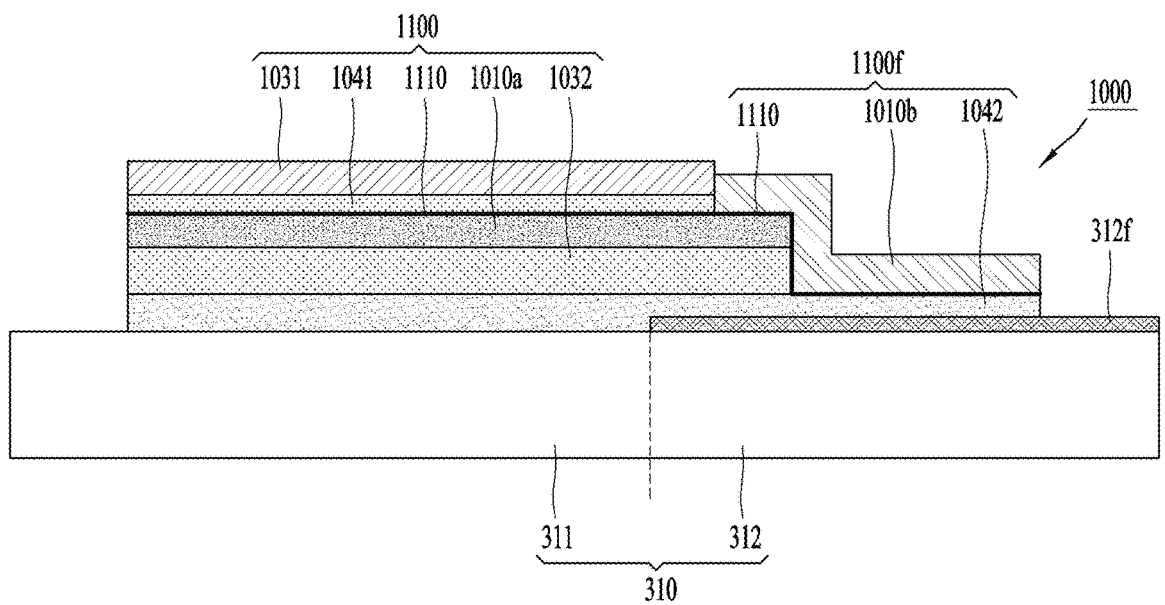
FIG. 15A illustrates a structure in which an opaque substrate according to an embodiment is formed in a stepped structure.

In this regard, FIG. 15A illustrates a structure in which an opaque substrate according to an embodiment is formed in a stepped structure. Referring to FIG. 15A, the second dielectric substrate 1010b, which is the opaque substrate, is formed in a stepped structure when coupled to the first transparent dielectric substrate 1010a. The first conductive pattern 1110, which is the transparent electrode layer formed on the first transparent dielectric substrate 1010a, is connected to the second conductive pattern 1120 formed on the second dielectric substrate 1010b. Accordingly, visibility and mass productivity may be deteriorated due to the step generated when coupling the first transparent dielectric substrate 1010a and the second dielectric substrate 1010b as the opaque substrate. Therefore, the present disclosure proposes a structure for minimizing the decrease in transparency of a transparent antenna due to a multi-layered stacked structure. In particular, the present disclosure proposes a structure for minimizing visibility deterioration that occurs at a thick outer edge region of an opaque substrate.

Therefore, the present disclosure is to solve the problem of the deteriorated visibility and mass productivity due to a step generated when coupling a transparent electrode layer and an opaque substrate. In this regard, transparency of a transparent antenna may be lowered due to a multi-layered stacked structure. In particular, there is a need to minimize visibility of metal patterns that occurs at thick outer edges of a multi-layered substrate structure.

Figure 15B:
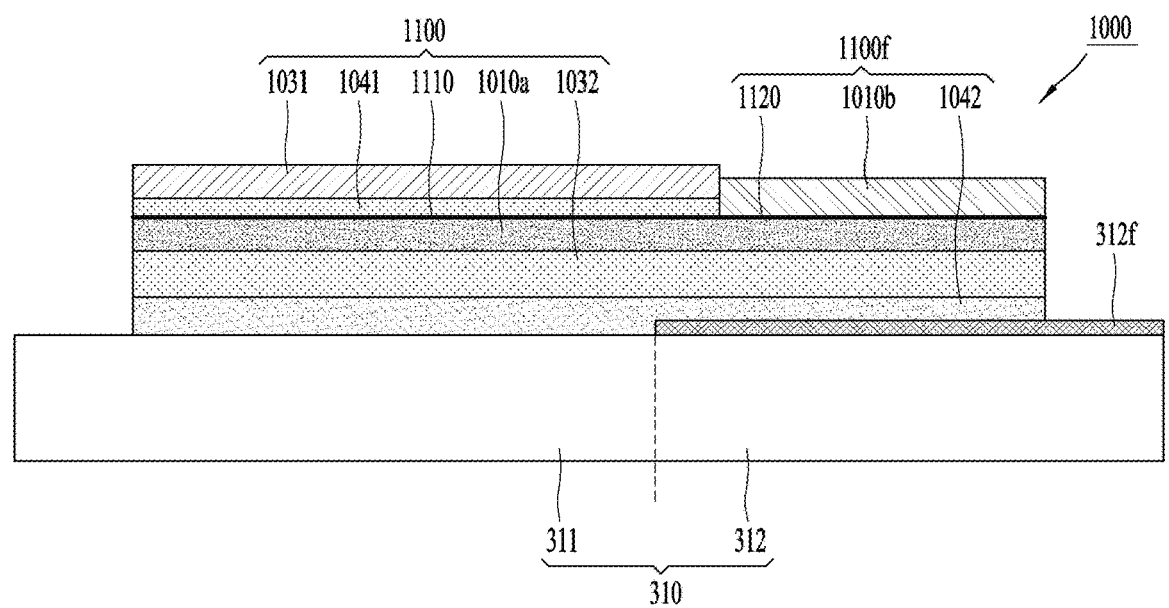
FIG. 15B illustrates a transparent antenna structure in which a step on a bonding portion has been removed from a stacked substrate structure according to an embodiment.

In this regard, FIG. 15B illustrates a transparent antenna structure in which a step on a coupled portion has been removed from a stacked substrate structure according to an embodiment. Meanwhile, FIG. 15C illustrates a transparent antenna structure in which a stacked structure is simplified in a stacked substrate structure according to an embodiment.

In order to solve the above-described problems, an antenna assembly including a transparent electrode layer and a second dielectric substrate 1010b, which is an opaque substrate bonded to a portion of the transparent electrode layer, may be implemented so that no step is generated at a coupled portion. In this regard, problems of visibility and defects during manufacturing may occur due to the step of the coupled portion of the second dielectric substrate 1010b. When the first transparent dielectric substrate 1010a and the second dielectric substrate 1010b are coupled, a lifting phenomenon due to tension may occur. To solve this, the present disclosure proposes a coupling structure in which the first transparent dielectric substrate 1010a is expanded to widen a bonding portion so as to eliminate a step and increase the area of the bonding portion.

The configuration of the transparent electrode layer attached to the glass panel 310 can be simplified by including a protective layer 1031, a first conductive pattern 1110, and an adhesive layer 1041, as illustrated in FIG. 15B. This can reduce an entire thickness of the bonding layer of the transparent antenna assembly, thereby decreasing the visibility of the metal pattern on the outer edge.

Figure 15C:
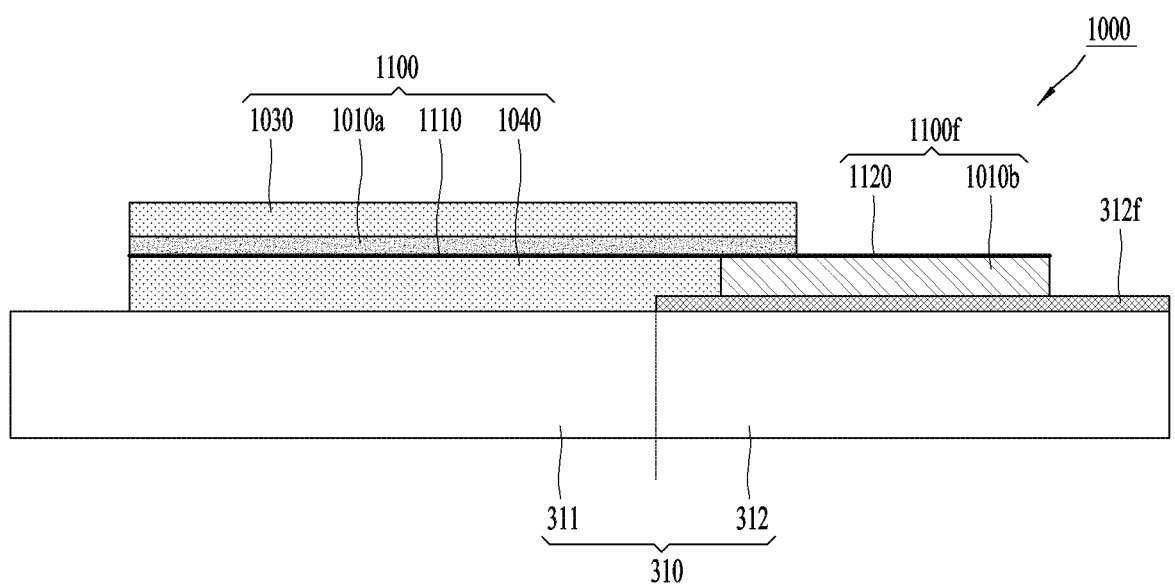
FIG. 15C illustrates a transparent antenna structure in which a stacked structure is simplified in a stacked substrate structure according to an embodiment.

Referring to FIGS. 15B and 15C, the antenna assembly 1000 may include the antenna module 1100 and the feeding structure 1100f coupled thereto. The antenna module 1100 may be formed to include the first transparent dielectric substrate 1010a. The feeding structure 1100f may be formed to include the second dielectric substrate 1010b, which is the opaque substrate. The first conductive pattern 1110, which is the transparent electrode layer, may be formed on one surface of the first transparent dielectric substrate 1010a. The second conductive pattern 1120 may be disposed on one surface of the second dielectric substrate 1010b as the opaque substrate.

In this regard, the second dielectric substrate may be disposed below the electrode layer 1020 disposed below the first dielectric substrate. A metal mesh-shaped antenna pattern may be formed on the transparent electrode layer 1020. The transparent substrate 1010a may be formed on the transparent region 311 of the glass panel 310. The transparent substrate 1010a and the opaque substrate 1010b may be formed on the opaque region 312 of the glass panel 310. Accordingly, a partial region of the transparent substrate 1010a may extend up to the opaque region 312. Accordingly, the partial region of the transparent substrate 1010a extending up to the opaque region 312 may be coupled to the opaque substrate 1010b on the opaque region 312.

A first stacked structure in which the step on the bonding portion of FIG. 15B has been removed may be formed on the glass panel 310. The first stacked structure may be configured to include the first protective layer 1031, the first adhesive layer 1041, the first conductive pattern 1110 that is the transparent electrode layer, the second protective layer 1032, and the second adhesive layer 1042. It may also be referred to as an antenna module 1100 including the first protective layer 1031, the first adhesive layer 1041, the first conductive pattern 1110, and the second protective layer 1032.

The feeding structure 1100f may be configured to include the second dielectric substrate 1010b, the second conductive pattern 1120, the second protective layer 1032, and the second adhesive layer 1042. The second dielectric substrate 1012 may be disposed on an upper region of the first transparent dielectric substrate 1010a. The second protective layer 1032 as a transparent insulating layer may be disposed below the first transparent dielectric substrate 1010a. The first transparent dielectric substrate 1010a on which the second protective layer 1032 is formed may be adhered to the glass panel 310 through the second adhesive layer 1042.

The second conductive pattern 1120 formed on the second dielectric substrate 1010b, which is the opaque substrate, may be connected to the first conductive pattern 1110 formed on the first transparent dielectric substrate 1010a without a step structure, thereby improving visibility and minimizing feeding loss.

A second stacked structure that the stacked structure of FIG. 15C is simplified may be formed above the glass panel 310. The second stacked structure may be configured to include the protective layer 1030, the first conductive pattern 1110 that is the transparent electrode layer, and the adhesive layer 1040. The first conductive pattern 1100 may be formed below the first transparent dielectric substrate 1010a.

The second conductive pattern 1120 formed on the second dielectric substrate 1010b, which is the opaque substrate, may be connected to the first conductive pattern 1110 formed on the first transparent dielectric substrate 1010a without a step structure, thereby improving visibility and minimizing feeding loss.

FIG. 15C relates to a cross-sectional structure of a transparent antenna with simplified layers, which is provided to improve visibility occurred on the outer side of a transparent electrode due to a step with glass by greatly reducing an entire thickness of a substrate. Referring to FIGS. 15B and 15C, the second dielectric substrate 1010b, which is the opaque substrate, may be configured as a flexible or rigid single- or double-sided PCB or FPCB. The second conductive pattern 1120 of the second dielectric substrate 1010b may be bonded to one surface of a pattern electrode with a low penetration ratio, which is formed on a portion of the edge of the first conductive pattern 1020 as the transparent electrode layer, through ACF bonding.

In the transparent antenna structure of FIG. 15A, the overall configuration of the antenna assembly can be simplified by removing at least some of the protective layer and the adhesive layers as illustrated in FIGS. 15B and 15C. The reduction of antenna radiation loss on a multi-layered bonding surface can be improved and deterioration of visibility that may occur on the outer edge due to the decrease in the entire thickness of the bonding layer can be suppressed, resulting in improving mass production and reducing manufacturing costs.

Referring to FIGS. 15B and 15C, the transparent antenna structure is to suppress the generation of the step due to the bonding between the first conductive pattern 1110 of the first transparent dielectric substrate 1010a and the second conductive pattern 1120 of the second dielectric substrate 1010b, which is the opaque substrate. This is to solve the visibility problem and defect issues of the antenna assembly by suppressing the generation of the step. The transparent antenna assembly includes the first transparent dielectric substrate 1010a on which the transparent electrode layer is formed, and the opaque second dielectric substrate 1010b bonded thereto. In the cross-sectional structure of the transparent antenna of FIG. 15A, visibility may be deteriorated at the stepped portion of the coupled portion. If tension of the second dielectric substrate 1010b, which is the opaque substrate, is applied or a force is applied during assembly handling, defects such as disconnection of the bonding portion or substrate lifting may occur.

In order to solve this problem, the present disclosure proposes the structure of FIGS. 15B and 15C, in which the first transparent dielectric substrate 1010a is expanded up to the region where the second dielectric substrate 1010b is placed, to widen the bonding portion, thereby eliminating the step and increasing the area of the bonding portion. With the increase in bonding area and the elimination of the step, rigidity of the bonding portion can be improved, thereby eliminating defect factors during handling, and solving the invisibility problem caused by the step on the coupled portion. The transparent antenna assembly is attached to the inside or surface of the glass panel 310 by the adhesive layer 1040. In this regard, the adhesive layer 1040 may have durability against ultraviolet rays and may include a UV-cut function.

Meanwhile, an antenna assembly according to the present disclosure may be configured to include a first transparent dielectric substrate, on which a transparent electrode layer is formed, and a second dielectric substrate. In this regard, FIGS. 16A and 16B illustrate the flow of processes in which an antenna assembly is manufactured by being coupled to a glass panel according to embodiments.

Figure 16A:
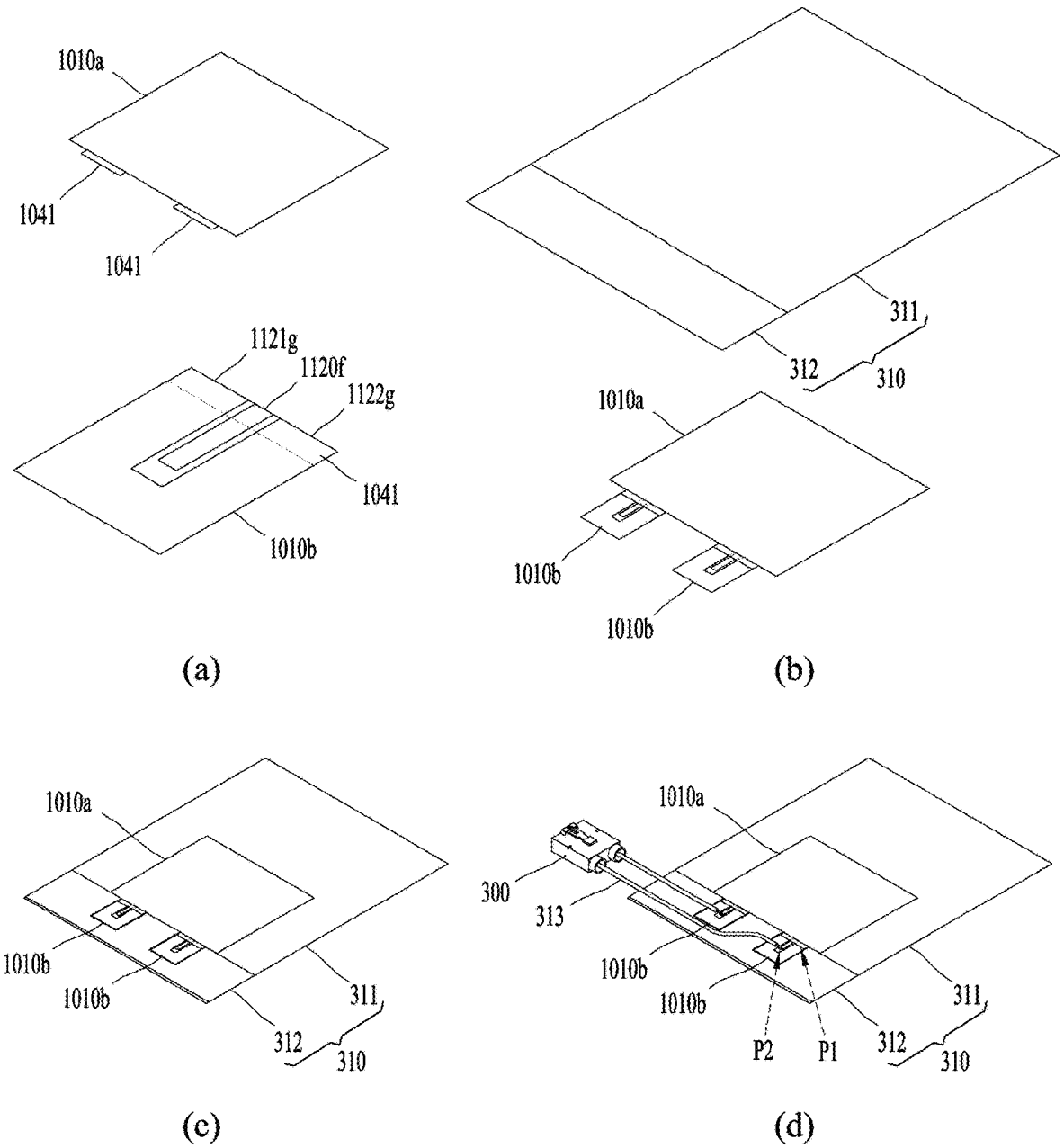
FIGS. 16A and 16B illustrate the flow of processes in which an antenna assembly is manufactured by being coupled to a glass panel according to embodiments.
Figure 16B:
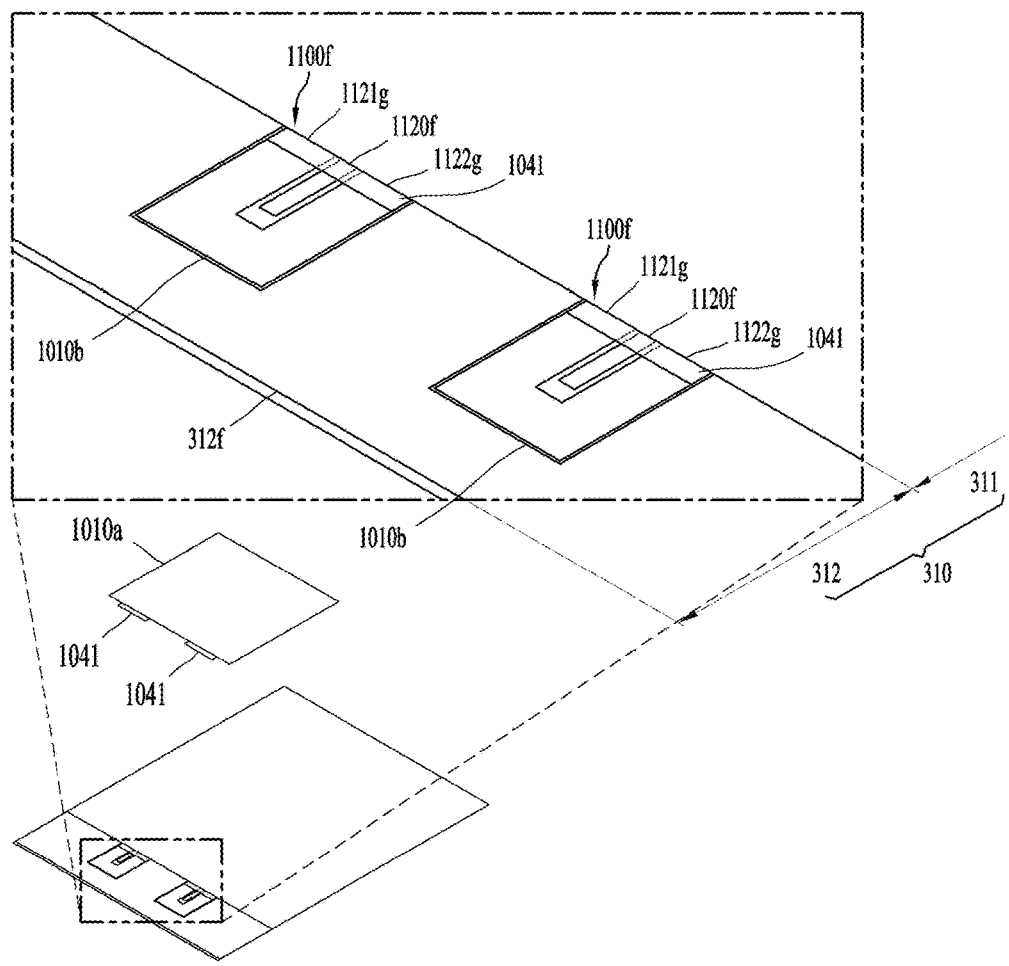
Figure 16B:
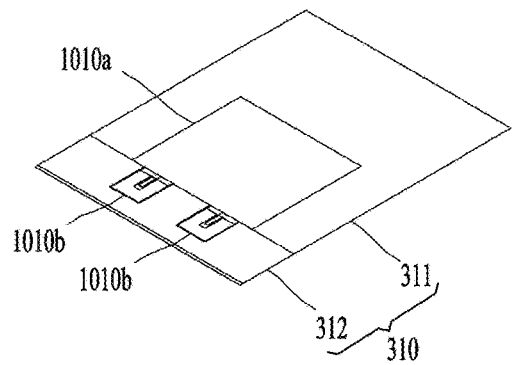
Figure 16B:
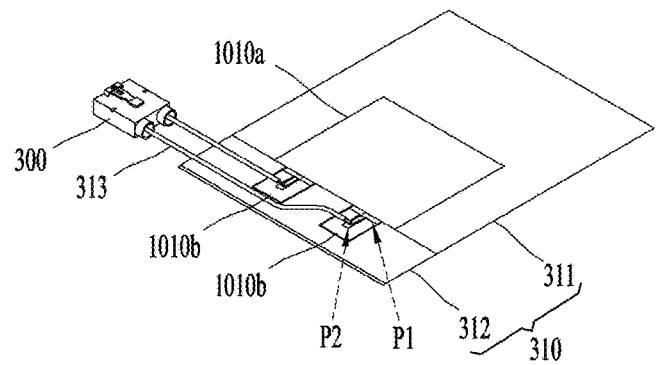

Referring to (a) of FIG. 16A, the first transparent dielectric substrate 1000a on which the transparent electrode layer is formed may be manufactured. In addition, the second dielectric substrate 1000b that includes the feeding pattern 1120f and the ground patterns 1121g and 1122g formed on both sides of the feeding pattern 1120f may be manufactured. The second dielectric substrate 1000b may be implemented as an FPCB, but is not limited thereto. Adhesion regions corresponding to the adhesive layers 1041 may be formed on the first transparent dielectric substrate 1000a and the second dielectric substrate 1000b, respectively.

Referring to (b) of FIG. 16A, the glass panel 310 with the transparent region 311 and the opaque region 312 may be manufactured. In addition, the antenna assembly 1000 may be manufactured by coupling at least one second dielectric substrate 1000b to the lower region of the first transparent dielectric substrate 1000a. The first transparent dielectric substrate 1000a and the second dielectric substrate 1000b may be coupled through ACF bonding or low-temperature soldering to be implemented as the transparent antenna assembly. Through this, the first conductive pattern formed on the first transparent dielectric substrate 1000a can be electrically connected to the second conductive pattern formed on the second dielectric substrate 1000b. When a plurality of antenna elements are implemented on the glass panel 310, the feeding structure 1100f made of the second dielectric substrate 1000b may also be implemented as a plurality of feeding structures.

Referring to (c) of FIG. 16A, the transparent antenna assembly 1000 may be attached to the glass panel 310. In this regard, the first transparent dielectric substrate 1000a on which the transparent electrode layer is formed may be disposed on the transparent region 311 of the glass panel 310. Meanwhile, the second dielectric substrate 1000b, which is the opaque substrate, may be disposed on the opaque region 312 of the glass panel 310.

Referring to (d) of FIG. 16A, the first transparent dielectric substrate 1000a and the second dielectric substrate 1000b may be bonded at a first position P1. The connector part 313, such as a Fakra cable, may be bonded to the second dielectric substrate 1000b at a second position P2. The transparent antenna assembly 1000 may be coupled to the telematics control unit (TCU) 300 through the connector part 313. To this end, the second conductive pattern formed on the second dielectric substrate 1010b may be electrically connected to a connector of one end of the connector part 313. A connector of another end of the connector part 313 may be electrically connected to the telematics control unit (TCU) 300.

The antenna assembly of FIG. 16B has a structural difference, compared to the antenna assembly of FIG. 16A, in that the opaque substrate is not manufactured separately but is manufactured integrally with the glass panel 310. The antenna assembly of FIG. 16B is implemented in such a way that the feeding structure implemented as the opaque substrate is directly printed on the glass panel 310 rather than being separately manufactured as an FPCB.

Referring to (a) of FIG. 16B, the first transparent dielectric substrate 1000a on which the transparent electrode layer is formed may be manufactured. In addition, the glass panel 310 with the transparent region 311 and the opaque region 312 may be manufactured. In the process of manufacturing of the glass panel of the vehicle, metal wires/pads for connection of the connectors may be implemented (fired). Like heating wires implemented on the vehicle glass, a transparent antenna mounting portion may be implemented in a metal form on the glass panel 310. In this regard, a second conductive pattern may be implemented on the region where the adhesive layer 1041 is formed for electrical connection to the first conductive pattern of the first transparent dielectric substrate 1000a.

In this regard, the second dielectric substrate 1000b on which the second conductive pattern is formed may be manufactured integrally with the glass panel 310. The second dielectric substrate 1000b may be formed integrally with the glass panel 310 on the opaque region 312 of the glass panel 310. The frit pattern 312 may be removed from the opaque region 312 where the second dielectric substrate 1000b is formed. The second conductive pattern may be implemented by forming the feeding pattern 1120f and the ground patterns 1121g and 1122g on both sides of the feeding pattern 1120f on the second dielectric substrate 1000b.

Referring to (b) of FIG. 16B, the transparent antenna assembly 1000 may be attached to the glass panel 310. In this regard, the first transparent dielectric substrate 1000a on which the transparent electrode layer is formed may be disposed on the transparent region 311 of the glass panel 310. The antenna assembly 1000 may be manufactured by coupling at least one second dielectric substrate 1000b to the lower region of the first transparent dielectric substrate 1000a. The first transparent dielectric substrate 1000a and the second dielectric substrate 1000b may be coupled through ACF bonding or low-temperature soldering to be implemented as the transparent antenna assembly. Through this, the first conductive pattern formed on the first transparent dielectric substrate 1000a can be electrically connected to the second conductive pattern formed on the second dielectric substrate 1000b. When a plurality of antenna elements are implemented on the glass panel 310, the feeding structure 1100f made of the second dielectric substrate 1000b may also be implemented as a plurality of feeding structures.

Referring to (c) of FIG. 16B, the first transparent dielectric substrate 1000a and the second dielectric substrate 1000b may be bonded at a first position P1. The connector part 313, such as a Fakra cable, may be bonded to the second dielectric substrate 1000b at a second position P2. The transparent antenna assembly 1000 may be coupled to the telematics control unit (TCU) 300 through the connector part 313. To this end, the second conductive pattern formed on the second dielectric substrate 1010b may be electrically connected to a connector of one end of the connector part 313. A connector of another end of the connector part 313 may be electrically connected to the telematics control unit (TCU) 300.

Figure 17:
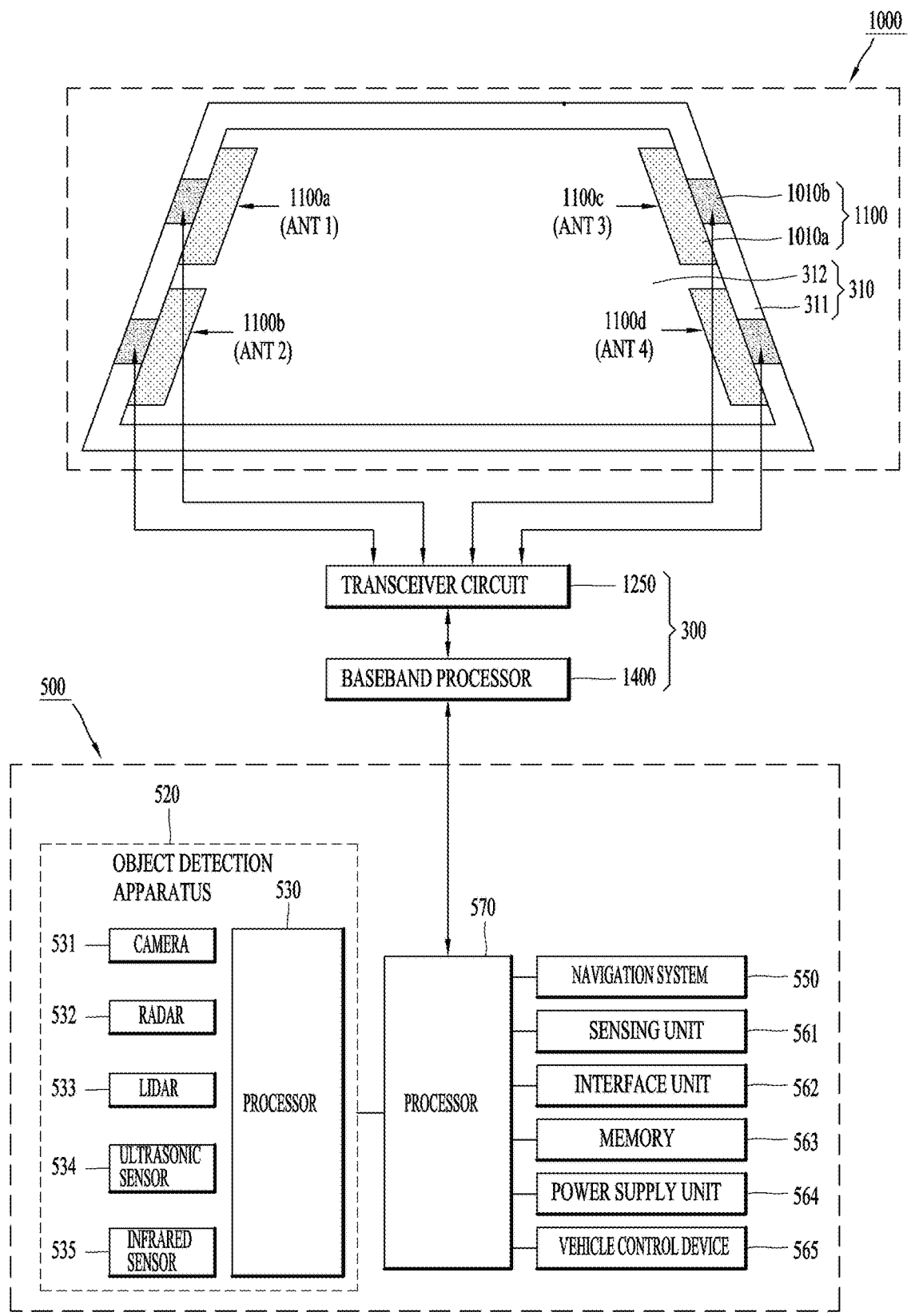
FIG. 17 illustrates an example of a configuration in which a plurality of antenna modules disposed at different positions of a vehicle are coupled with other components of the vehicle.

Hereinafter, a vehicle having an antenna module according to one example will be described in detail. In this regard, FIG. 17 illustrates an example of a configuration in which a plurality of antenna modules disposed at different positions of a vehicle are coupled with other parts of the vehicle.

Referring to FIGS. 1 to 17, the vehicle 500 may include a conductive vehicle body operating as an electrical ground. The vehicle 500 may include a plurality of antennas 1100a to 1100d that can be disposed at different positions on the glass panel 310. The antenna assembly 1000 may be configured such that the plurality of antennas 1100a to 1100d include a communication module 300. The communication module 300 may include a transceiver circuit 1250 and a processor 1400. The communication module 300 may correspond to the TCU of the vehicle or may constitute at least a portion of the TCU.

The vehicle 500 may include an object detecting apparatus 520 and a navigation system 550. The vehicle 500 may further include a separate processor 570 in addition to the processor 1400 included in the communication module 300. The processor 1400 and the separate processor 570 may be physically or functionally separated and implemented on one substrate. The processor 1400 may be implemented as a TCU, and the processor 570 may be implemented as an electronic control unit (ECU).

In case where the vehicle 500 is an autonomous vehicle, the processor 570 may be an autonomous driving control unit (ADCU) integrated with an ECU. Based on information detected through the camera 531, radar 532, and/or lidar 533, the processor 570 may search for a path and control the speed of the vehicle 500 to accelerate or decelerate. To this end, the processor 570 may interoperate with the processor 530 corresponding to the MCU in the object detecting apparatus 520 and/or the communication module 300 corresponding to the TCU.

The vehicle 500 may include the first transparent dielectric substrate 1010a and the second dielectric substrate 1010b disposed on the glass panel 310. The first transparent dielectric substrate 1010a may be formed inside the glass panel 310 of the vehicle or may be attached to the surface of the glass panel 310. The first transparent dielectric substrate 1010a may be configured such that conductive patterns in the metal mesh grid shape are formed. The vehicle 500 may include an antenna module 1100 that is formed in a metal mesh shape on one side surface of the dielectric substrate 1010 to radiate wireless signals.

The antenna assembly 1000 may include a first antenna module 1100a to a fourth antenna module 1100d to perform MIMO. The first antenna module 1100a, the second antenna module 1100b, the third antenna module 1100c, and the fourth antenna module 1100d may be disposed on the upper left, lower left, upper right, and lower right sides of the glass panel 310, respectively. The first antenna module 1100a to the fourth antenna module 1100d may be referred to as a first antenna ANT1 to a fourth antenna ANT4, respectively. The first antenna ANT1 to the fourth antenna ANT4 may be referred to as the first antenna module ANT1 to the fourth antenna module ANT4, respectively.

As described above, the vehicle 500 may include the telematics control unit (TCU) 300, which is the communication module. The TCU 300 may control signals to be received and transmitted through at least one of the first to fourth antenna modules 1100a to 1100d. The TCU 300 may include a transceiver circuit 1250 and a processor 1400.

Accordingly, the vehicle may further include a transceiver circuit 1250 and a processor 1400. A portion of the transceiver circuit 1250 may be disposed in units of antenna modules or in combination thereof. The transceiver circuit 1250 may control a radio signal of at least one of the first to third frequency bands to be radiated through the antenna modules ANT1 to ANT4. The first to third frequency bands may be low band (LB), mid band (MB), and high band (HB) for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be disposed on different regions of one side surface and another side surface of the glass panel 310. The antenna modules may perform MIMO by simultaneously receiving signals from the front of the vehicle. In this regard, to perform 4×4 MIMO, the antenna modules may further include a third antenna module ANT3 and a fourth antenna module ANT4 in addition to the first antenna module ANT1 and the second antenna module ANT2.

The processor 1400 may select an antenna module to perform communication with an entity communicating with the vehicle based on a driving path of the vehicle and a communication path with the entity. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in the first band through at least two of the first antenna ANT1 to the fourth antenna ANT4. The processor 1400 may perform MIMO in at least one of the second band and the third band through at least two of the first antenna ANT1 to the fourth antenna ANT4.

Accordingly, when signal transmission/reception performance of the vehicle in any one band is deteriorated, signal transmission/reception in the vehicle can be performed in other bands. For example, the vehicle may preferentially perform communication connection in the first band, which is the low band, for wide communication coverage and connection reliability, and then perform communication connection in the second and third bands.

The processor 1400 may control the transceiver circuit 1250 to perform the CA or DC through at least one of the first antenna ANT1 to the fourth antenna ANT4. In this regard, communication capacity can be expanded through the aggregation of the second band and the third band, which are wider than the first band. In addition, communication reliability can be improved through the dual connectivity with neighboring vehicles or entities by using the plurality of antenna elements disposed at the different regions of the vehicle.

So far, the antenna system having the wideband antenna made of the transparent material and the vehicle having the same have been described. Hereinafter, technical effects of the antenna system having the wideband antenna made of the transparent material and the vehicle having the same will be described.

According to the present disclosure, an antenna assembly made of a transparent material can be optimally configured on a transparent region and an opaque region of a vehicle glass, so that an antenna region is invisible on the vehicle glass.

According to the present disclosure, a difference in visibility between a region where an antenna made of a transparent material to be disposed on a vehicle glass is disposed and the other region can be minimized through optimization with a frit pattern for each metal mesh region.

According to the present disclosure, a step that is generated when an opaque substrate is coupled to a transparent electrode part can be removed, thereby solving the problem of deteriorated visibility and mass production due to the step upon the coupling.

According to the present disclosure, invisibility of a transparent antenna for a vehicle and an antenna assembly including the same can be secured without feeding loss and deterioration of antenna performance, which are caused by an increase in length of a transmission line due to a separate impedance matching part.

According to the present disclosure, it is possible to ensure both invisibility of an antenna pattern and the shape of a transmission line and invisibility of an antenna assembly including a transparent electrode part and an opaque substrate part when the antenna assembly is attached to a vehicle glass.

According to the present disclosure, a wideband antenna structure made of a transparent material that can be implemented in various shapes on a single plane can be provided through a plurality of metal mesh-shaped conductive patterns, a CPW feeder, and a conversion structure between them.

According to the present disclosure, a wideband antenna structure made of a transparent material that can reduce feeding loss and improve antenna efficiency while operating in a wide band can be provided through a transparent region and a frit region of a vehicle glass.

According to the present disclosure, an opaque substrate can be manufactured as an integrated glass type through a patterning process in a glass manufacturer, which can result in simplifying a transparent antenna module manufacturing process, reducing a total manufacturing cost of the transparent antenna module, and improving reliability of the antenna module.

According to the present disclosure, a step that is generated when an opaque substrate is coupled to a transparent electrode part can be removed, thereby solving the problem of deteriorated visibility and mass production due to the step upon the coupling.

According to the present disclosure, invisibility of a metal pattern can be improved and assembly quality and defect rate can be improved by removing a step from a coupled portion between a transparent substrate and an opaque substrate and increasing an area of a bonding portion.

According to the present disclosure, the reduction of antenna radiation loss at a multi-layered bonding surface can be improved by a simple bonding structure between a transparent substrate and an opaque substrate on the same plane.

According to the present disclosure, improvement of visibility at the edge of a transparent substrate, improvement of mass production, and reduction of manufacturing costs can be achieved by reducing the thicknesses of the transparent substrate and the opaque substrate.

Further scope of applicability of the present disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of an antenna assembly having transparent antennas and a vehicle controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A vehicle comprising:
a glass panel having a transparent region and an opaque region; and
an antenna assembly disposed on the glass panel,
wherein the antenna assembly comprises:
a first transparent dielectric substrate having a first surface and a second surface, wherein the first surface and the second surface are disposed on opposite surfaces, the first surface faces the glass panel, the second surface faces an inside of the vehicle, and the first surface has a first region and a second region;
first conductive patterns disposed on the first surface of the first transparent dielectric substrate, wherein the first surface has the first region and the second region, the first region is disposed on the transparent region of the glass panel, the second region is disposed on the opaque region, radiation patterns of the first conductive patterns are disposed on the first region of the first surface, first connection patterns of the first conductive patterns are disposed on the second region of the first surface; and
second conductive patterns disposed on an inner surface of the glass panel,
second connection patterns of the second conductive patterns are attached to the first connection patterns.

2. The vehicle of claim 1, wherein the first conductive patterns comprise a first pattern, a second pattern, and a third pattern,
the second conductive patterns comprise a feeding pattern, a first ground pattern, and a second ground pattern,
the first pattern is electrically connected to the feeding pattern of the second conductive pattern,
the second pattern is electrically connected to the first ground pattern of the second conductive pattern,
the third pattern is electrically connected to the second ground pattern of the second conductive pattern, and the first pattern, the second pattern, and the third pattern have a coplanar waveguide (CPW) structure on the first transparent dielectric substrate.

3. The vehicle of claim 2, wherein the first pattern, the second pattern, and the third pattern are formed in a metal mesh shape with a plurality of open areas,
the antenna assembly further comprises a plurality of dummy metal grid patterns on outer portions of the first conductive patterns on the first transparent dielectric substrate,
the plurality of dummy metal grid patterns are not connected to the feeding pattern and the first and second ground patterns, and
the plurality of dummy metal grid patterns are separated from one another by slits.

4. The vehicle of claim 1, wherein the second connection patterns of the second conductive patterns are attached to the first connection patterns by ACF bonding.

5. The vehicle of claim 3, wherein the radiation patterns have a penetration ratio of 80% or more,
the plurality of dummy metal grid patterns have a penetration ratio of 82% or more, and
the radiation patterns have sheet resistance of 1Ω (ohm)/sq or less.

6. The vehicle of claim 3, wherein a difference in penetration ratio between a region of the plurality of dummy metal grid patterns and a region of the radiation patterns is 2% or less,
a boundary of some of the dummy metal grid patterns and a boundary of the radiation patterns are separated by a gap, and
the boundary of the dummy metal grid patterns and the boundary of the radiation patterns are 200 μm or less.

7. The vehicle of claim 4, wherein the first connection patterns each comprise a first penetration ratio portion and a second penetration ratio portion,
a penetration ratio of the first penetration ratio portion is similar to a penetration ratio of a region of the radiation patterns,
the second penetration ratio portion has a penetration ratio of 70% or less, and
the second penetration ratio portion has sheet resistance of 0.5Ω (ohm)/sq or less.

8. The vehicle of claim 1, further comprising a telematics control unit (TCU),
wherein the telematics control unit and third connection patterns of the second conductive patterns are electrically connected by a Fakra cable,
the Fakra cable comprises a first connector and a second connector,
the first connector is electrically connected to the third connection patterns by soldering, and
the second connector is electrically connected to a receptacle connector of the telematics control unit.

9. The vehicle of claim 1, further comprising an adhesive layer,
wherein the adhesive layer comprises an adhesive material and a UV-cut material, and
the adhesive layer is disposed between the first surface of the first transparent dielectric substrate and the inner surface of the glass panel.

10. The vehicle of claim 1, further comprising a metal frame,
wherein the opaque region of the glass panel is supported by a portion of the metal frame,
the metal frame comprises a recess portion, and
a second dielectric substrate is disposed within the recessed portion of the metal frame.

11. A vehicle comprising:
a glass panel having a transparent region and an opaque region; and
an antenna assembly disposed on the glass panel,
wherein the antenna assembly comprises:
a first transparent dielectric substrate having a first surface and a second surface, wherein the first surface and the second surface are disposed on opposite surfaces, the first surface faces the glass panel, the second surface faces an inside of the vehicle, and the first surface has a first region and a second region;
first conductive patterns disposed on the second surface of the first transparent dielectric substrate, wherein the second surface has a first region and a second region, the first region is disposed on the transparent region of the glass panel, the second region is disposed on the opaque region, radiation patterns of the first conductive patterns are disposed on the first region of the second surface, and first connection patterns of the first conductive patterns are disposed on the second region of the second surface;
a second dielectric substrate having a third surface and a fourth surface, wherein the second dielectric substrate is disposed on the opaque region of the glass panel, the third surface and the fourth surface are disposed on opposing surfaces, the third surface faces the glass panel, and the fourth surface faces an inside of the vehicle;
second conductive patterns disposed on the third surface of the second dielectric substrate; and
third conductive patterns disposed on the fourth surface of the second dielectric substrate,
second connection patterns of the second conductive patterns are attached to the first conductive patterns, and
the second conductive patterns and the third conductive patterns are connected by vias.

12. The vehicle of claim 11, wherein the first conductive patterns comprise a first pattern, a second pattern, and a third pattern,
the second conductive patterns comprise a feeding pattern, a first ground pattern, and a second ground pattern,
the first pattern is electrically connected to the feeding pattern of the second conductive pattern,
the second pattern is electrically connected to the first ground pattern of the second conductive pattern,
the third pattern is electrically connected to the second ground pattern of the second conductive pattern, and
the first pattern, the second pattern, and the third pattern have a coplanar waveguide (CPW) structure on the first transparent dielectric substrate.

13. The vehicle of claim 12, wherein the first pattern, the second pattern, and the third pattern are formed in a metal mesh shape with a plurality of open areas,
the antenna assembly further comprises a plurality of dummy metal grid patterns on outer portions of the first conductive patterns on the first transparent dielectric substrate,
the plurality of dummy metal grid patterns are not connected to the feeding pattern and the first and second ground patterns,
the plurality of dummy metal grid patterns are separated from one another by slits, and
the radiation patterns have a linewidth of 10 μm or less.

14. The vehicle of claim 11, wherein the second connection patterns of the second conductive patterns are attached to the first connection patterns by ACF bonding.

15. The vehicle of claim 13, wherein the radiation patterns have a penetration ratio of 70% or more,
the plurality of dummy metal grid patterns have a penetration ratio of 72% or more, and
the radiation patterns have sheet resistance of 1Ω (ohm)/sq or less.

16. The vehicle of claim 13, wherein a difference in penetration ratio between a region of the plurality of dummy metal grid patterns and a region of the radiation patterns is 2% or less,
a boundary of some of the dummy metal grid patterns and a boundary of the radiation patterns are separated by a gap, and
the boundary of the dummy metal grid patterns and the boundary of the radiation patterns are 200 μm or less.

17. The vehicle of claim 14, wherein the first connection patterns each comprise a first penetration ratio portion and a second penetration ratio portion,
a penetration ratio of the first penetration ratio portion is similar to a penetration ratio of a region of the radiation patterns,
the second penetration ratio portion has a penetration ratio of 70% or less, and
the second penetration ratio portion has sheet resistance of 0.5Ω (ohm)/sq or less.

18. The vehicle of claim 11, further comprising a telematics control unit (TCU),
wherein the telematics control unit and third connection patterns of the second conductive patterns are electrically connected by a Fakra cable,
the Fakra cable comprises a first connector and a second connector,
the first connector is electrically connected to the third connection patterns by soldering, and
the second connector is electrically connected to a receptacle connector of the telematics control unit.

19. The vehicle of claim 11, further comprising an adhesive layer,
wherein the adhesive layer comprises an adhesive material and a UV-cut material, and
the adhesive layer is disposed between the first surface of the first transparent dielectric substrate and an inner surface of the glass panel.

20. The vehicle of claim 11, further comprising a metal frame,
wherein the opaque region of the glass panel is supported by a portion of the metal frame,
the metal frame comprises a recess portion, and
the second dielectric substrate is disposed within the recessed portion of the metal frame.

21. A vehicle comprising:
a glass panel having a transparent region and an opaque region; and
an antenna assembly disposed on the glass panel,
wherein the antenna assembly comprises:
a first transparent dielectric substrate having a first surface and a second surface, wherein the first surface and the second surface are disposed on opposite surfaces, the first surface faces the glass panel, the second surface faces an inside of the vehicle, and the first surface has a first region and a second region;
first conductive patterns disposed on the first surface of the first transparent dielectric substrate, wherein the first surface has a first region and a second region, the first region is disposed on the transparent region of the glass panel, the second region is disposed on the opaque region, radiation patterns of the first conductive patterns are disposed on the first region of the first surface, and first connection patterns of the first conductive patterns are disposed on the second region of the first surface;
a second dielectric substrate having a third surface and a fourth surface, wherein the second dielectric substrate is disposed on the opaque region of the glass panel, the third surface and the fourth surface are disposed on opposing surfaces, the third surface faces the glass panel, and the fourth surface faces the inside of the vehicle; and
second conductive patterns disposed on the fourth surface of the second dielectric substrate, and
second connection patterns of the second conductive patterns are attached to the first connection patterns.

22. The vehicle of claim 21, wherein the first conductive patterns comprise a first pattern, a second pattern, and a third pattern,
the second conductive patterns comprise a feeding pattern, a first ground pattern, and a second ground pattern,
the first pattern is electrically connected to the feeding pattern of the second conductive pattern,
the second pattern is electrically connected to the first ground pattern of the second conductive pattern,
the third pattern is electrically connected to the second ground pattern of the second conductive pattern, and
the first pattern, the second pattern, and the third pattern have a coplanar waveguide (CPW) structure on the first transparent dielectric substrate.

23. The vehicle of claim 22, wherein the first pattern, the second pattern, and the third pattern are formed in a metal mesh shape with a plurality of open areas,
the antenna assembly further comprises a plurality of dummy metal grid patterns on outer portions of the first conductive patterns on the first transparent dielectric substrate,
the plurality of dummy metal grid patterns are not connected to the feeding pattern and the first and second ground patterns,
the plurality of dummy metal grid patterns are separated from one another by slits, and
the radiation patterns have a linewidth of 10 μm or less.

24. The vehicle of claim 21, wherein the second connection patterns of the second conductive patterns are attached to the first connection patterns by ACF bonding.

25. The vehicle of claim 23, wherein the radiation patterns have a penetration ratio of 70% or more,
the plurality of dummy metal grid patterns have a penetration ratio of 72% or more, and
the radiation patterns have sheet resistance of 1Ω (ohm)/sq or less.

26. The vehicle of claim 23, wherein a difference in penetration ratio between a region of the plurality of dummy metal grid patterns and a region of the radiation patterns is 2% or less,
a boundary of some of the dummy metal grid patterns and a boundary of the radiation patterns are separated by a gap, and
the boundary of the dummy metal grid patterns and the boundary of the radiation patterns are 200 μm or less.

27. The vehicle of claim 24, wherein the first connection patterns each comprise a first penetration ratio portion and a second penetration ratio portion, a penetration ratio of the first penetration ratio portion is similar to a penetration ratio of a region of the radiation patterns, the second penetration ratio portion has a penetration ratio of 70% or less, and the second penetration ratio portion has sheet resistance of 0.5Ω (ohm)/sq or less.

28. The vehicle of claim 21, further comprising a telematics control unit (TCU), wherein the telematics control unit and third connection patterns of the second conductive patterns are electrically connected by a Fakra cable, the Fakra cable comprises a first connector and a second connector, the first connector is electrically connected to the third connection patterns by soldering, and the second connector is electrically connected to a receptacle connector of the telematics control unit.

29. The vehicle of claim 21, further comprising an adhesive layer, wherein the adhesive layer comprises an adhesive material and a UV-cut material, and the adhesive layer is disposed between the first surface of the first transparent dielectric substrate and an inner surface of the glass panel.

30. The vehicle of claim 21, further comprising a metal frame, wherein the opaque region of the glass panel is supported by a portion of the metal frame, the metal frame comprises a recess portion, and the second dielectric substrate is disposed within the recessed portion of the metal frame.

* * * * *